(12) United States Patent
Dohler et al.

(10) Patent No.: US 8,681,684 B2
(45) Date of Patent: Mar. 25, 2014

(54) METHOD AND SYSTEM FOR FREQUENCY RELAYING

(75) Inventors: Mischa Dohler, London (GB); Abdol Hamid Aghvami, London (GB); Fatin Said, London (GB); Seyed Ali Ghorashi, London (GB)

(73) Assignee: King's College London, London (GB)

( * ) Notice: Subject to any disclaimer, the term of this patent is extended or adjusted under 35 U.S.C. 154(b) by 411 days.

(21) Appl. No.: 12/844,099

(22) Filed: Jul. 27, 2010

(65) Prior Publication Data

US 2011/0019608 A1    Jan. 27, 2011

Related U.S. Application Data

(63) Continuation of application No. 12/426,383, filed on Apr. 20, 2009, now abandoned, which is a continuation of application No. 10/481,950, filed as application No. PCT/GB02/03010 on Jun. 28, 2002, now Pat. No. 7,594,010.

(30) Foreign Application Priority Data

Jun. 28, 2001 (GB) .................................. 0115799.9
Jun. 28, 2001 (GB) .................................. 0115804.7
Jun. 28, 2001 (GB) .................................. 0115807.0

(51) Int. Cl.
*H04J 3/08* (2006.01)

(52) U.S. Cl.
USPC ............ 370/315; 370/342; 370/347; 455/552

(58) Field of Classification Search
USPC ............................ 370/315, 342, 347; 455/552
See application file for complete search history.

(56) References Cited

U.S. PATENT DOCUMENTS

| | | | | |
|---|---|---|---|---|
| 5,732,073 A * | 3/1998 | Kusaki et al. | ................. | 370/280 |
| 5,754,637 A * | 5/1998 | Choi | ........................ | 379/167.11 |
| 5,960,364 A * | 9/1999 | Dent | ........................ | 455/552.1 |
| 6,342,777 B1 * | 1/2002 | Takahashi | ..................... | 370/315 |
| 2002/0051435 A1 * | 5/2002 | Giallorenzi et al. | ........... | 370/335 |

* cited by examiner

*Primary Examiner* — Wanda Z Russell
(74) *Attorney, Agent, or Firm* — Barkume & Associates, P.C.

(57) ABSTRACT

A method of transmitting data across an electronic data communication system comprising a plurality of terminals that can send and receive data in the form of electromagnetic waves to and from at least one of the terminals, which method comprises the steps of: (a) identifying at least one control terminal, at least one target terminal and at least two relaying terminals from the plurality of terminals; and (b) using the control terminal to instruct the at least two relaying terminals to receive and relay data intended for the at least one target terminal, so that the at least one target terminal can receive data directly from at least one terminal and from the at least two relaying terminals, thereby increasing capacity of the system.

15 Claims, 22 Drawing Sheets

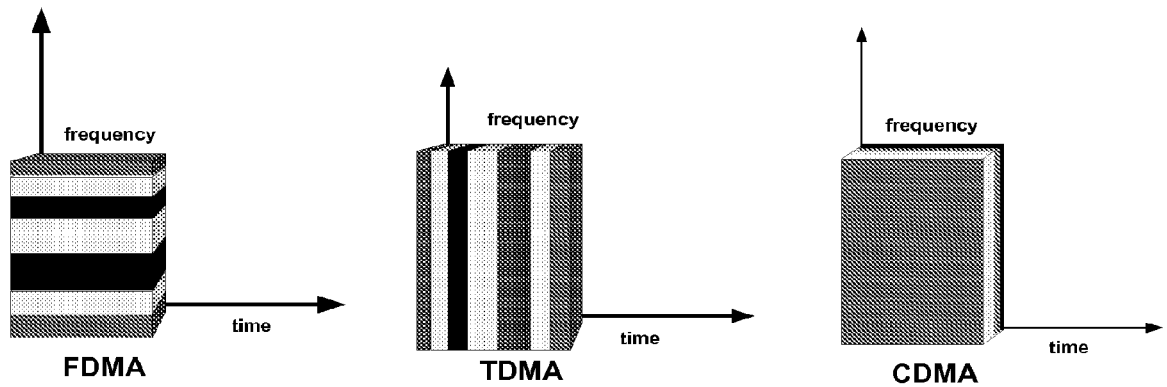

Fig.1

|  | Synchronisation Codes | Channelisation Codes | Scrambling Codes, UL | Scrambling Codes, DL |
|---|---|---|---|---|
| Type | Gold Codes | Orthogonal Variable Spreading Factor (OVSF) codes | Complex-Valued Gold Code Segments (long) or Complex-Valued S(2) Codes (short) | Complex-Valued Gold Code Segments |
| Length | 256 chips | 4-512 chips | 38400 chips | 38400 chips / 256 chips |
| Duration | 66.67 μs | 1.04 μs – 133.34 μs | 10 ms | 10 ms / 66.67 μs |
| Number of Codes | 1 primary code / 16 secondary codes | = spreading factor 4…256 UL, 4…512 DL | 16,777,216 | 512 primary / 15 secondary for each primary code |
| Spreading | No, does not change bandwidth | Yes, increases bandwidth | No, does not change bandwidth | No, does not change bandwidth |
| Usage | To enable terminals to locate and synchronise to the cells' main control channels | UL: to separate physical data and control data from same terminal DL: to separate connection to different terminals in a same cell | Separation of terminal | Separation of sectors |

Fig.2

METHOD AND SYSTEM FOR FREQUENCY RELAYING

FIELD OF THE FIRST INVENTION

The present invention relates to a method, computer program and apparatus for improving the capacity of an electronic data communication system. There is also provided a terminal that can be operated in accordance with the method, and a subscriber identity module card provided with computer executable instructions for carrying out the method.

BACKGROUND TO THE INVENTION

Portable electronic devices having the ability to communicate with external networks have become increasingly popular and relatively inexpensive in recent years. Examples of such devices are mobile telephones, notebook computers, pagers and personal digital assistants. Such devices often have the capability of sending and/or receiving data over a wireless link that enables the user to exchange information with other users and/or networks whilst the user remains relatively free to move around. The data can be voice data, text and numerical data, for example, which have been put into digital format. This allows the user to hold telephone conversations, access the Internet and/or private computer networks for example. Due to their portability, notebook computers are frequently brought to meetings, conferences and hotels for example, where increasingly the opportunity of accessing a local network or the Internet is given to the user. Such a situation generates a "hot-spot" where a number of users that are physically close to one another (typically 5 m to 200 m) require delivery of data across a wireless link. The nature of conferences and meetings means that the users very frequently demand data a substantially the same time.

Frequently, the wireless link is between a base station transceiver and a mobile transceiver, both capable of sending and receiving data via the electromagnetic spectrum. The ultra-high frequency (UHF) part of the electromagnetic spectrum is most frequently used for this kind of data transmission, which has a wavelength in the range of approximately 1 m to 0.1 m (and frequency of 300 MHz to 3000 MHz), although higher bands (microwave and infrared) can be used for example 17 GHz and 60 GHz. The International Telecommunication Union (ITU), which manages the international allocation of radio spectrum, allocated the bands 890-915 MHz for the uplink (mobile station to base station) and 935-960 MHz for the downlink (base station to mobile station) for mobile telecommunications networks in Europe. The base station is usually mounted high on a stationary object such as a building where it can broadcast a signal for the surrounding area. The demand by users for smaller portable electronic devices as described above means that the base station usually comprises a much larger transceiver, whereas the mobile transceiver is much smaller.

There are many difficulties associated with successfully transmitting and receiving data to users over a wireless link. One problem is that of "multipath". Radio waves emitted from a base station and from a mobile terminal are repeatedly reflected and scattered on their way to the mobile terminal or base station. Thus when they reach the destination the waves will interfere either constructively or destructively, resulting in a signal that can be heavily attenuated. When the mobile terminal starts to move, the received signal begins to vary rapidly with time causing an effect known as "fast fading". If the mobile terminal stops or is positioned in a fade the signal can be of extremely poor quality, known as "slow fading".

This problem can be particularly acute with laptops and notebooks placed randomly by the user. Multipath dominates over a scale of approximately one wavelength to one half a wavelength. A relatively simple solution is to construct a series of antennae, for example two, each spaced more than this distance apart. Thus, if one antenna receives a signal in a fade, there is a good chance that the signal at the other antenna will not be in a fade. The signals from each antenna can be combined to provide a better output signal. Spacing antennae in this manner is known as using "diversity" to improve signal quality. In the example described the base station usually has antennae arranged in this manner to achieve "receive" diversity since it receives the signal from the mobile terminal (also known as "uplink"). If the base station uses physically separate antennae to transmit to a mobile terminal this is known as "transmit diversity". A useful example of a method for achieving transmit diversity has been devised by S. Alamouti and is discussed in his paper "A Simple Transmit Diversity Technique for Wireless Communications" IEEE Journal on Select Areas in Communications, Vol. 16, No. 8, October 1998.

Achieving receive diversity at the mobile terminal by spatial separation of antennae is difficult as, particularly with mobile telephones, there is not sufficient room to space them by the required range of one wavelength to one half wavelength. Furthermore, this would add cost to the mobile terminal that would not be welcomed by users.

More recently, with the increase in the popularity of mobile electronic communications devices and the demand for higher bandwidths in terms of data transfer, the scarcity of the spectrum has become a problem. In many countries including USA, Japan and the members of the European Community, the UHF part of the spectrum is allocated by governments for data transmission of this nature. That allocated portion is then further divided into smaller portions and distributed amongst telecommunication suppliers, very frequently to the highest bidder. Thus each supplier must try to obtain the greatest efficiency from their part of the spectrum that is possible, and a wide variety of complicated algorithms have been developed to do this. A further problem is that an increasing number of users results in a greater amount of interference that must also be overcome technically. Thus it is apparent that there is a need for increased capacity on wireless communications networks in terms transferring greater amounts of data over the available frequency bandwidth, improving signal quality at the receiver and accommodating a larger number of users at any one time on a network having a wireless link.

In attempting to achieve greater efficiency from the electromagnetic spectrum there are two main parameters available to the designer: frequency and time. Referring to FIG. 1 the spectrum can be divided by frequency so that each user sends and receives data with a given frequency band all of the time. Such schemes are known as Frequency Division Multiple Access (FDMA) and allow multiple users to use the same base station simultaneously. Alternatively each user is allocated a specific time window or "slot" in which to send or receive data over the entire available frequency band, also shown in FIG. 1. This scheme is known as Time Division Multiple Access (TDMA) and also allows multiple users to use the same base station, effectively simultaneously as far as the user can perceive. Another possibility is to permit all users to use the entire available frequency band all of the time. However, the data of each user is multiplied with a spreading code to ensure that each user receives only the data intended for them. This scheme is know as Code Division Multiple Access and is also shown in FIG. 1. The spreading code is designed to provide uniqueness to enable identification of the data by the mobile terminal. One example of the code used in a CDMA scheme is Gold code. The exact code that is used depends upon the intended function. For example Walsh and Gold codes can be used to enable a mobile terminal to locate and synchronise with the correct data, whereas orthogonal variable spreading factor codes are intended to ensure that each user's allocated channel is kept separate and distinct. The code "spreads" the data over larger frequency bandwidth enabling power per unit frequency (W/Hz) to be reduced, achieving the same bandwidth in bits per second whilst lowering interference.

One area where the aforementioned problems have been extensively addressed is in the mobile telecommunications industry. The mobile telecommunications industry started major expansion in the early 1980s, although mobile telecommunications were investigated before that. Generally the development of the system has been in "generations" (G) that can be summarised as follows:

1G networks (e.g. Nordic Mobile Telephony (NMT), Advanced Mobile Phone System (AMPS), TACS) are considered to be the first analogue cellular systems, which started early 1980s.

2G networks (e.g. Global System for Mobile Communications (GSM)), cdmaOne based on the EIA Interim Stand 95 (IS-95), Digital Advanced Mobile Phone System (DAMPS)) are the first digital cellular systems launched early 1990s.

2.5G networks (e.g. General Packet Radio Service (GPRS), cdma2000 based on the EIA Interim Standard 2000 that provides an evolutionary path to 3G) are the enhanced versions of 2G networks with data rates up to about 144 kbit/s.

3G networks (e.g. Universal Mobile Telecommunications Service (UMTS) Frequency Division Duplex (FDD) and Time Division Duplex (TDD), cdma2000 1xEVDO, cdma2000 3x, Time Division Space Code Multiple Access (TD-SCDMA), Association of Radio Industries and Business (Japan) (ARIB) Wideband CDMA (WCDMA), Enhanced Data for Global Evolution (EDGE), International Mobile Telecommunication 2000 (IMT-2000), Digital European Cordless Telecommunications (DECT)) are the latest cellular networks that have data rates 384 kbit/s and more.

4G is predominantly conceptual at the moment. Some basic 4G research is being done, but no frequencies have been allocated. The Fourth Generation could be ready for implementation around 2012.

For example, UMTS is a third generation (3G) telecommunications system based on wideband CDMA direct sequence (W-CDMA DS). W-CDMA is similar to CDMA except that the data is spread over a larger frequency bandwidth. FIG. 2 shows examples of the types of code in W-CDMA and their function.

The solution reached for dealing with a large number of users wanting to use a comparatively small part of the available spectrum has been to geographically divide a network into cells. In this way, by keeping the emitted power of base stations and mobile terminals low, together with use of coding schemes as mentioned above, it is possible to distribute frequencies amongst cells so that the same combination of frequencies can re-used in the network, providing those cells are sufficiently distant. It also permits the terminals carried by the user to be made smaller. However, the demand for increased data transfer rates and improved signal quality still persist.

Another more recent technique that has achieved an increase in capacity utilises multiple-input multiple-output transmission techniques (MIMO) in which a multi antenna transmitter sends data to a multi-element receiver. The signal at each receive antenna is different due to the effects of mutlipath as described above, from which the original signal can be re-assembled. Coding and sending the signal spaced in time has been found to be particularly beneficial in achieving increased capacity in MIMO channels. Thus space, time and coding are used to enhance system capacity which is known as "space-time coding". As the name suggests space-time encoding involves splitting the signal and transmitting it over a number of antennae that are spatially separate and by sending the signal from each antenna at a different time. This achieves a double diversity effect. One piece of software that has achieved good results was designed by Bell Labs and is known is Bell Labs Layered Space-Time code (BLAST—see www.bell-labs.com/project/blast) that uses space-time coding to encode data at the transmitter and re-assemble data at the receiver. However, MIMO techniques rely upon there being multi-element antennae at the receiver that is not practical for many applications, such as mobile phones and PDAs where the space is not normally available to accommodate a number of antenna elements the required distance apart.

One solution that has been proposed is to provide the mobile terminal with one active antenna and several tuneable passive antennae that together form an array www.signal.uu.se/(Publications/pdf/c0114.pdf). This system is known as switched parasitic antennae (SPA). Although the results of the computer simulation were encouraging in terms of replicating full MIMO capacity, the applicant believes that the difficulty of implementing SPA in practice, bearing in mind the likely tuning difficulties due to interaction between the antennae, the mobile terminal and the user, will make costs prohibitive. Furthermore, the fact that several antennae are still necessary in SPA inhibits the mobile terminal from being made smaller.

SUMMARY OF THE FIRST INVENTION

It is apparent that there is a need for improved method and apparatus that can increase the capacity of an electronic data communication system, particularly in the downlink direction where data bandwidths are high. Terminals in such systems can be nomadic where terminals can move but generally only communicate whilst stationary, ad-hoc where the number of terminals fluctuates with time (i.e. temporary) networks are formed, or fixed. Such apparatus should also be able to take advantage of space-time codes used over a MIMO or MIMO-like channel, but which does not necessarily increase the size and weight of mobile or remote terminals.

There is also a need for a method and apparatus that can reduce the effects of terminals in bad channel conditions, and particularly when those terminals are unlikely to move from that position for some time.

The present invention is based on an insight that the capacity of an electronic data communication system as aforementioned can be enhanced by using the mobile or remote terminals served by one or more control terminals to provide a relaying function of data to other terminals. The terminals that perform relaying are known as "relaying terminals" and the terminals that are the recipients of the relayed data are known as "target terminals". In some embodiments a terminal can be both a relaying and target terminal simultaneously. Preferably the relaying terminals can be grouped together into groups known as "virtual antenna arrays". The groups are organised so that there is little or no additional interference in the system. There can be one or more control terminal comprising a mobile terminal (e.g. mobile telephone, portable computer), a base station controller or a radio network controller for example. The invention is particularly advantageous for use in ad-hoc networks where the control terminal is a portable device to which appropriate instructions can be downloaded on request or pre-stored thereon.

The present invention is also based on the insight that the benefits of MIMO channels can be obtained without requiring more than one antenna in the target terminal.

According to the present invention there is provided a method of transmitting data across an electronic data communication system comprising a plurality of terminals that can send and receive data in the form of electromagnetic waves to and from at least one of the terminals, which method comprises the steps of:

(a) identifying at least one control terminal, at least one target terminal and at least two relaying terminals from the plurality of terminals; and (b) using the control terminal to instruct the at least two relaying terminals to receive and relay data intended for the at least one target terminal, so that the at least one target terminal can receive data directly from at least one terminal and from the at least two relaying terminals, thereby increasing capacity of the system. In one embodiment data is relayed via the at least two relaying terminals substantially simultaneously, thereby providing at least two paths for data to reach the target terminal via the relaying terminals.

The present invention is set out in more detail in the appended claims to which attention is hereby directed.

The following communications standards currently available or under investigation and standardisation are applicable to this invention: Global System for Mobile Communications (GSM) and derivatives of it (GPRS, EDGE, 3GSM), Universal Mobile Telecommunications Standard (UMTS), Code Division Multiple Access 2000 (CDMA2000), IEEE802.11, High Performance Local Area Network Type 2 (HiperLAN2), Bluetooth (BT), Power Line Communications (PLC), Ultra Wide Band (UWB), Infrared Communications and any future systems based on either of the following access schemes: Code Division Multiple Access (CDMA), Time Division Multiple Access (TDMA), Frequency Division Multiple Access (FDMA) or Orthogonal Frequency Division Multiple Access (OFDMA).

In one embodiment, the main link interface from the control terminal to the mobile terminals is based on either of the following access schemes: W-CDMA (UMTS, CDMA2000), TDMA/FDMA (GSM & derivatives) or TDMA/OFDMA (IEEE802.11, HiperLAN2). The relaying link from the relaying mobile terminals to the target mobile terminals is preferably based on either of the following access schemes: W-CDMA (UMTS, CDMA2000, UWB), TDMA/FDMA (GSM & derivatives, Bluetooth) or TDMA/OFDMA (IEEE802.11, HiperLAN2, PLC).

According to another aspect of the first invention there is provided a system for transmitting and receiving electromagnetic signals in which there is at least one base station comprised of at least one antenna element, which sends out signals to a group of target receivers or terminals, each receiver or terminal within this group of target receivers or terminal receives the signal stream, extracts its own dedicated signal and, after possible processing, relays the signals dedicated to the other users within the group.

Preferably, the process of relaying is accomplished by retransmission through a wireless, wired, infrared or UWB interface.

Advantageously, in which each receiver can act as a virtual transmitter or a virtual receiver for at least one other receiver in the group.

Preferably, the distinction between a virtual transmitter and virtual receiver is achieved through appropriate orthogonality of physical channels between the main link between base station and target group and the relaying links between the terminals within the target group.

Advantageously, the system is a CDMA based system and orthogonality is achieved through delay, codes or frequency.

Preferably, the data stream for the users is spread with a distinct spreading code with given chip-rate for each user, each of the users receives the incoming data streams, from the other users optionally processes at least some of the data streams and relays the possibly processed data streams to the remaining users within the group of users and each of the users then finally processes the signal streams.

Advantageously, if user m is addressed then n users form the virtual transmitting array and m-1=u-n-1 users the virtual receiving array where u-1 is the number of data streams processed, the virtual transmitting array of n users is formed through synchronous transmission within chip-length and the virtual receiving array of m-1 users is formed through retransmission out of chip-length.

Preferably, the retransmission out of chip length is achieved through network imposed or natural delay.

Advantageously the required synchronisation for the virtual transmitting array is achieved through external network synchronisation.

Preferably, the required synchronisation for the virtual transmitting array is achieved by letting spatially close mobile terminals form the virtual transmitting array.

Advantageously, retransmission without interrupting the ongoing transmission between base station and mobile terminal is accomplished by introducing a third oscillator for the relaying transmission in a separate frequency band.

Preferably, retransmission without interrupting the ongoing transmission between base station and mobile terminal is accomplished, in case of rather static terminals, by cutting the uplink and reprogramming the uplink oscillator onto the relaying frequency band.

Advantageously, the information of u users is first spread by u distinct spreading codes and then by one scrambling code, the scrambling code being unique for the group of u users and differs from other used scrambling codes within the same geographical area.

Preferably, there are groups of users formed of individual users, which are close together so they act as a group and act as transparent relays to send to the signal to the target receiver, the users in each group being in chip-range so they act as a one-signal receiver, each group being out of chip-range to the other groups and so each group is distinguishable from the other groups and so the signal from each group can be considered as one signal received by one finger of the Rake receiver, depending on the number of Rake fingers in the target receiver, the target receiver detects the strongest signals, combines them and retrieves the initial symbols.

Advantageously, the system is a TDMA base system and orthogonality is achieved through frequency and appropriate time slot scheduling.

Preferably, the data stream for u users is sent through burst within u dedicated time slots at the same frequency band $f_1$, each of the u users receives all u data bursts and each user i retransmits the other users' ji received bursts at the appropriate time-slot for each user j at another frequency $f_2$ and at its own time slot, each user i receives the u-1 retransmitted bursts at frequency $f_2$.

Advantageously, retransmission without interrupting the ongoing transmission between base station and mobile terminal is accomplished by introducing a third oscillator for the relaying transmission in a separate frequency band.

Preferably, retransmission without interrupting the ongoing transmission between base station and mobile terminal is accomplished, in case of rather static terminals, by cutting the uplink and reprogramming the uplink oscillator onto the relaying frequency band.

Advantageously, the relaying frequency $f_2$ is reserved by the network.

Preferably, (n,m) space-time codes are applied for future software defined ratios and the bursts for u users are transmitted simultaneously at u different frequency bands.

Advantageously, the system is an OFDMA based system and orthogonality is achieved through frequency, sub-carrier frequency and appropriate time slot scheduling.

Preferably, the data stream for u users is sent through burst within u dedicated time slots at the same frequency band $f_1$, each of the u users receives all u data bursts and each user i retransmits the other users' u≠i received bursts at the appropriate time-slot for each user u≠i at another frequency $f_2$ and at its own time slot each user i receives the u-1 retransmitted bursts at frequency $f_2$.

Advantageously, retransmission without interrupting the ongoing transmission between base station and mobile terminal is accomplished by introducing a third oscillator for the relaying transmission in a separate frequency band.

Preferably, retransmission without interrupting the ongoing transmission between base station and mobile terminal is accomplished, in case of rather static terminals, by cutting the uplink and reprogramming the uplink oscillator onto the relaying frequency band.

Advantageously, the relaying frequency $f_2$ is reserved by the network.

Preferably, (n,m) space-time codes are applied for future software defined radios and the bursts for u users are transmitted simultaneously at u different frequency bands.

Advantageously, each transceiver is a mobile terminal.

BRIEF DESCRIPTION OF THE DRAWINGS

For a better understanding of the present invention reference will now be made by way of example to the accompanying drawings in which:

FIG. 1 shows schematically the schemes of FDMA, TDMA and CDMA used in wireless communication;

FIG. 2 is a table showing, by way of example, the codes that can be used in a W-CDMA access scheme;

DETAILED DESCRIPTION OF THE PREFERRED EMBODIMENTS

Figure 3:
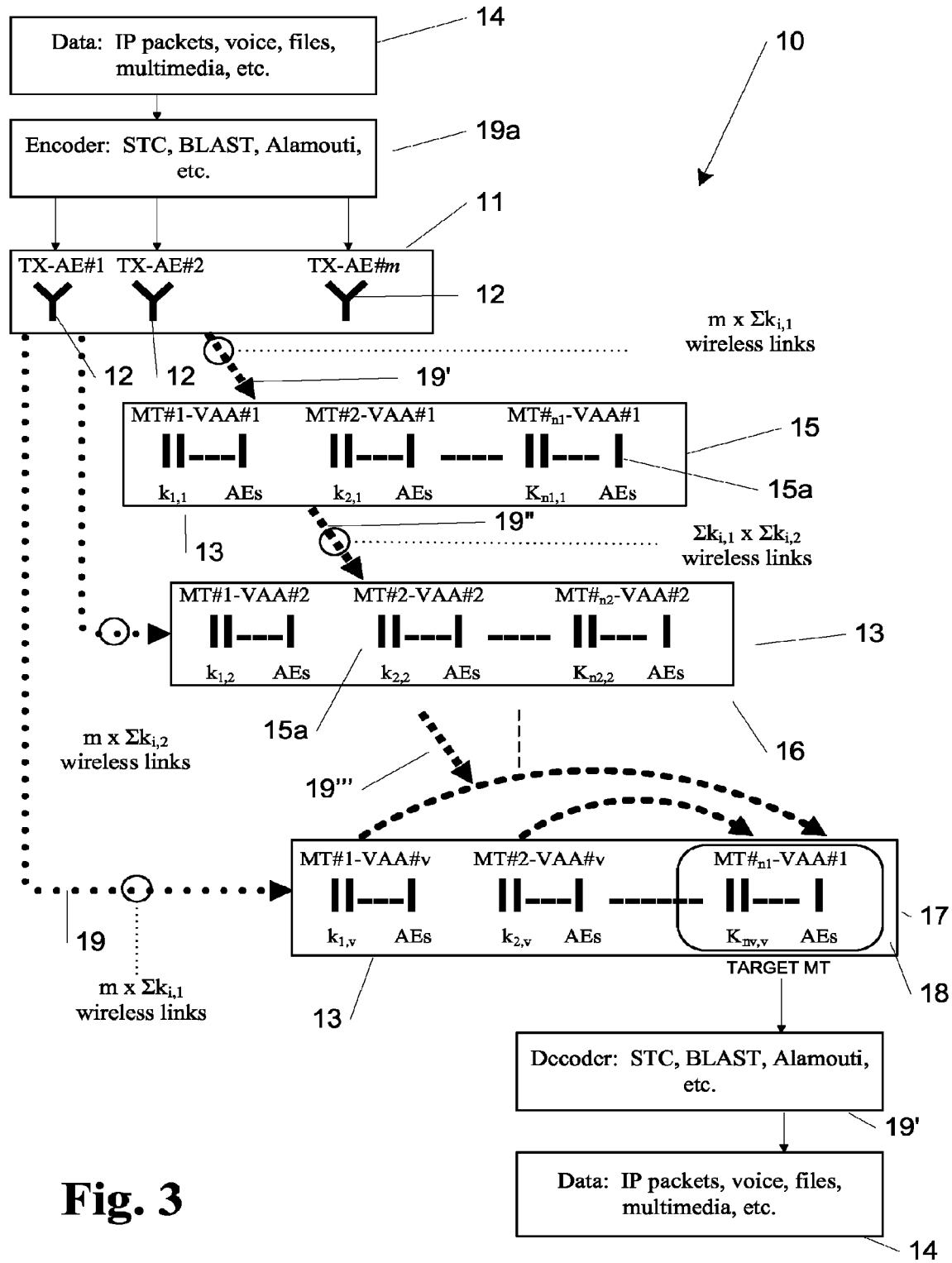
FIG. 3 is a schematic view of part of a first embodiment of a data communication system in accordance with the present invention in which two virtual antenna arrays have been defined, shown employed in a downlink mode of operation.
Figure 3A:
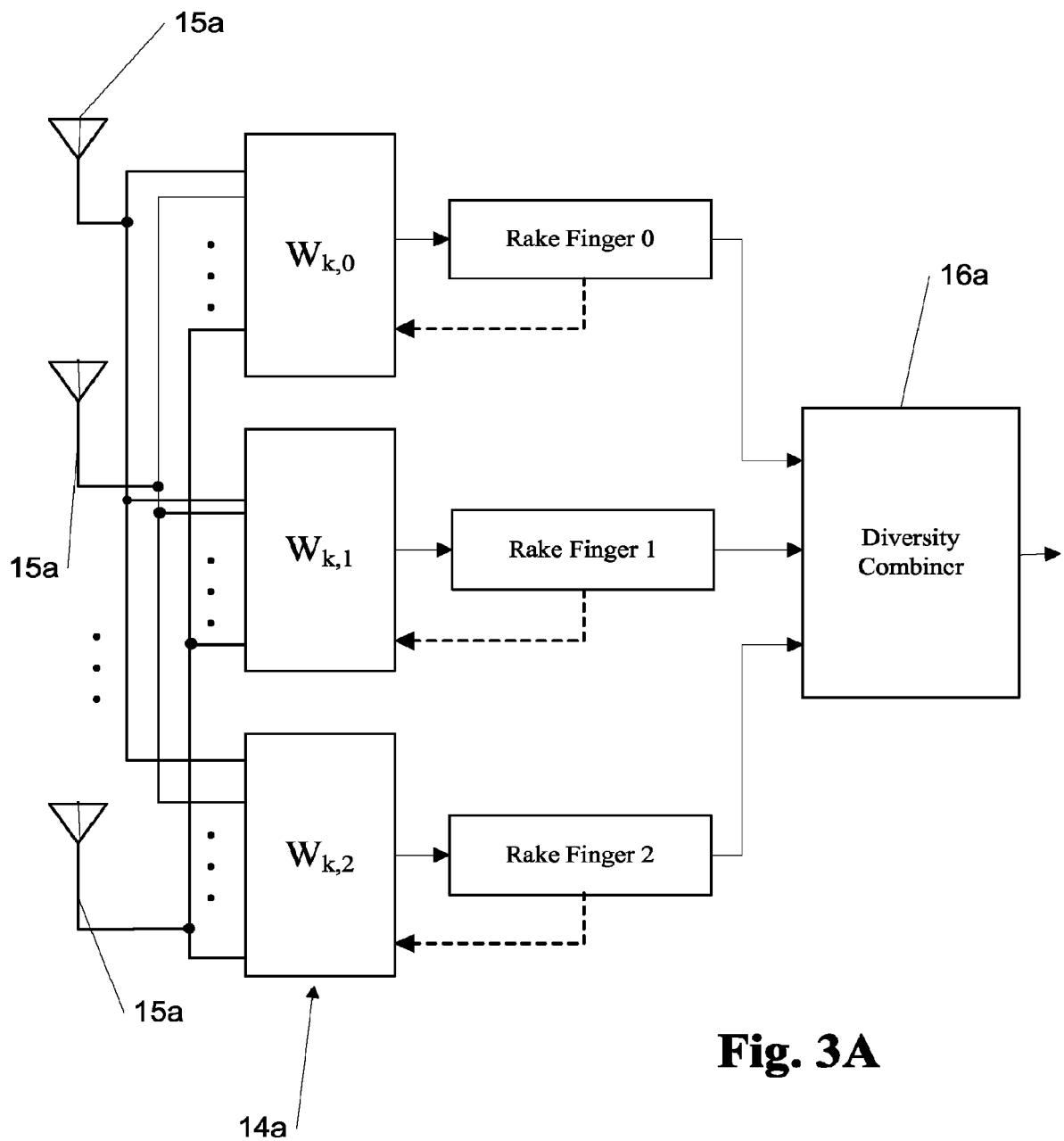
FIG. 3A is a schematic view of a RAKE receiver used in a mobile terminal.

Referring to FIG. 3 a first embodiment of a data communication system is generally identified by reference numeral 10 that comprises a control terminal 11 having in antenna elements 12. The control terminal may be a base station for example. The control terminal 11 is part of a larger network of control terminals (not shown) through which data can be passed. The control terminals serve to divide an area into a number of cells (not shown), as described in the introduction above, permitting inter alia frequency re-use between the cells. There are $n_1+n_2+n_v$ mobile terminals 13 in the cell served by control terminal 11. Referring to FIG. 3A each mobile terminal 13 comprises a RAKE receiver 14a having a plurality of antenna elements 15a, each of which acts as a "finger" that can lock on to uncorrelated copies of the signal created by multipath. The first finger locks on to the strongest signal, the second finger the next strongest and so on. The signal from each finger can be combined by the diversity combiner 16a to improve signal quality, effectively taking advantage of time diversity to do this. Very frequently the first component is a line-of-sight part of the transmitted power and the remaining components are those caused by multipath. However, it is not important that the terminals have RAKE receivers as a single antenna in each terminal will suffice. The remaining components are normally very much more attenuated than the line-of-sight component. Each mobile terminal is free to move in the cell.

Electronic digital data 14 is sent from higher layers of the network to the control terminal intended for those mobile terminals 13 in the cell that are demanding data. Other mobile terminals 13 are inactive or active in terms of receiving data. The data 14 is in the form of digital (binary) data that can carry a wide variety of information, for example text, voice and images. At the control terminal 11 the digital data must be modulated onto an electromagnetic wave carrier in order to convey the data wirelessly from the control terminal 11 to the mobile terminals 13. There are various schemes that do this so as to allow multiple users to send and receive data simultaneously from the control terminal 11. These schemes will be described in the context of the invention in greater detail below.

The control terminal 11 sends the data 14 for the mobile terminals 13 from the antenna elements 12 ("downlink"). Each mobile terminal 13 receives the signal from the control terminal and extracts its own data. The control terminal 11 monitors the capacity of the network serving the mobile terminals 13. The measurement of capacity can include any of the following: the availability of power, codes, time slots, frequency bands or frequency sub-carriers to either the control terminal 11 or any of the mobile terminals 13. When the control terminal determines that the network has breached a threshold in terms of the availability of any of theses resources it performs the set up of a group or groups of r-MTs 13 that relay some or all of the data stream that they receive with the aim of improving capacity. These groups are referred to herein as Virtual Antenna Arrays. Such a situation may arise for example when a large number of users attempt to access the network in a short space of time, if a few users place large data bandwidth demands on the network, if users demand a higher Quality of Service (QoS) (meaning that a better signal quality is required) or if interference conditions change as a result of fluctuation in propagation characteristics of the wireless path between control terminal 11 and mobile terminals 13. The detailed steps of formation of the virtual antenna arrays will be described in greater detail hereafter.

Virtual antenna arrays 15, 16 and 17 (hereinafter VAAs) are formed under control of the control terminal 11. Within the virtual antenna array 17 there is a target mobile terminal 18 (hereinafter "t-MT"). The t-MT 18 may be a mobile terminal that is in an area of poor reception, may require a higher data bandwidth etc. There may be more than one t-MT in the VAA 17 or the VAAs 15 and 16. The t-MT 18 may be surrounded by a number of active or inactive mobile terminals 13; inactive mobile terminals are not sending or receiving data themselves but are nonetheless in an "on" state. Data 14 is now received from the network and is encoded in an encoder 19a. Details of the appropriate coding are given below. The data 14 is sent from the antenna elements 12 of the control terminal. In the embodiment shown there are now a much greater number of paths by which the data can reach the t-MT 18. For example, the data can be received directly by the t-MT 18 via the path 19. Secondly, data can pass from the control terminal to the VAA 15 via path 19'. On being received by each of the $n_1$ mobile terminals 13, the data is relayed on to the VAA 16 via path 19". The method of relaying will be described in greater detail hereafter. In the VAA 16 each of the $n_2$ mobile terminals receives the relayed signal from VAA 15 and directly from the control terminal 11. These signals are relayed on to the next VAA (not shown) and the process is repeated until the signals reach the with VAA 17 via path 19''' whereat data for the t-MT 18 is relayed by the $n_v$-1 mobile terminals in that VAA. The t-MT 18 also receives data directly from some of the other VAA provided that they are spatially close enough. Once at the t-MT 18 the data can be decoded by decoder 19' to retrieve the data 14.

In this way the quality of the signal at the t-MT 18 is greatly improved since there are a large number of signals reaching the fingers of the RAKE receiver in the t-MT 18 i.e. the signal is relayed by a number of terminals substantially simultaneously to the t-MT. Furthermore, due to the relaying process in the VAA 15, 16 and 17 the signals will be uncorrelated so as to combat the effects of any signal that might be in a fade. This is particularly important where the channel is slow fading for example where a portable computer (e.g. laptop, notebook) has been positioned in a fade, but is unlikely to move from that fade for sometime. The same problem also exists in fast fading channels, for example where a mobile telephone passes in and out of fades comparatively quickly if the user is walking or driving. This method reduces the effect of both types of fading and improves the bit error rate on the channel for the same signal to noise ratio, allowing the data bandwidth of the channel and QoS to be increased and thereby improving network capacity.

Figure 4:
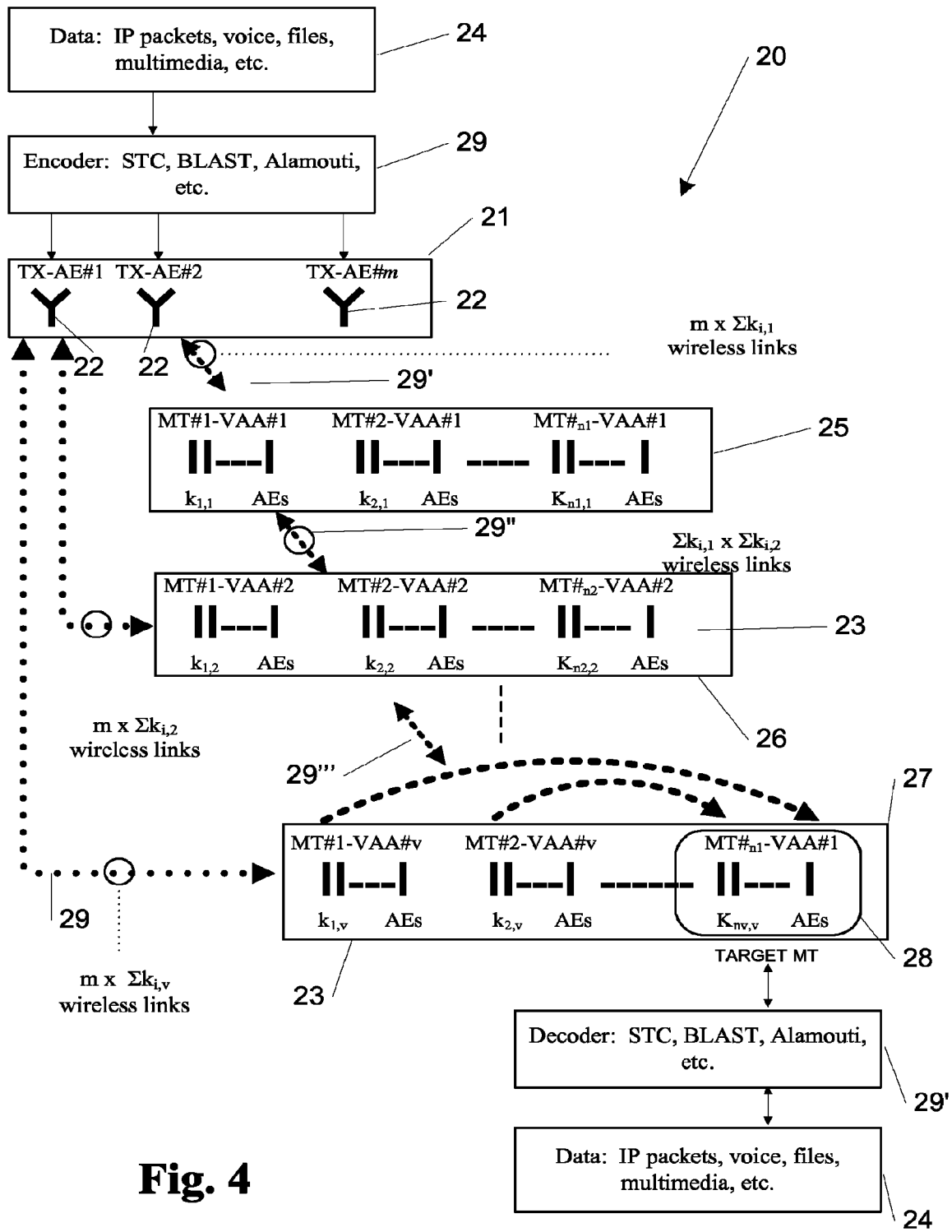
FIG. 4 is a schematic view of part of a second embodiment of a data communication system in accordance with the present invention in which two virtual antenna arrays have been defined, shown employed in a downlink and uplink mode of operation.

Referring to FIG. 4 a second embodiment of a data communication system is generally identified by reference numeral 20 that is similar to the data communication system 10 with like numerals indicating like parts. The main difference between the two embodiments is that the data communications system 20 operates in both a downlink and an uplink (mobile terminal to control terminal) mode. One advantage of this is that the power of the t-MT 28 can be reduced leading to less interference in the cell. Another advantage is that whilst the t-MT 28 might be in a fade with respect to the control terminal 21, it is unlikely to be in a fade with respect to the other mobile terminals 13 in the VAAs 25, 26 and 27 such that it can both send and receive data at an improved bit error rate to and from the control terminal 21.

Figure 5:
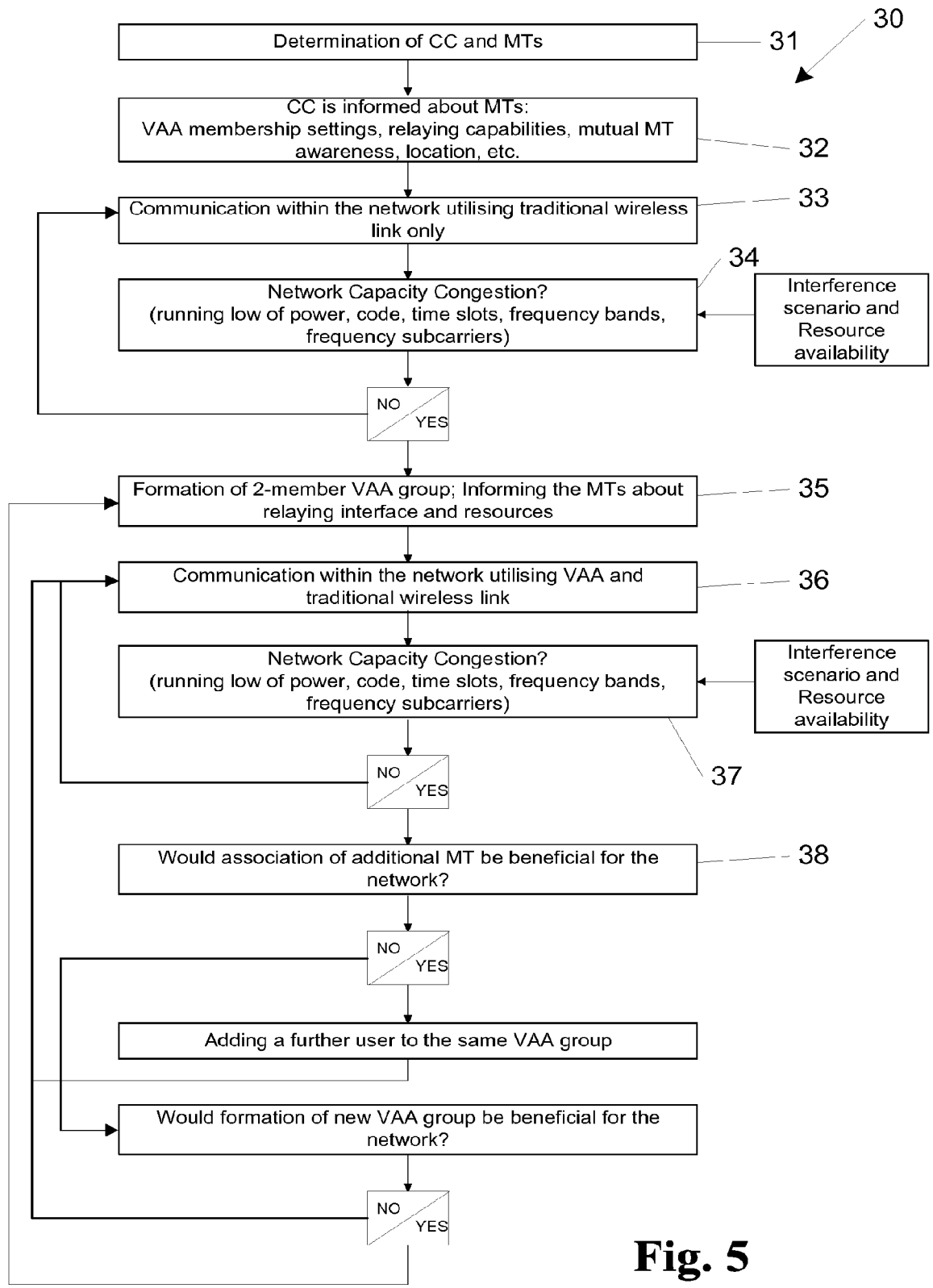
FIG. 5 is a flowchart showing the stages of set-up of a virtual antenna array as used in a in accordance with the present invention.

Referring to FIG. 5 a flowchart showing the main functional requirements of the algorithms required to run a data communication system in the manner described above is generally identified by reference numeral 30. The data communication system is controlled by a central controller (CC) that can be a radio network controller (RNC), a control terminal or a "master" mobile terminal for example. At step 31 the CC is determined for the system. At step 32 the CC obtains information from the mobile terminals in the cell, for example VAA membership settings, relaying capability, awareness of other mobile terminals, location (obtained by a Global Positioning System for example). At step 33 data transfer takes place across the system in the usual fashion under one or a combination of access schemes. At step 34 the CC monitors the network capacity. If capacity is not running low the algorithm returns to step 33 and data transfer continues normally. If however, the capacity of the network is or has been degraded due to changing interference conditions for example, then the algorithm proceeds to step 35 where a VAA is set up. The rules by which a VAA should be set up are as follows. A VAA shall be formed if (1) the network capacity is already saturated or if mobile terminal's data request would saturate the network capacity; (2) all potential VAA users have agreed to participate in a VAA when so requested by the CC; (3) the additional interference produced does not deteriorate communication of other mobile terminals in the network or does not increase the overall system interference above a given threshold such that the total system capacity decreases.

At step 36 the CC designates the mobile terminal that will be the first member of the VAA. This is done by determining the mobile terminal with the maximum capacity in terms of the aforementioned resources and which is spatially close to the target mobile(s). A mobile terminal can be utilised in a VAA if (1) its agreement has been obtained to participate in a VAA; (2) the mobile terminal would benefit from the induced capacity increase; (3) (if applicable) the existing VAA would obtain an increase in capacity; and/or (4) the entire network would receive an increase in capacity.

Whether a mobile terminal has given its agreement to join a VAA if so requested can be done as follows. (1) a mobile terminal agrees to form or be part of a VAA without any prior notification and under any conditions; (2) a mobile terminal agrees to form or be part of a VAA only with appropriate confirmation of the owner (request required); (3) a mobile terminal agrees to form or be part of a VAA only if it would gain any capacity benefits in form of better QoS or higher data rates; (4) a mobile terminal agrees to form or be part of a VAA only if the other VAA members belong to a set of prior defined mobile terminals and (5) a mobile terminal agrees to form or be part of a VAA under any conditions, but automatically releases from a VAA group when a predefined set of conditions are violated.

Target mobile(s) are defined as those terminals can be any terminal(s) that wishes to send or receive data over the network. A second mobile terminal is then assigned to the VAA and the CC informs the two mobiles about the conditions of relay for example what power, frequency and/or codes are to be used, and the mechanism of synchronisation if applicable. The assigning of the second mobile can either be done by the CC or under control of the CC by the first mobile terminal. Together the first and second mobile terminals of the VAA begin to relay the necessary signal to the target mobile(s) at stage 36 whilst the normal wireless communication continues for the rest of the system. At stage 37 the CC monitors the result of implementation of a VAA in the network to determine whether capacity has been increased or reduced as a result. If the capacity remains the same or improves the system keeps running with the VAA deployed. If the capacity worsens then the VAA is dissolved and the algorithm returns to step 35 forming another VAA using different mobile terminals. If the capacity is enhanced by formation of the first VAA, but has not reached the increase required by the CC, then the CC determines at step 38 whether the addition of a further mobile terminal to the VAA would increase capacity of the system. If yes a further mobile terminal is added to the VAA and the algorithm returns to step 36 and steps 36 to 38 are repeated in a loop. If no, the central controller determines whether the formation of a separate VAA would be of benefit in terms of capacity. If yes, the algorithm returns to step 35, whereas if no the algorithm returns to step 36.

It is important that the mobile terminals in a VAA remain synchronised with one another. The synchronisation control can be done by the CC, a RNC or a master mobile terminal in the VAA. This can be accomplished in accordance with the method described in below in connection with the second invention. The method of the third invention described below is also applicable to this first invention.

At some point it will become necessary to dissolve a VAA, all VAAs or release one or mobile terminals from any number of VAAs. The central controller monitors the condition of each mobile terminal. If a mobile terminal indicates that its battery is running low then the CC will detach that mobile terminal from the VAA and possible attach another mobile terminal (if available) depending on the effect that the removal has on capacity of the system. Alternatively, if the formation of one or more VAA has increased the system capacity beyond that needed by the CC then mobile terminals can be released in order of priority based on battery life, additional signalling load or interference for example, until the capacity required by the CC its reached.

In order for a mobile terminal to join a VAA it must be "spatially close" to at least one other member of the VAA. Furthermore all members of a VAA must be spatially close to at least one other member of the VAA in order for capacity gain to be realised. The actual distance in each case will be dependent on a number of factors including the control terminal transmitter power, the interference in the system, the transmission power of the r-MTs in the VAAs and the additional noise generated thereby, the noise sensitivity of the mobile terminals, the distance to the next VAA utilising the same resources and the propagation environment. In a computer simulation carried out by the applicant the following assumptions were made: the relaying process does not generate any interference at the control terminal and each mobile terminal has a relaying power of 30 dBm. It was found that "spatially close" could be interpreted as 20-50 m in a typical indoor environment. In practice in such an environment "spatially close" is between 2 m and 100 m, with 10-20 m being ideal. The power of the mobile terminals can be controlled, for example, by the CC in the range 0 dBW to 10 dBW at a power of 10 mW or less, depending on the relay distance.

Relay Schemes

The signals from the control terminal may by relayed from the mobile terminals in the VAA in the following ways:

(1) transparent relaying;
(2) regenerative relaying; or
(3) IP (Internet Protocol) based relaying.

In transparent relaying the entire part of the electromagnetic signal received by each mobile terminal is amplified, possibly frequency translated (i.e. shifted in frequency) and re-transmitted. In regenerative relaying the entire part of the electromagnetic signal received by each mobile terminal is amplified, de-coded and then re-encoded with the same or a different code, possibly frequency translated (i.e. shifted in frequency) and re-transmitted. In IP based relaying the packets received at each mobile terminal are stored in a buffer and only re-transmitted if a target mobile requests them, so as to minimise power consumption and preserve bandwidth. For example, when web-browsing packets could be held in a buffer for approximately 30 s. Up to approximately 100 radio packets might be held in a 1-megabyte buffer.

Transmission Schemes

The table below sets out examples of transmit and relay schemes that can be utilised in the present invention:

|   | Main Link (Control terminal to VAA(s)) | Relay Link (from Mobile Terminals to t-MT) |
|---|---|---|
| A | CDMA | CDMA |
| B | CDMA | TDMA |
| C | CDMA | OFDMA |
| D | TDMA | TDMA |
| E | TDMA | OFDMA |
| F | OFDMA | OFDMA |

A: CDMA/CDMA

Figure 6:
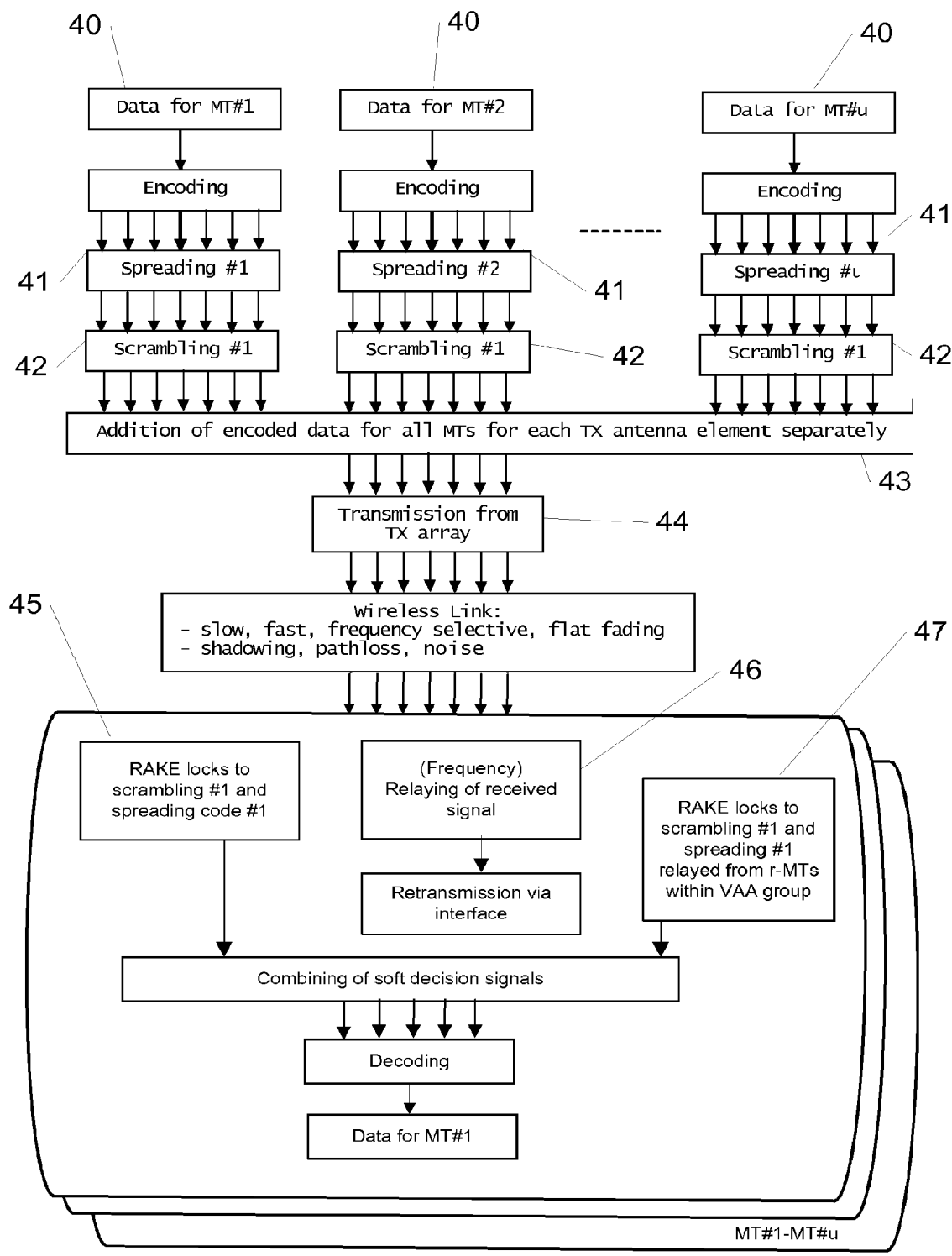
FIG. 6 is a flowchart showing the stages of operation of a data communication system in accordance with the present invention based on a CDMA access scheme.

In this scheme the main and relaying links both utilise CDMA, as shown in FIG. 6, in which data 40 for each mobile terminal is spread with a respective spreading code 41 to make each set of data unique so that each terminal can identify the correct data from the signal comprising all of the data for all n mobile terminals. In the example shown in FIG. 6 there are u sets of data spread with u spreading codes for u mobile terminals that together form one VAA. Each set of data then is then multiplied by the same scrambling code 42. The CC informs each mobile terminal in each VAA of the relevant scrambling code. By locking on to each scrambling code each mobile terminal can determine the data to be relayed amongst the members of the VAA.

At stage 43 the encoded data for mobile terminals outside the VAA, which may be encoded with different scrambling and spreading codes, is added to data for the u mobile terminals. At stage 44 all of the data is transmitted from the control terminal antenna elements (not shown); the electromagnetic waves are as aforementioned. The signal reaches the first mobile terminal, designated MT#1 in FIG. 6. This mobile terminal uses its RAKE receiver (see FIG. 3A) at stage 45 to lock on to the scrambling code 42 and the relevant spreading code. The mobile terminal MT#1 simply relays all of the data under scrambling code 42 at stage 46, thereby not interfering with that data, nor having to process it, which would otherwise use up processing power and battery power. The mobile terminal MT#1 may also receive signals relayed from the other members of VAA at stage 47 and so it also locks on to the scrambling and spreading codes of these signals. All of the signals are combined and decoded in the mobile terminal MT#1 for use by the user. The fact that the mobile terminal MT#1 receives relayed signals from the other members of the VAA means that its overall signal quality is much better than if the RAKE receiver were to lock on to the line of sight component and then on to the attenuated multipath signals. In this way the capacity of the system is enhanced as the bit error rate is lowered for a given signal to noise ratio for example.

As a first specific example of a CDMA/CDMA scheme, VAAs could be deployed in a Universal Mobile Telecommunications Service Frequency Division Duplex (UMTS FDD), as well as cdma2000, as follows. Such a scenario is likely to arise where the mobile terminals are relatively stationary, for example, notebook computers or personal digital assistants at a conference, as compared to mobile telephones for example which often need data whilst moving. Such a situation will also mean that a relatively large number of users, for example between 20 and 100, will require delivery of data at approximately the same time. This places strain on the network in terms of capacity. As the mobile terminals are relatively stationary, the environment for transmission of data can be assumed to be slow fading. One or a group of mobile terminals may be experience bad channel conditions for a period of time whereas another mobile terminal or group of mobile terminals may experience good channel conditions for the same period of time. As described above the CC receives information from the mobile terminals on channel conditions, and the CC determines whether a VAA should be formed if the capacity of the system deteriorates. The CC utilises those mobile terminals in the good channel conditions in the VAA to relay data to those mobile terminals in the bad channel conditions. In this embodiment there should be at least one relaying mobile terminal (hereinafter "r-MT") in the VAA for each t-MT to achieve the best results. If the channel conditions deteriorate for a r-MT in the VAA then this should become a target mobile, assuming that there is another mobile terminal available to join the VAA. If channel conditions improve for a t-MT then it should join the VAA. This association and disassociation of mobile terminals from the VAA can be accomplished for example through interference measurement or a take back function where a mobile terminal is detached from a VAA, which can be optimised for battery life, interference level etc. In this embodiment the relaying can be accomplished using a variety of standards that utilise CDMA for example IEEE802.11, HiperLAN2, Bluetooth, Infrared, PLC. The transmission rates of data sent from the control terminal to the mobile terminals can be regulated by changing the spreading factor of the spreading code, the coding rate or rate matching attributes. Several encoding, transmission, relaying and detection schemes are possible as outlined below:

(1) It is assumed that a VAA group(s) is already formed and that a terminal within a VAA cell can act either as an r-MT or t-MT only. In this configuration a MT cannot be t-MT and r-MT at the same time. The data stream for each user within the serving sector or cell is appropriately encoded for m antenna elements of the control terminal. Each user is assigned a unique spreading code, which is the same for each control terminal antenna element. All data streams are then scrambled by the sector/cell specific scrambling code and sent out from all antenna elements in the same frequency downlink band $f_{1DL}$. Note that UMTS has three downlink ("DL"—control terminal to mobile terminal) frequency bands $f_{1DL}$, $f_{2DL}$ and $f_{3DL}$, and three uplink ("UL"—mobile terminal to control terminal) frequency bands, $f_{1UL}$, $t_{2UL}$ and $f_{3UL}$, available. First, each mobile terminal extracts its own data stream by locking to the appropriate spreading sequence. It is appropriately de-scrambled and de-spread until the narrowband signal is obtained. Note that no hard decision is to be performed. A r-MT is assumed to be in good channel conditions and therefore it is assumed that at least one r-MT transparently relays the entire received signal stream to at least one t-MT on frequency band $f_{2DL}$ or $f_{3DL}$. In this configuration the utilised frequency band $f_{1DL}$ is reserved for VAA only and power control is applied to the relaying links so as to reduce mutual interference in between the relaying links (for example the entire signal can be multiplied by a power control factor that can be controlled by the CC). Furthermore the VAA is organised by the CC so that synchronisation between members of the VAA is "inline" Inline synchronisation is achieved where the mutual difference in path distance is less than one chip duration, an approximate estimate of which can be calculated as [1/(number of chips per second)]×speed of light. For example, referring to FIG. 2 the Gold synchronisation code has a chip rate of 3.84 million bits per second, giving a single chip duration of $2.6 \times 10^{-7}$ s and a separation of approximately 78 m between mobile terminals to keep synchronisation inline. The t-MTs lock on to the strongest signal with their first fingers and with their remaining fingers on to the next strongest signal components, perform channel compensation and soft-combining with the direct signal component. Finally, the signal is decoded.

(2) The same encoding, modulation and transmission process is assumed as in (1). However, synchronisation is assumed to be staggered i.e. the mobile terminals have a separation of greater than one chip length. This allows the creation of stronger diversity paths at the t-MTs.

(3) The same encoding, modulation and transmission process is assumed as in (1). However, each r-MT compensates the main link channel before transparently relaying the signal stream to the t-MTs (i.e. channel estimation coefficients are used to compensate for phase shift in the control terminal to relaying mobile terminals).

(4) The same encoding and modulation process is assumed as in (1). However, the data stream is sent on the downlink frequency band $f_{1DL}$ to the r-MTs within a VAA or VAAs. The r-MTs then transparently relay the data to the t-MTs on frequency band $f_{2DL}$. Power control has to be applied to the relaying links such as to minimise mutual interference between the relaying links and between the relaying and main links. No frequency bands are reserved for VAA only.

(5) The same encoding, modulation and transmission process is assumed as in (1) and (4). However, relaying is accomplished on any of the remaining frequency bands $f_{2DL}$, $f_{3DL}$, $f_{1UL}$, $f_{2UL}$ or $f_{3UL}$, where the prevailing and generated interference is reduced. Note that possibly an uplink link might be cut and utilised for relaying purposes.

(6) The same deployments as in (1) to (5) are assumed. However, every mobile terminal of the VAA is simultaneously a r-MT and t-MT under control of the CC. This is particularly advantageous in fast fading channels, where channel conditions change rapidly, for example with mobile telephones.

(7) The same deployments as in (1) to (5) are assumed. However, each r-MT in the VAA retrieves the information for the t-MTs, regenerates it as describes above under "relay schemes" and relays it to the t-MTs.

(8) The same deployments as in (1) to (5) are assumed. However, each r-MT retrieves the information for the t-MTs, decodes it and stores the obtained packets (for example IP or physical layer) in a buffer for a given. These packets are then relayed only if requested by a t-MT.

(9) The same deployment as in (8) is assumed, however, the IP-packets are relayed through another interface such as mentioned above.

A second specific example is a TDD TDMA scheme employing CDMA, VAAs can be deployed in a Universal Mobile Telecommunications Service Time Division Duplex (UMTS TDD) as follows. Such a scheme is could be used in conference rooms and airport lounges where use of notebook computers and PDAs requiring access to external data networks is likely. The deployment of VAA(s) will increase capacity of the UMTS TDD system. Again, a group of VAA users are sent data with a user specific spreading sequence at a given time slot over a given duration of time slots. Once a VAA is setup then the mobile terminals with good channel conditions serve as r-MTs for all remaining t-MTs. There should be at least one for each t-MT and at least one t-MT for at least one r-MT. When channel conditions deteriorate for a r-MT then it should become a t-MT. When channel conditions improve for a t-MT then it should become a r-MT. With appropriate convergence layers (convergence of IP data to any wireless network), relaying can be accomplished by using any current or future access scheme or any of the following standards: IEEE802.11, HiperLAN2, Bluetooth, Infrared, PLC. Advantageously, IP packets are relayed by the r-MTs to the t-MTs. The relaying links could be utilised on a FAIL/ACKNOWLEDGEMENT basis or through a 'reserved' link during a pre-specified duration of time. The transmission rates of the data sent from the BS to the MTs can be regulated by changing spreading factors, coding rate and rate matching attributes. The same deployment configurations (1) to (9) as for the UMTS FDD case are possible.

B: CDMA/TDMA

In this scheme the main link uses CDMA, for example UMTS, and the relaying link uses TDMA, for example Global System for Mobile Communication (GSM) or derivatives. The first part of the CDMA/CDMA scheme as described above is applicable.

Once the data has been transmitted it reaches the mobile terminals, including those that are members of the VAA. Those relaying terminals of the VAA relay the data stream for the t-MTs. Referring to "relay schemes" above, the first method of transparent relaying is not feasible for this scheme as CDMA and TDMA operate in fundamentally different ways such that the relay mobile cannot pass on CDMA encoded data to a terminal configured for TDMA. In the second method of regenerative relaying each r-MT extracts, decodes, re-encodes and re-assembles the signal stream for the remaining n-u-1 t-MTs (remembering that there are a total of n mobile terminals out of which there are u mobile terminals in the VAA). Re-assembly allows a continuous signal stream, typical to CDMA based systems, to be split into a discontinuous signal stream, typical to TDMA based systems. At least one relay terminal then retransmits the re-assembled data streams to associated t-MTs during a specified time slot at a specified frequency. Note that time and frequency slots are controlled either by the network or a MT within a VAA acting as a CC. The third method of IP-relaying is the preferred embodiment of any hybrid access scheme, such as CDMA in the main link and TDMA in the relaying links. In such deployment, each r-MT retransmits only IP packets which were not received properly by a t-MT Note that incremental redundancy schemes (Page: 26 for example 1/3 rate encoders where one bit goes in and three come out. Thus, a packet of length n will become 3 n. Firstly n bits are transmitted, and if the packet is not decoded properly, the next n are sent such that 2 n are available at the receiver) could equally be deployed, where additional packet redundancy is provided by the relay mobile terminals at each unsuccessful decoding of a packet at the t-MT.

C: CDMA/OFDMA

In this scheme the main link uses CDMA, for example UMTS, and the relaying link uses OFDMA, for example Global System for Mobile Communication (GSM) or derivatives. The first part of the CDMA/CDMA scheme as described above is applicable.

Once the data has been transmitted it reaches the mobile terminals, including those that are members of the VAA. Those r-MTs of the VAA relay the data stream for the t-MTs. Referring to "relay schemes" above, the first method of transparent relaying is not feasible for such embodiment as CDMA and OFDMA operate in fundamentally different ways such that the relay mobile cannot pass on CDMA encoded data to a terminal configured for OFDMA. In the second method of regenerative relaying each r-MT extracts, decodes, re-encodes and re-assembles the signal stream for the remaining n-u-1 t-MTs (remembering that there are a total of n mobile terminals out of which there are u mobile terminals in the VAA). At least one r-MT then retransmits the re-assembled data streams to associated t-MTs during a specified time slot at a specified frequency utilising a specified number of sub-carrier frequency bands. Time, frequency slots and sub-carrier bands are controlled either by the network or a MT within a VAA acting as a CC. The third case of IP-relaying is the preferred embodiment of such deployment.

Each r-MT retransmits only IP packets that were not received properly by the target mobile, utilising OFDMA as the relaying access scheme.

D: TDMA/TDMA

Figure 7:
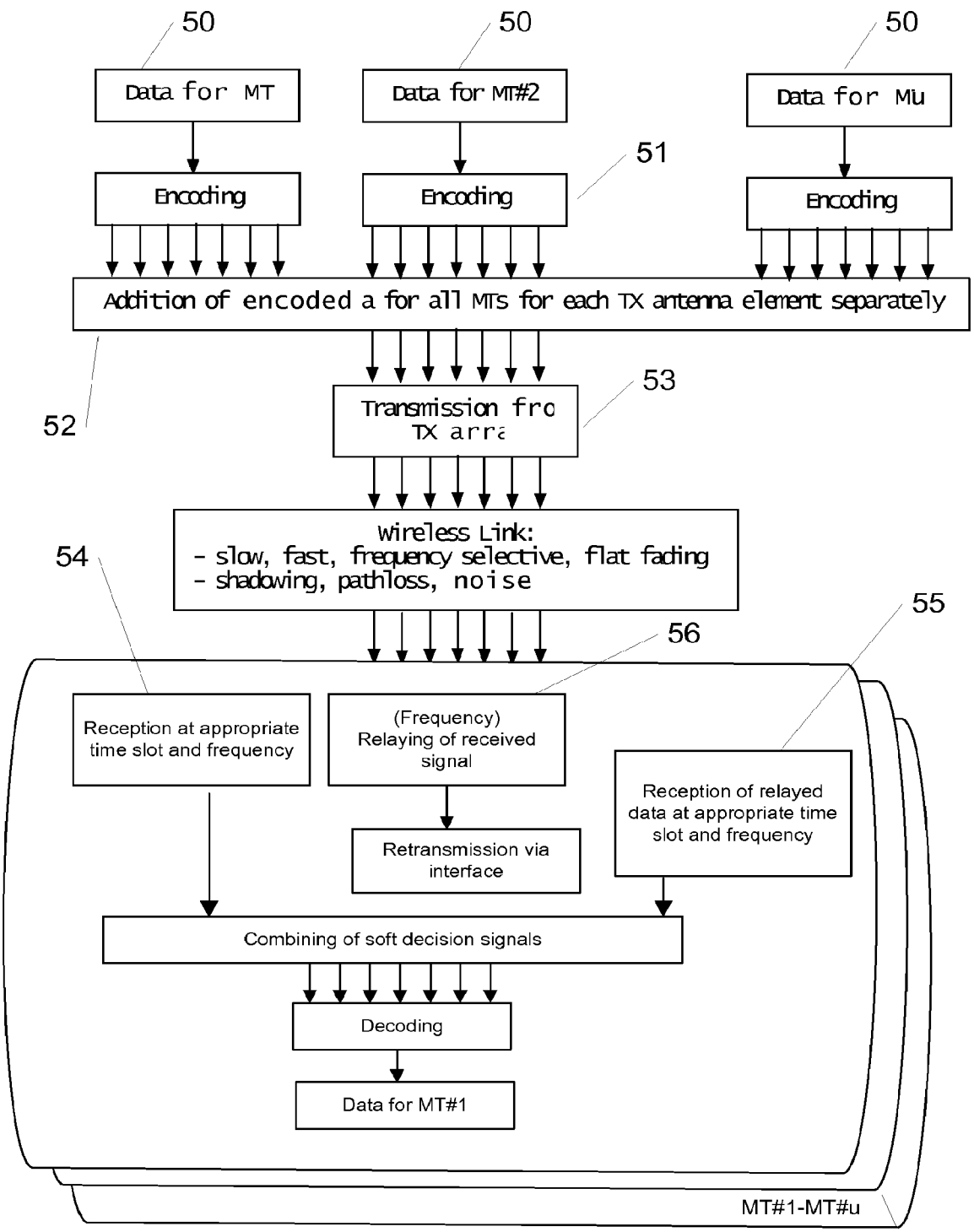
FIG. 7 is a flowchart showing the stages of operation of a data communication system in accordance with the present invention based on a TDMA and/or OFDMA access scheme.

In this scheme the main and relaying links are based on TDMA, as shown in FIG. 7, in which data 50 for u mobile terminals forming a VAA is appropriately encoded at stage 51 for transmission from m antenna elements of a control terminal (not shown). This data is to be transmitted over k time slots and 1 frequency bands, where u=k·1. This is in accordance with known schemes for example GSM. At stage 52 the remaining data that has been encoded for the remaining n-u mobile terminals in the cell or sector is added to the data for the u mobile terminals and is transmitted from the control terminal at stage 53. The electromagnetic waves are attenuated and de-correlated as aforementioned.

Each of the u mobile terminals of the VAA receives its own data at a given time slot and frequency band at stage 54 and relayed data at stage 55. It also receives data for one or more t-MTs at another time slot(s) and frequency band(s). The r-MTs relay the data for the target mobile at stage 56 at a different time slot and frequency band to that it was received on. This is to ensure that the interference between the main and relaying links is reduced. The CC determines which time slots and frequency bands are to be used using radio resource management. Because the relaying frequency bands are used comparatively locally i.e. within or just outside a VAA the same time slots and frequencies can be re-used within adjacent VAAs without degrading system capacity. This means that a number of frequency bands can be reserved for VAA use by the CC. The maximum number of time slots r needed so that each of the u r-MTs can relay data to the u-1 possible t-MTs is given by r=u(u-1)(u-2)...2·1=u!. The occupation of less time slots is possible if more frequency bands are used simultaneously or not all r-MTs relay information, or if some r-MTs relay at the same time slot and same frequency band due to inline synchronisation, as described above.

Referring to "relay schemes" above, the first method of transparent relaying each r-MT simply frequency-translates and relays the entire data frame, either with staggered or inline synchronisation. At least one t-MT receives the relayed signal and extracts its own signal. Finally, within each t-MT all extracted signal streams are (soft) combined and decoded. In the second method of regenerative relaying each r-MT extracts, decodes, re-encodes and re-assembles the signal stream for the t-MTs. At least one r-MT then retransmits the data to associated target mobiles during a specified time slot at a specified frequency. In the third method of IP-relaying a r-MT retransmits only IP packets, which were not received properly by the t-MT, utilising TDMA at a pre-specified time slot and frequency band.

A first specific example of a TDMA/TDMA transmission scheme a VAA(s) can be employed in a GSM network for example GPRS or EDGE as follows. If technology allows the mobile terminals shall be devised so as to relay the information transparently, otherwise regenerative relaying should be deployed. For the setup and release of VAA cells the control terminal has to have information on the each mobile terminal's VAA membership settings. The main resource of this system is the available channel capacity in form of frequency bands and time slots. A take-back function can be deployed that is optimised for the mobile terminal battery-power or generated co-channel or adjacent channel interference. Several encoding, transmission, relaying and detection schemes are possible as outlined below:

(1) The data stream for each user within the serving sector/cell is appropriately encoded for in antenna elements of the control terminal. Each mobile terminal is assigned a unique time slot and frequency band, which is the same for each antenna element. All data streams are then sent out from all m antenna elements in the frequency downlink bands. Note that GSM has 124 downlink (DL) and 124 uplink (UL) frequency bands available. The assignment of time slots and frequency bands is such that all mobile terminals belonging to the same VAA group are served in consecutive time slots, but possibly on different frequency bands. However, for simplicity the frequency band should be the same. If the number of VAA r-MTs exceeds the number of time slots in a frame (8 in GSM)) or if interference becomes predominant then more than one frequency band can be deployed. The number of reserved frequency bands utilised for relaying should be one less than the number of r-MTs within a VAA group i.e. u-1. Since the reserved frequencies bands are used only very locally they can be re-used by other adjacent VAA groups, increasing capacity. If u r-MTs form a VAA group then u-1 receives the data intended for r-MT #1 at time slot #1 and frequency band #1. Each amplifies the data stream and frequency translates it onto one of the locally reserved VAA frequency bands, where each r-MT utilises a different band. Thus a t-MT #1 receives on frequency band #1 the direct link information and on frequency bands $\#1_{VAA}$-$\#(u\text{-}1)_{VAA}$ the remaining relayed information. This happens at the same time slot #1 where the relayed streams are slightly delayed due to additional propagation and processing/translation time. The delay in the relaying links should not exceed the guard times in between the time slots. If it does then the either the guard time has to be increased or only half of the r-MTs can participate in a VAA group since one time slot must be left unused if the relayed time slot generates too much interference. The process is repeated for the remaining u-1 r-MTs.

In this scenario it will be most likely that the channel will appear to be fast fading due to low data rates. Accordingly, every r-MT participating in a VAA group should be simultaneously a r-MT and a t-MT. With increased transceiver complexity in the control terminal more than one frequency band could be relayed. It is not mandatory for frequency bands to be reserved for VAA relaying. Alternatively an interference measurement can be performed within a VAA and relaying can take place in only those bands with low interference.

(2) The same encoding, modulation, transmission and relaying process as in (1). However, if the CC detects a slow fading channel then only those mobile terminals in good channel conditions should act as relaying terminals.

(3) The same encoding, modulation and transmission process as in (1) and all channels involved are slow fading and thus assumed to be known. For certain encoding techniques, such as space-time trellis codes, the data can be relayed at the same frequency band and same time-slot (inline synchronisation). The addition of all signal streams, which is usually done in the receiver, is thus performed in the air interface. Such system is advantageously deployed for strong line-of-sight (LOS) relaying links, which obey Rician statistics and thus approach a Gaussian channel. Note that either synchronisation is necessary such that the relaying carrier frequencies do not cancel each other, or a CSI of the relaying links. The decoding process follows the one in (1).

(4) The same encoding, modulation and transmission process as in (1). However, each r-MT regenerates the data streams and relays it as deployed in (1)-(3) utilising either inline or staggered synchronisation.

(5) The same deployments as in (1)-(4) are assumed. However, each r-MT retrieves the information for the other t-MTs, decodes it and stores the obtained packets in a buffer for a given time. These packets are then relayed only if requested by a t-MT.

(6) The same deployment as in (5) is assumed. However, the IP-packets are relayed through another interface such as mentioned above.

E: TDMA/OFDMA

In this transmission scheme the main link is based on TDMA and the relaying link is based on OFDMA. Accordingly the first part of the TDMA/TDMA scheme described above is relevant for this scheme.

At least one r-MT of the VAA group receives the data stream for at least one other t-MT within the VAA group at given time slot(s) or frequency band(s). Referring to the "relay scheme" section above, the first method of transparent relaying is not feasible in such deployment since TDMA and OFDMA operate on fundamentally different principles. In the second method of regenerative relaying each r-MT extracts, decodes, re-encodes and re-assembles the data stream for the t-MTs. At least one r-MT then retransmits the data to associated t-MTs during a specified time slot at a specified frequency utilising a specified number of sub-carrier frequency bands. In the third method of IP-relaying a r-MT retransmits only IP packets, which were not received properly by a t-MT, utilising OFDMA at a pre-specified time slot, frequency band and number of sub-carriers.

In a specific example of such a system, the VAA is deployed within an IEEE802.11 or HiperLAN2 network as follows. Since both standards rely on an OFDMA/TDMA/TDD system, the same as for the TDMA/TDMA embodiment above holds with the only difference that the modulation is based on OFDMA and uplink and downlink frequency bands are shared in time (TDD). A further difference is that the slot length may vary from user to user due to varying PDU train length.

F: OFDMA/OFDMA

In this transmission scheme the both the main link and relaying link are based on OFDMA. OFDMA based systems are usually hybrids of TDMA based systems. In such an embodiment the data streams for u r-MTs forming a VAA are appropriately encoded for m antenna elements of the control terminal, modulated onto appropriate sub-carrier frequency bands and transmitted. Each of the u r-MTs receives its own data stream at given sub-carrier frequency bands. At least one r-MT in the VAA further receives the signal for at least one t-MT in the VAA. Referring to the "relay scheme" section above, in the first method of transparent relaying the r-MT simply frequency-translates and relays all necessary sub-carrier frequency bands, either with staggered or inline synchronisation. At least one t-MT receives the relayed signal and extracts its own signal. Finally, within each t-MT all extracted signal streams are (soft) combined and decoded. In the second method of regenerative relaying each r-MT extracts, decodes, re-encodes and re-assembles the signal stream for the t-MTs. At least one r-MT then retransmits the data to associated t-MTs utilising a specified number of sub-carrier frequency bands. In the third method of IP-relaying a r-MT retransmits only those IP packets that were not received properly by the t-MT, utilising OFDMA at a number of given sub-carriers.

----------oOo----------

In another embodiment the main and relaying links are based on any combination of transmission schemes described above or on any combination of current or future access schemes. In such deployment at least two VAA groups have to communicate with each other, where one VAA group acts as a virtual transmitter (TX-VAA) and the other as a virtual receiver (RX-VAA). The RX-VAA can be deployed as in the previous embodiments of the invention with the only difference that the signal stream does not stem from a control terminal but from another VAA. The TX-VAA receives the data stream intended for the t-MTs of the RX-VAA either from a control terminal or from another TX-VAA. In the former case, the RX-VAA is served straight from the control terminal. In the latter case, the RX-VAA is served through a multi-hop ad-hoc VAA network. The originator of the information stream, which could be a control terminal with a single antenna, a control terminal with an antenna array or any mobile terminal with single antenna or antenna array, transmits the data stream to a VAA, which acts as a TX-VAA. The data could be encoded using any of the aforementioned encoding methods and could be transmitted using any of the aforementioned transmission schemes. Each MT of the TX-VAA receives the data stream, appropriately decodes it and re-encodes it with any of the aforementioned encoding schemes assuming an m-element antenna array is available, where in denotes the number of antenna elements available within the TX-VAA, and relays the encoded data stream to the RX-VAA. In use, the network would only benefit if the distances between the all receivers and transmitters using weak or no coding is very low, so as to guarantee a good signal quality even for high data rate streams. Again, a BS or CC initiated staggered or inline synchronisation can be achieved for each TX-VAA.

In another embodiment of the invention the VAA is deployed within a Bluetooth (BT) network as follows. Current and future BT standards rely on either TDMA or CDMA based technology. Therefore, the same as for the UMTS FDD and GSM embodiment of the invention hold.

For all aforementioned embodiments of the invention the transceivers of the mobile terminals can be based on Software Defined Radio (SDR). This gives VAA the flexibility to perform all necessary algorithms such as relaying, decoding, frequency translating, etc. under the control of software. Thus filters, centre frequencies, etc. can be adapted dynamically. Furthermore, the software to setup and maintain a VAA group can be downloaded using SDR download mechanisms.

In another embodiment of the invention the VAA groups can also form ad-hoc single frequency networks with obvious implications for capacity and routing algorithms, as only one frequency needs to be used.

Where the invention is utilised in a cellular data communication system, for example a telecommunications network, a VAA group can be served by more than one control terminal. Such situation might arise if at least one mobile terminal of the VAA is in a soft-handover between to or more case stations. The data stream from both control terminals could be encoded appropriately so as to make use of the additional antenna elements. For example, if both control terminals have six antenna elements and the data stream was encoded assuming a six-antenna element array, then in soft-handover the data shall be encoded as if a twelve-element TX array was available, resulting in greater capacity.

It is preferable, although not essential that the number of mobile terminals within a VAA should equal or exceed the number of transmit antenna elements of the control terminal or RX-VAA. Maximum coding gain is achieved if the number of MTs equals the number of transmit antenna elements. Additional MTs yield diversity gain.

Figure 8:
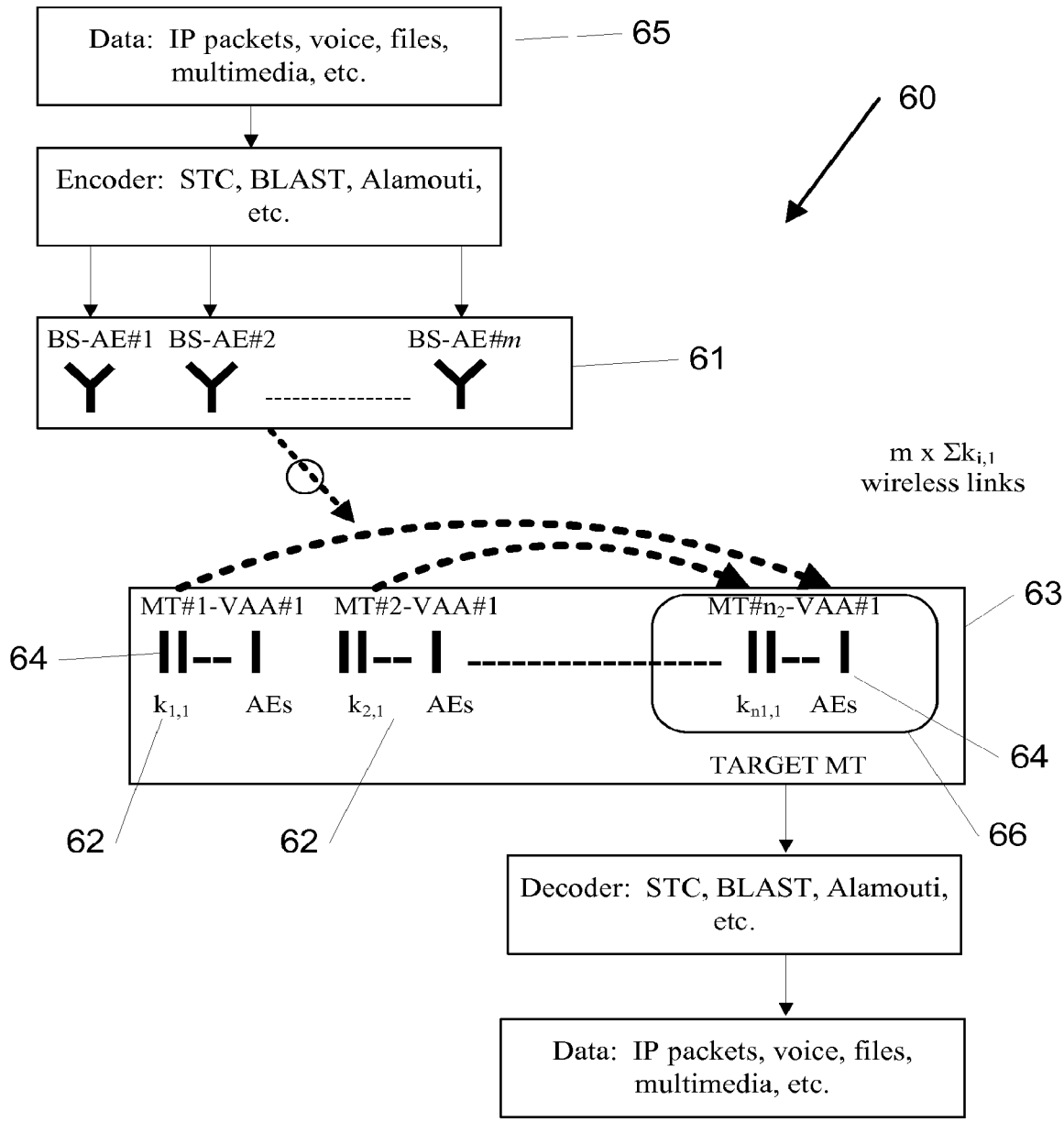
FIG. 8 is a schematic view of part of a third embodiment of a data communication system in accordance with the present invention in which one virtual antenna array has been defined, shown employed in a downlink mode of operation.

Referring to FIG. 8 a third embodiment of a data communication system is generally identified by reference numeral 60 that comprises a control terminal 61 comprising m antenna elements. There is a plurality of mobile terminals 62 that are part of a VAA 63 that has been set up in accordance with the rules described above. Each mobile terminal 62 is free to move within the cell served by the control terminal 61. The number of mobile terminals 62 is greater than the number of antenna elements of the control terminal. If a mobile terminal 62 moves out of the cell, another control terminal (not shown) will serve it. Each mobile terminal comprises a plurality of antenna 64. In use, data 65 is received from higher layers of the network at the control terminal 61 and appropriately encoded for the transmission scheme in use. The data 65 is transmitted from the control terminal 61 and the mobile terminals receives it and all bar a t-MT 66 re-transmit the data 65 for the benefit of the target mobile 66. The target mobile 66 receives the data 65 directly from the control terminal 61 and also from each of the other r-MTs 62 in the VAA 63. Using its plurality of antenna 64 the t-MT 66 locks on to the strongest signal (likely to be the line of sight component) and then on to the next strongest signals with its remaining antennae (most likely to be the relayed signals from the r-MTs 62). In this way the t-MT 66 obtains a much better signal quality, resulting in higher system capacity. It will be noted that in this embodiment the VAA 63 acts as a receiver for the t-MT 66, the link between the VAA 63 and the control terminal 61 being a single hop.

Figure 9:
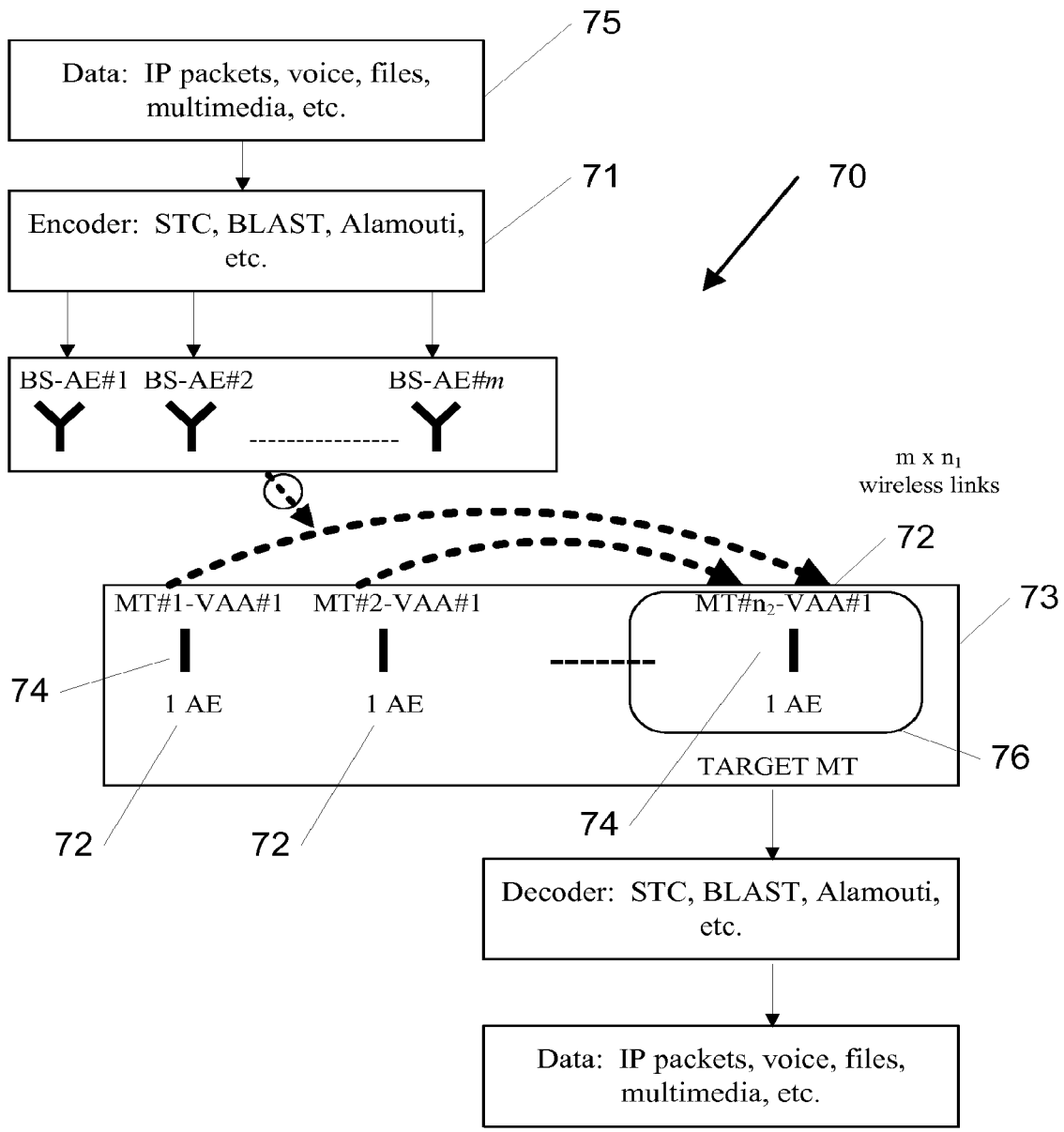
FIG. 9 is a schematic view of part of a fourth embodiment of a data communication system in accordance with the present invention in which one virtual antenna array has been defined, shown employed in a receiving mode of operation.

Referring to FIG. 9 a fourth embodiment of a data communication system is generally identified by reference numeral 70 that is similar to the data communication system 60 with like numerals indicating like parts. The main difference is that each mobile terminal has only one antenna 74, which is the case for mobile telephones for example.

Figure 10:
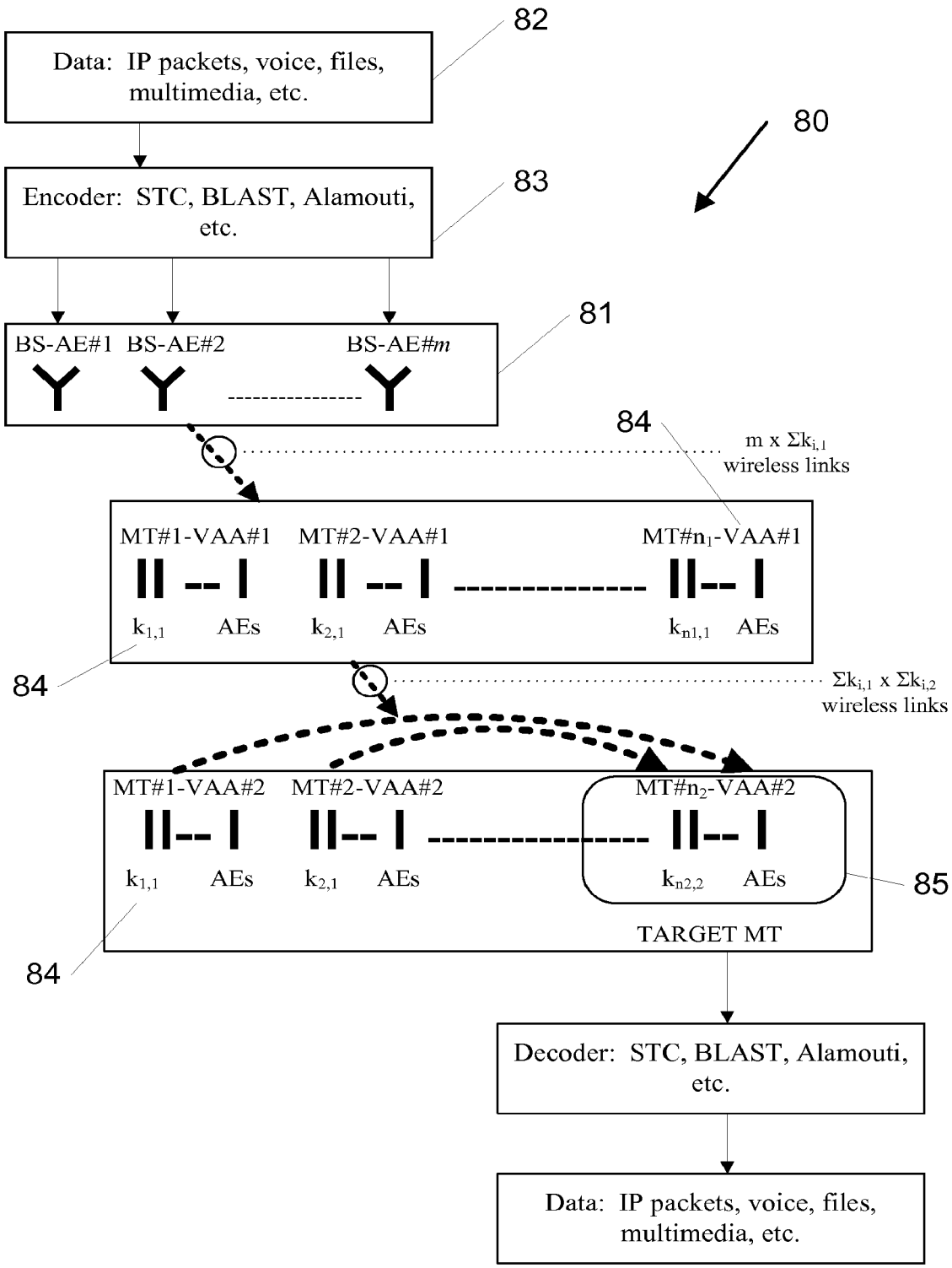
FIG. 10 is a schematic view of part of a fifth embodiment of a data communication system in accordance with the present invention in which two virtual antenna arrays have been defined, the first employed in a transmitting mode of operation and the second employed in a receiving mode of operation.

Referring to FIG. 10 a fifth embodiment of a data communication system is generally identified by reference numeral 80 that comprises a control terminal 81 having m antenna elements. A plurality of mobile terminals 84 in the cell have been divided into to two VAAs, VAA#1 and VAA#2 each have $n_1$ and $n_2$ mobile terminals respectively. Each mobile terminal 84 of VAA#1 has $k_{i,1}$ antenna elements and each mobile terminal 82 of VAA#2 has $k_{i,2}$ antenna elements where i is the number of each terminal in the VAA In use data 82 is received from the backbone of the network and is appropriately encoded in an encoder 83. The proximity of VAA#1 to the control terminal may allow for little or no coding of the data (since there is likely to be a strong signal with little or no fading). It is transmitted from the control terminal 81, the number of wireless links being given by $m \times \Sigma k_{i,1}$. VAA#1 receives the data and each terminal 84 extracts its own data and relays on either all of the data 82 or part of the data 82 depending on the relay transmission scheme used. The relayed data is received by the mobile terminals 84 in VAA#2 who also extract their data and then relay on the appropriate data to a target mobile terminal 85, the number of wireless links now being given by $\Sigma k_{i,1} \times \Sigma k_{i,s}$. The target mobile 85 then receives a number of copies of the signal, each of which is usually of better quality than the multipath signals, and is able to extract and decode the relevant data.

Figure 11:
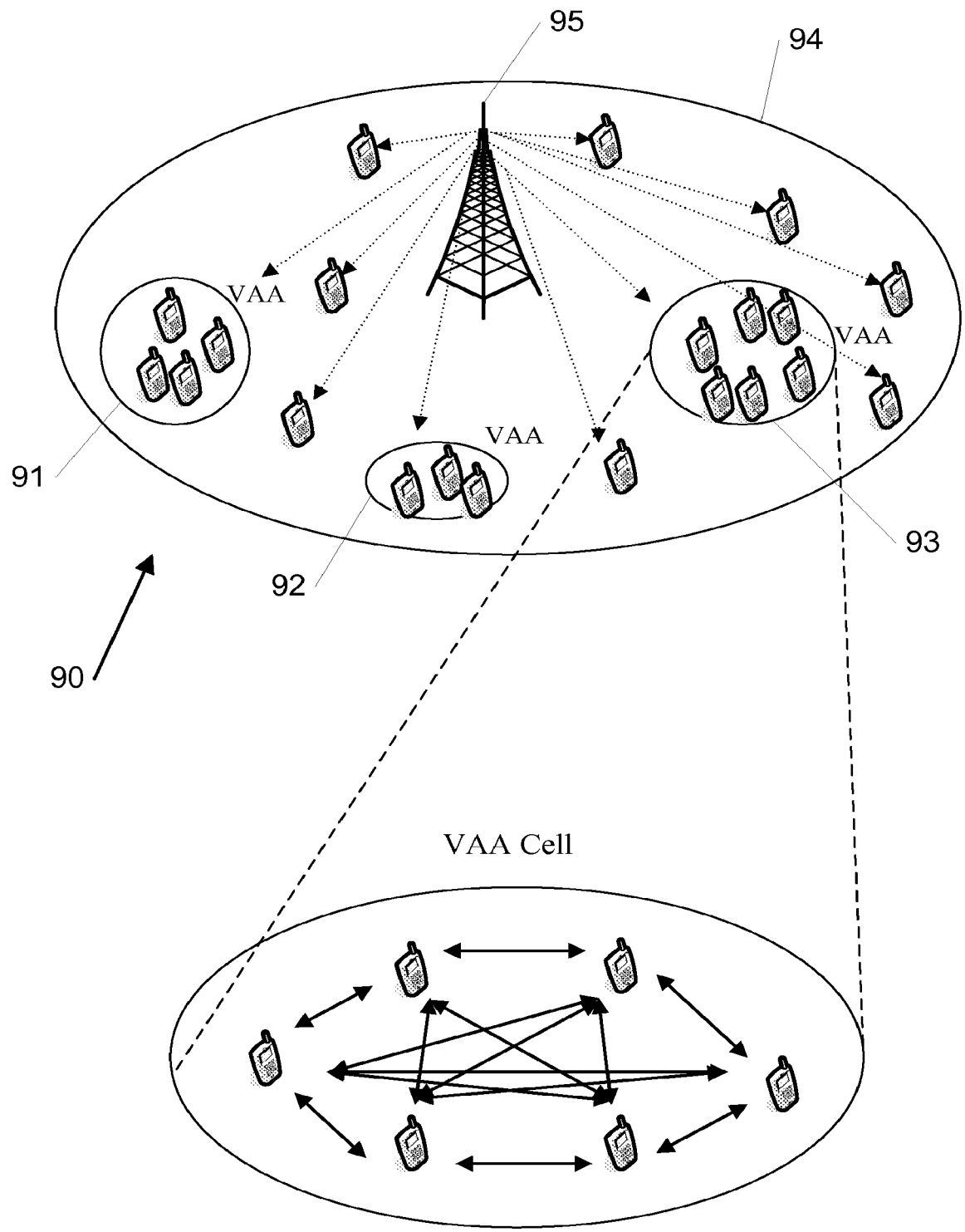
FIG. 11 is a schematic view of a sixth embodiment of a data communication system in accordance with the present invention showing a plurality of virtual antenna arrays employed therein.

Referring to FIG. 11 a sixth embodiment of a data communication network is generally identified by reference numeral 90 that illustrates schematically how several VAAs 91, 92 and 93 can be set up in a cell 94 around a control terminal 95. It will be noted that not all of the mobile terminals in the cell have been utilised in the VAAs. This is because the VAAs have been set up in "hot-spot" areas where a large number of mobile terminals are closely arranged, as might happen at a conference or hotel for example.

Figure 12:
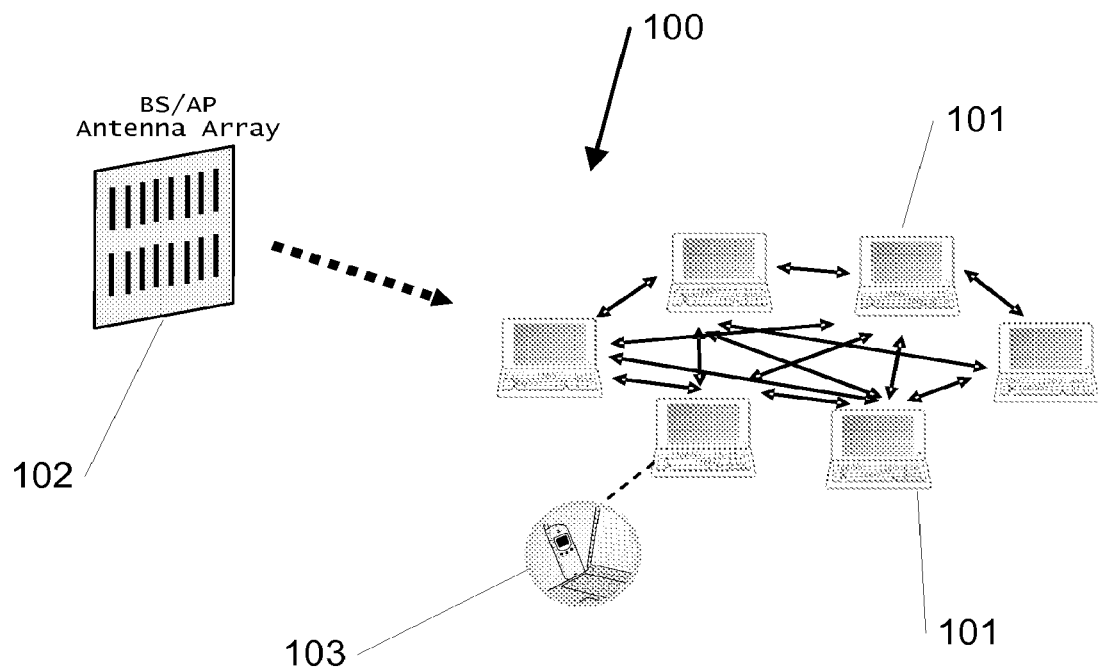
FIG. 12 is a schematic view of a part of a seventh embodiment of a data communication system in accordance with the present invention.

Referring to FIG. 12 a seventh embodiment of a data communication network is generally identified by reference numeral 100 that comprises a wireless local area network formed from a plurality of notebook computers 101. Each notebook computer 101 sends and receives data to and from a control terminal 102 via a mobile telephone 103 or PCMCIA card. The notebook computers have been formed into a VAA under control of the control terminal 102. This mitigates the effects on the network of one or more of the notebook computers 101 being in a fade. This is particularly useful with portable computers as users randomly position their terminal with respect to the control terminal.

Figure 13:
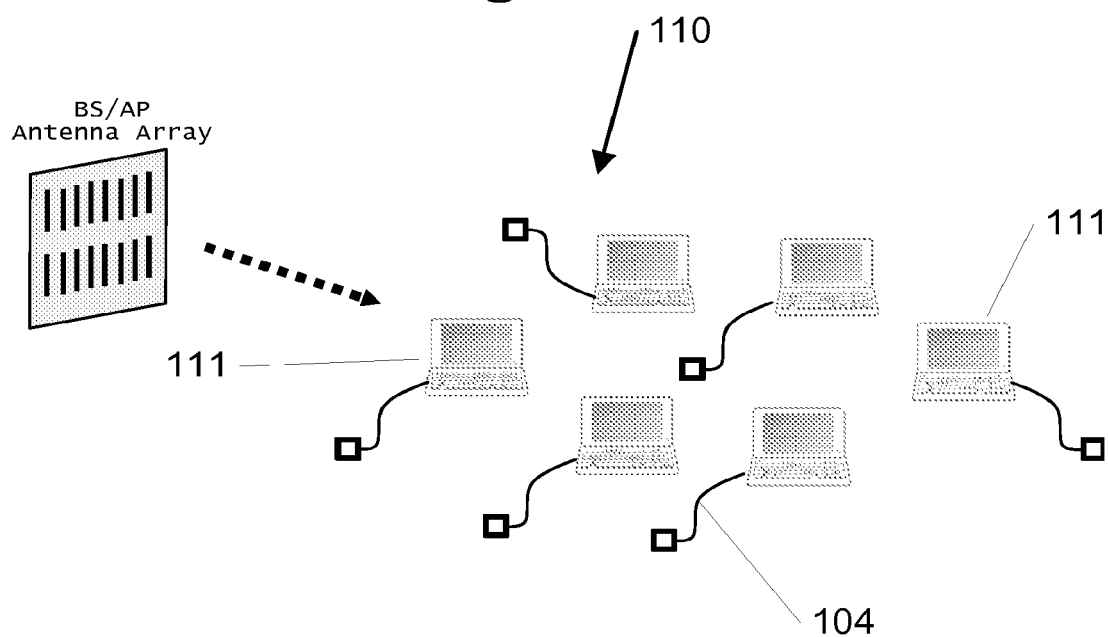
FIG. 13 is a schematic view of part of a eighth embodiment of a data communication system in accordance with the present invention.

Referring to FIG. 13 a eighth embodiment of a data communication network is generally identified by reference numeral 110 that comprises a wireless local area network formed from a plurality of notebook computers 111. The embodiment is similar to that shown in FIG. 12 except that the relaying link between notebooks in the VAA is accomplished via the power supply network 104.

Figure 14:
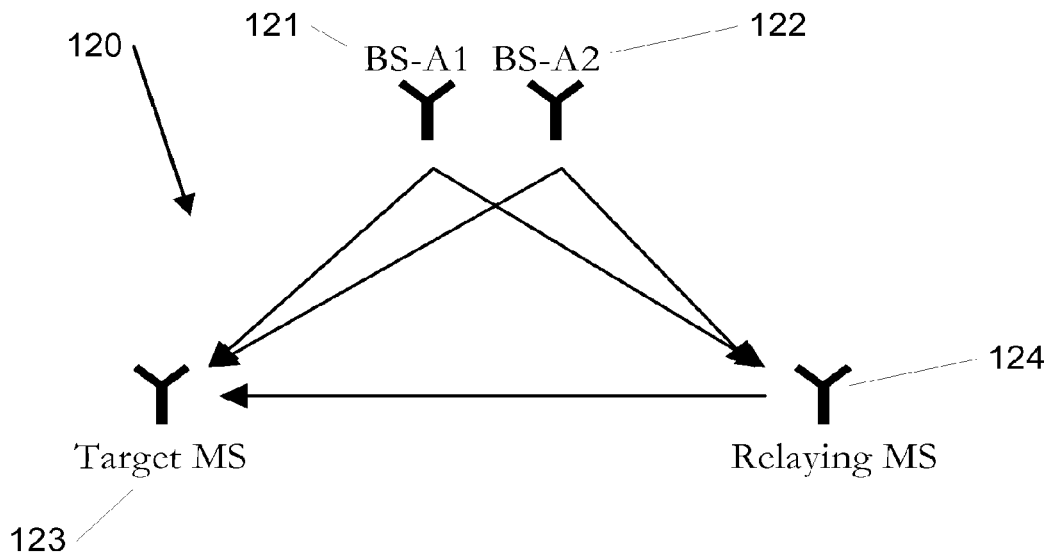
FIG. 14 is a schematic view of a ninth embodiment of a data communication system in accordance with the present invention.
Figure 15:
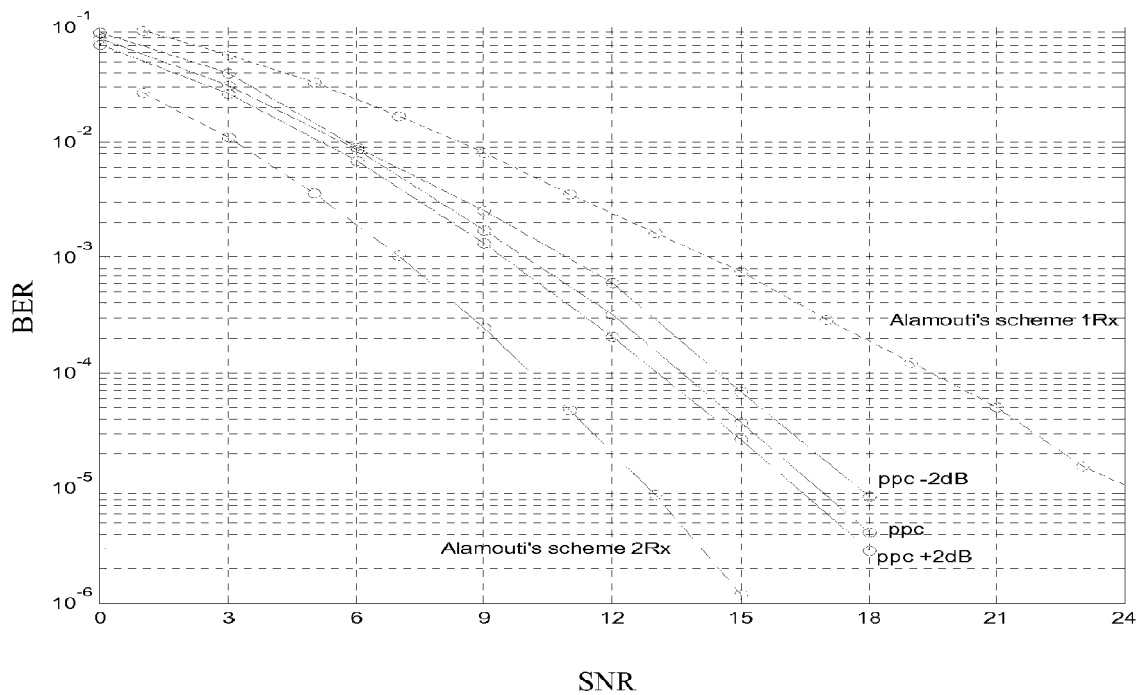
FIG. 15 is a graphical representation of bit error rate (y-axis) against signal to noise ratio (x-axis) for the data communication system of FIG. 11.

Referring to FIG. 14 an ninth embodiment of a data communication system is generally identified by reference numeral 120 that comprises two control terminals 121 and 122, and two mobile terminals 123 and 124. Data received at the control terminals 120 and 121 is encoded accordingly to a (2,2) Alamouti scheme (see paper mentioned in introduction). However, in accordance with the invention one mobile terminal 124 relays data to the other mobile terminal 123. This may happen under control of one of the control terminals 121 and 122 if one of the mobile terminals moves into a fade or if channel conditions worsen. FIG. 15 shows the results graphically with a non-perfectly operating power control routine on the relaying link for the scheme of FIG. 2, if the relaying link is stronger or weaker than the original data stream. The deviation from the perfect power control (ppc) case was assumed to be ±2 dB.

Figure 16:
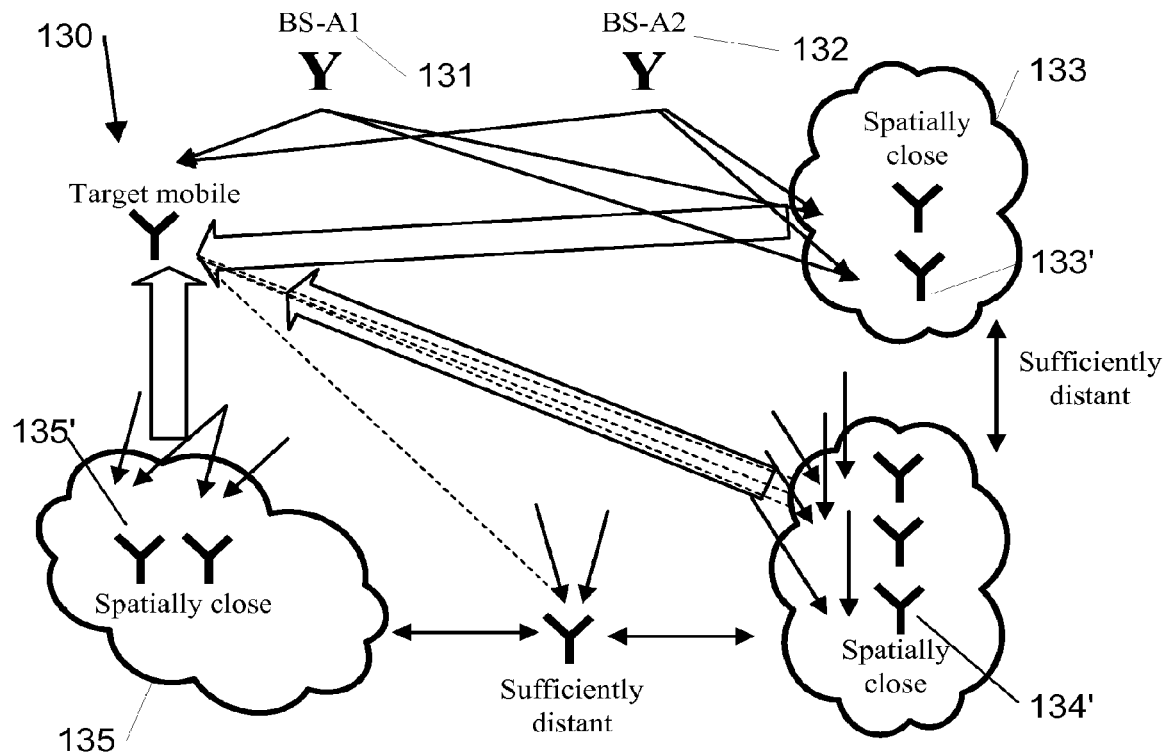
FIG. 16 is a schematic view of a tenth embodiment of a data communication system in accordance with the present invention.

Referring to FIG. 16, tenth embodiment of a data communication system is generally identified by reference numeral 130 that is a CDMA based transmission scheme and that comprises two control terminal transmitters 131 and 132. The control terminals have defined VAAs 133, 134 and 135 in which the individual mobile terminals 133', 134' and 135' receivers are close enough together so that each mobile terminal is in chip-range of all the others in that VAA and t-MT Furthermore each VAA 133, 134 and 135 are far enough apart to be outside chip-range (i.e. the duration of one chip) of each other VAA. In this way interference and power consumption are minimised as well as permitting the same spreading codes or scrambling codes to be used in each VAA. Each of the mobile terminals 133', 134' and 135' receives a signal from each of the control terminals 131 and 132 and each of the VAAs 133, 134 and 135 retransmits the signal to the target mobile in that VAA. Each group is out of chip-range of the other groups and so each group is distinguishable from the other groups through an appropriate RAKE receiver. The target mobile detects the strongest signals, combines them and retrieves the initial signal. The scheme was found to operate at its best for R-1 VAAs, where R is the number of fingers of the RAKE receiver in the target mobile.

Figure 17:
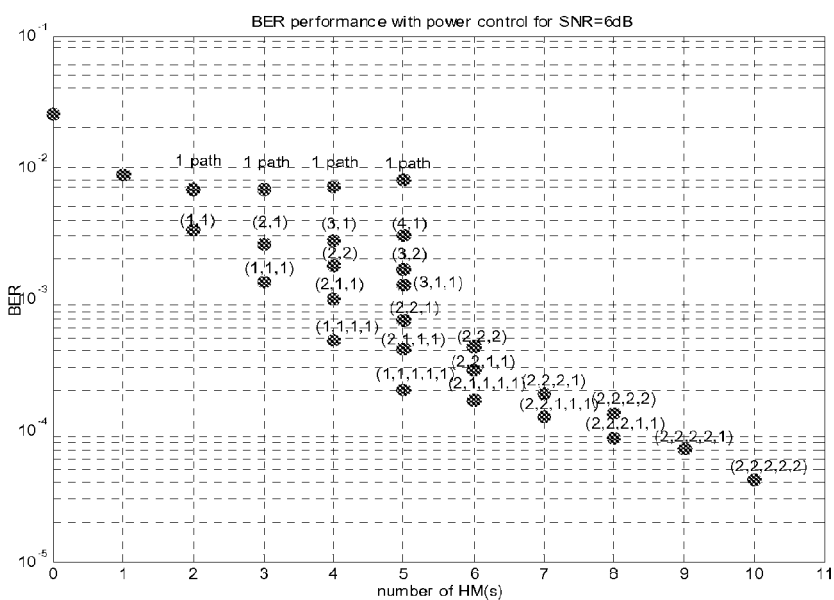
FIG. 17 is a graphical representation of the bit error rate (y-axis) against the number of users in the virtual antenna arrays of FIG. 13.

FIG. 17 shows the dynamic behaviour of the scheme presented in FIG. 16. The performance of two users in a group is the same as for more than two users in a group and does not deteriorate, which applies to the case of two control terminal antennas, one receiver antenna within the handset and the appropriate number of supporting users to emulate the (n,m) transceiver structure case. A SNR of 6 dB was fixed and the BER analysed with respect to a dynamic number of helping users in the virtual antenna array group and a changing number of uncorrelated paths. The labelling shows the number of terminals that are out of and within chip length.

Figure 18:
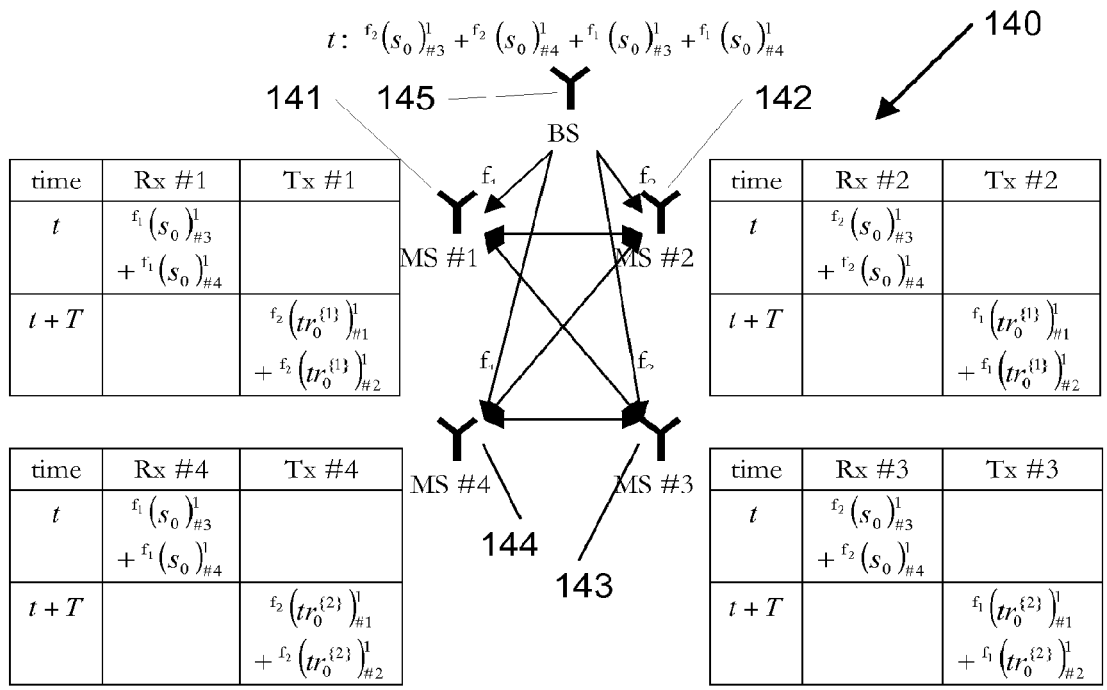
FIG. 18 is a schematic illustration of an eleventh embodiment of a data communication system in accordance with the present invention, utilising two frequencies and two scrambling codes.

Referring to FIG. 18 a eleventh embodiment of a data communication system is generally identified by reference numeral 140 that comprises a control terminal 145 and four mobile terminals 141, 142, 143 and 144. The system is a (2,2) forced synchronised VAA Trellis encoded CDMA transmission scheme. The control terminal 145 transmits the signal for mobile terminals 142 and 143 to mobile terminals 141 and 144 on frequency $f_1$, and the signal for the mobile terminals 141 and 144 to the mobile terminals 142 and 143 on frequency and $f_2$ as shown. The symbols for the 'right' group 142 and 143 are sent to the 'left' group 141 and 144 and vice versa. The signals are Trellis encoded and retransmitted to the other group. The scheme is advantageous for more than two relays per group.

Figure 19:
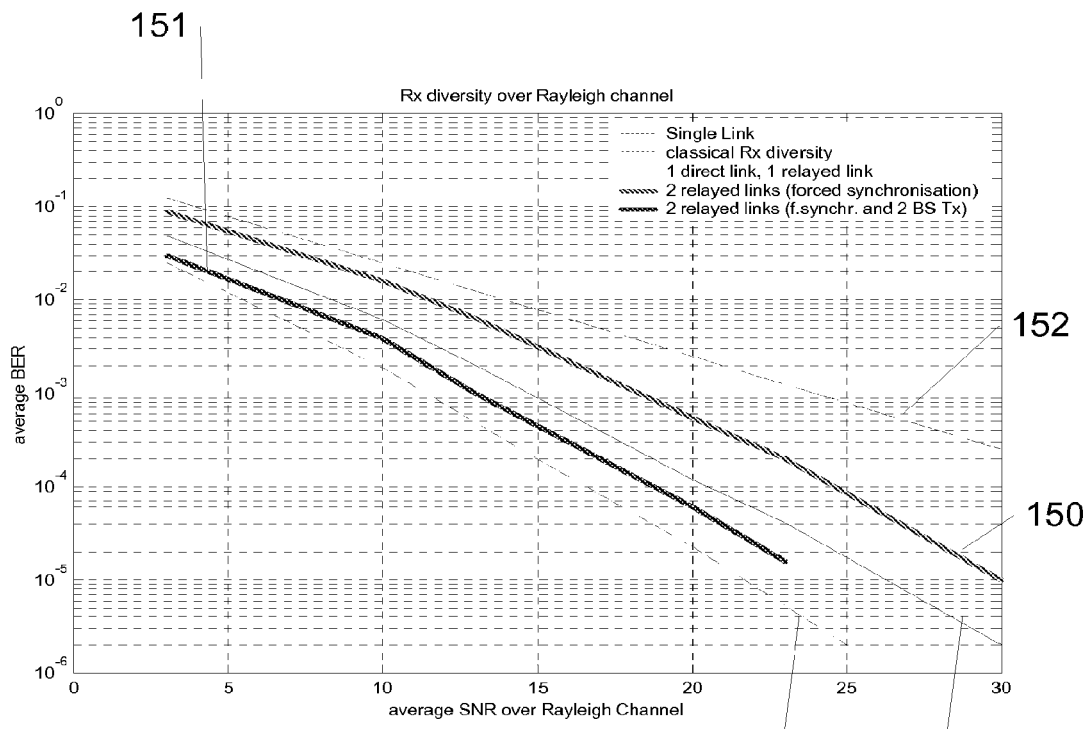
FIG. 19 is a graphical representation of bit error rate (y-axis) against signal to noise ratio (x-axis) for the system of FIG. 15.

Referring to FIG. 19 the results of a computer simulation assuming a normalised Rayleigh channel of the system of FIG. 18 are shown compared with various other transmission schemes. Curve 150 shows the results of the system of FIG. 18. Curve 151 shows the results of the system of FIG. 18 with participation of an extra control terminal. Curve 152 shows the results obtained with a single link i.e. each mobile terminal receives data directly from the control terminal with no relaying. Curve 153 shows the results of "classic" receive diversity. Curve 154 shows the results obtained using one direct link and one relayed link. As can be seen with only one control terminal the bit error rate is not much improved over the single link scenario. However, the introduction of a second control terminal results in a large improvement that is nearly as good as the classic receive diversity set up.

Figure 20:
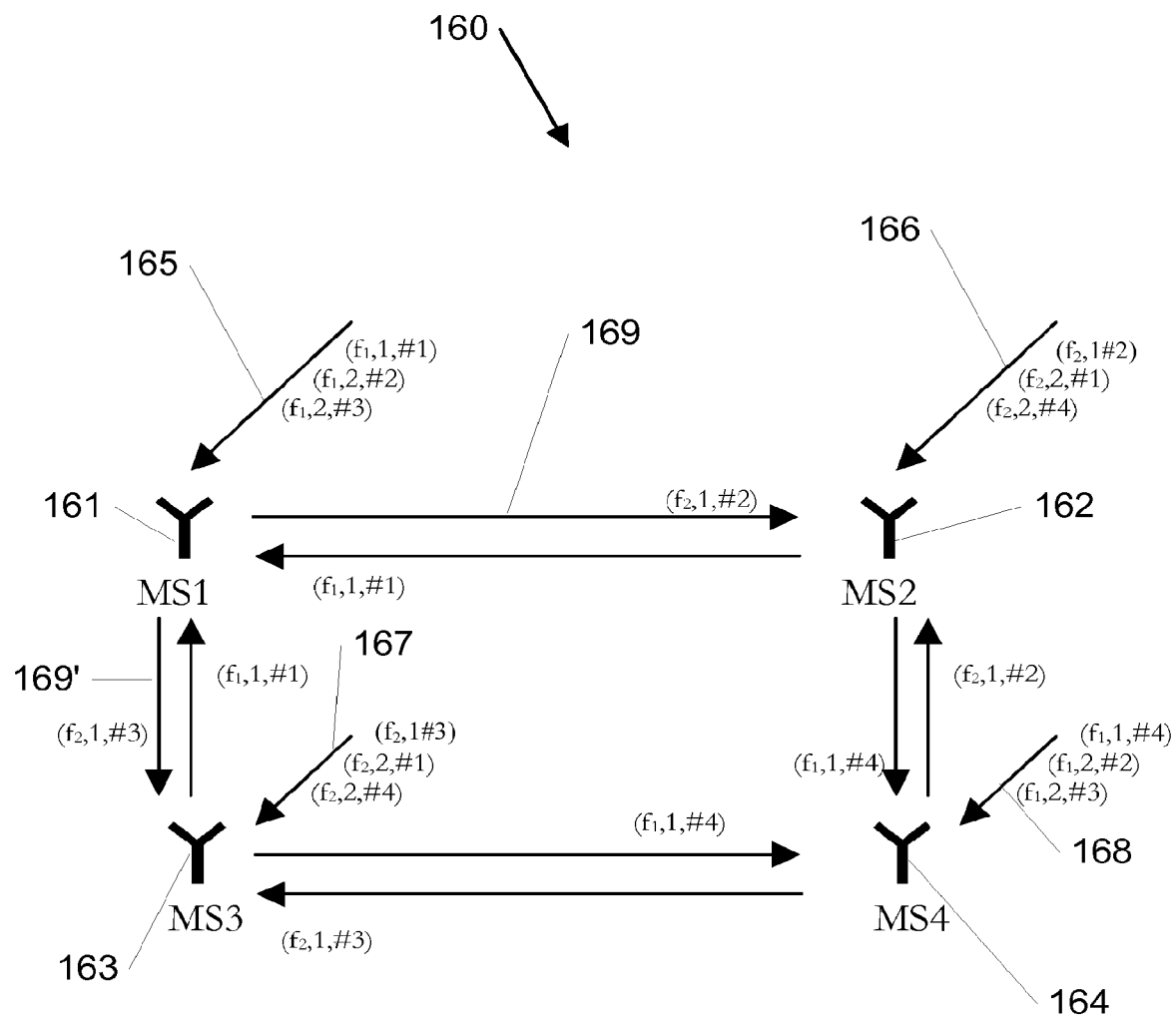
FIG. 20 is a schematic illustration of a twelfth embodiment of a data communication system in accordance with the present invention.

Referring to FIG. 20 an twelfth embodiment of a CDMA based data communication system is generally identified by reference numeral 160 that comprises 4 mobile terminals 161, 162, 163 and 164 forming a VAA are used in a (1,3) MRRC (maximal ratio receive combining) receive diversity scheme. The labelling of the signals is (frequency, scrambling code and spreading code). Each mobile terminal has been assigned a respective spreading code as follows: 161—#1, 162—#2, 163—#3 and 164—#4. A control terminal (not shown) sends data as shown by arrows 165, 166. 167 and 168. Mobile terminals 161 and 164 are informed by the control terminal that they should receive data on frequency bands $f_1$ only and that mobile terminals 162 and 163 should receive data on frequency band $f_2$ only. All mobile terminals are instructed that any data under scrambling code 1 can be de-scrambled, each mobile terminal then being able to extract their respective data via their assigned spreading code. Any data that is scrambled under scrambling code 2 should be relayed as follows. The data should be de-scrambled using the mobile terminal's copy of scrambling code 2, re-scrambled using scrambling code 1, frequency translated to other of the two frequency bands that it was received on and then broadcast on that frequency. For example, mobile terminal 161 receives the following pattern of data: ($f_1$,1,#1), ($f_1$,2,#2), and ($f_1$,2,#3). That data intended for mobile terminal 161 under scrambling code 1 can be de-scrambled and the data obtained by multiplying the signal stream with spreading code #1. The mobile terminal 161 detects the scrambling code 2, de-scrambles that data and then re-scrambles it using scrambling code 1. The data is then frequency translated onto frequency band $f_2$ and broadcast from mobile terminal 161 as shown by arrows 169 and 169'. The mobile terminals 162 and 163 receive these signals and can obtain their data as aforementioned. An analogous process happens at each of the remaining mobile terminals 162, 163 and 164. It will be noted that, using this method, each mobile terminal receives several copies of the data it is intended to receive. Since the mobile terminals are spaced apart, the copies of the signal at each mobile terminal are likely to be much stronger than those created by multipath directly from the control terminal. Accordingly each mobile terminal can lock onto a number of much better quality signals, ultimately reducing the bit error rate and enabling the system capacity to be increased.

Figure 21:
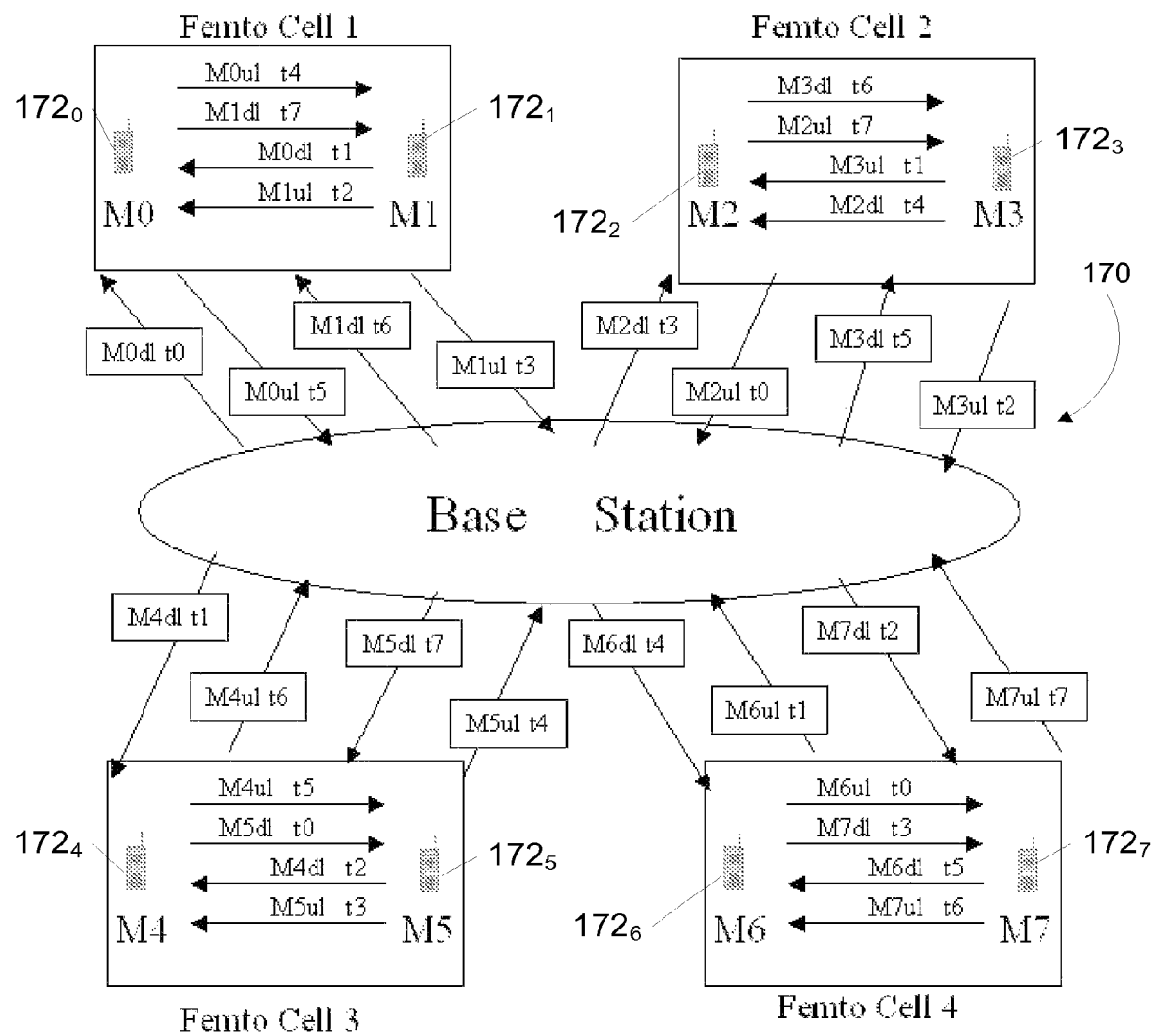
FIG. 21 is a schematic view of a thirteenth embodiment of a data communication system in accordance with the present invention that is based on a TDMA access scheme.

Referring to FIG. 21 a thirteenth embodiment of a TDMA based data communication system is generally identified by reference numeral 170 that comprises a control terminal 171 and eight mobile terminals $172_0$ to $172_7$ that together form a VAA. The data communication system 170 operates on a GSM burst structure. The control terminal addresses each of the eight mobile terminals during designated time slots t0, t1 ... t7 on the downlink frequency band $f_1$ although it is to be noted that the mobile terminals do no have to be addressed in numerical order. The mobile terminals $172_0$ to $172_7$ communicate with the control terminal during allocated time slots on uplink frequency band $f_2$. The mobile terminals $172_0$ to $172_7$ relay data to one another at appropriate time slots on frequency band $f_3$. One out of the 120 available frequency bands may be used for this purpose. The relaying power of each mobile terminal is dynamically controlled by the control terminal so that it reduces interference with an adjacent VAA that will be using frequency band $f_3$ for the same purpose. One possible solution is to fix the relaying output power so that transmission takes place over a radius of approximately 10 m to 20 m.

Figure 22:
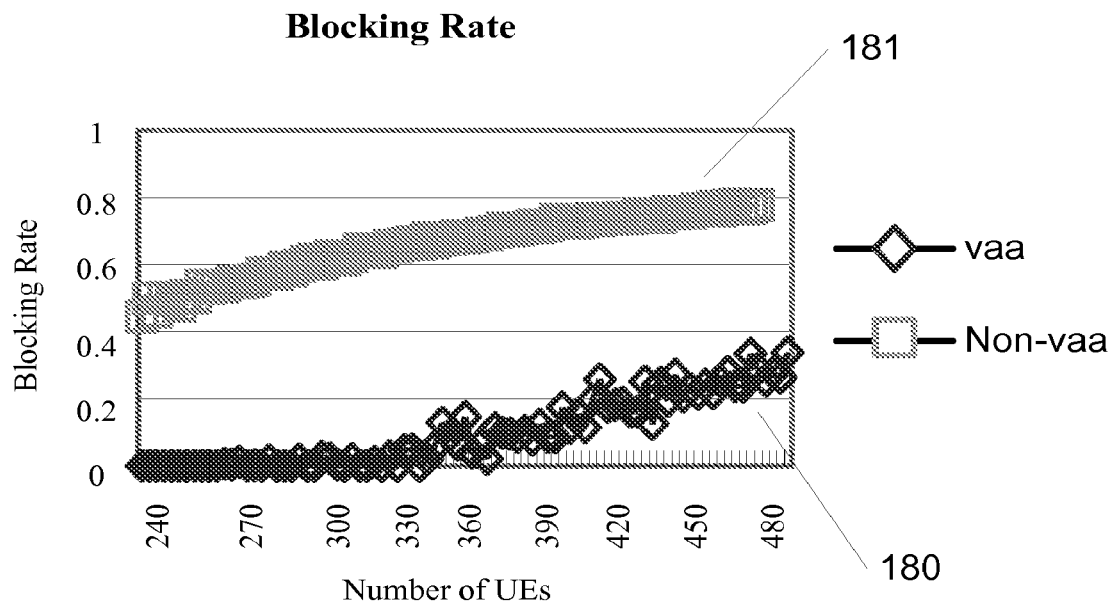
FIG. 22 is a graphical representation of blocking rate (y-axis) against number of users (x-axis) for a W-CDMA data communication system in accordance with the present invention and for such a system in which virtual antenna arrays have not been used.

Referring to FIG. 22 the blocking rate (i.e. number of user connections refused or dropped due to network overload) against number of users in a computer simulation of a wideband CDMA (W-CDMA) network is shown in two states. The simulation assumed 3 terminals per VAA, no interference and no mobility of users. Curve 180 shows the blocking rate when VAAs are used. Curve 181 shows the same network in which no VAAs are used. The VAA groups consist of 3 mobile terminals. As can be seen the blocking rate decreases by a factor of 3 when VAAs are utilised.

Figure 23:
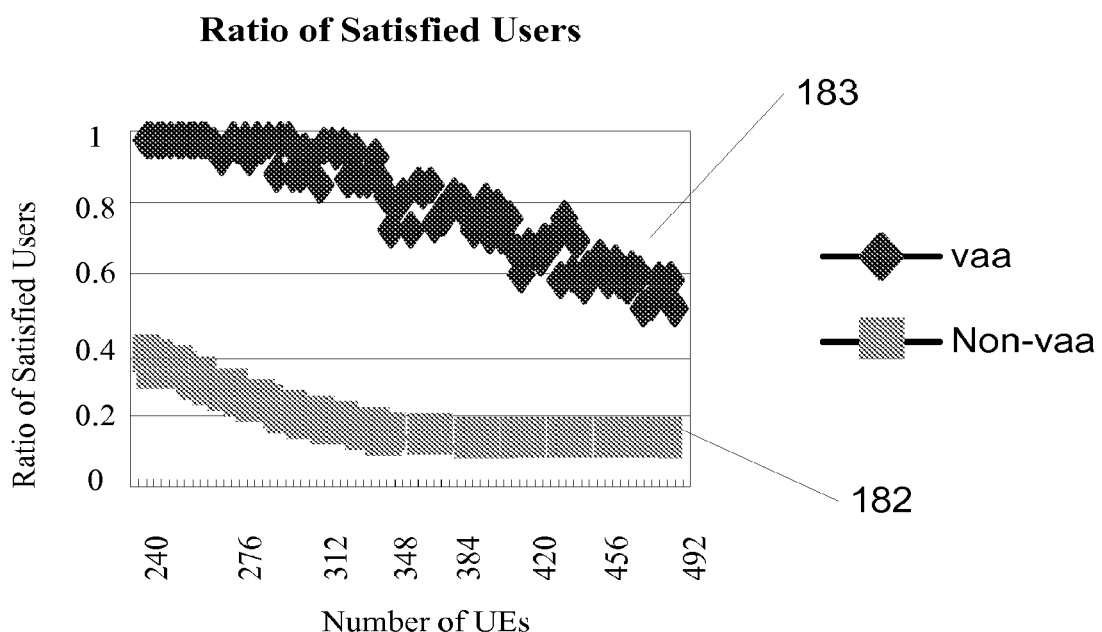
FIG. 23 is a graphical representation of the ratio of number of users being served to total number of users demanding service (y-axis) against total number of users (x-axis) for a data communication system in accordance with the present invention and for such a system in which virtual antenna arrays have not been used.

Referring to FIG. 23 this illustrates the ratio of satisfied mobile terminals against number of users in a computer simulation of a W-CDMA network with VAAs (curve 182) and without VAAs (curve 183). The simulation assumed 3 terminals per VAA, no interference and no mobility of users. The VAA groups are assumed to consist of 3 mobile terminals. As can be seen the ratio of satisfied users increases by a factor of 3 when VAAs are used.

Hardware and Software (1) Control Terminal

Provided that the control terminal can address or is connected to an antenna having a plurality of antenna elements then no hardware changes are necessary at the control terminal.

The following software changes should be made within a control terminal or any logical unit controlling the control terminal antenna array, for example a central controller or radio network controller. Primarily the software should be written to perform the functional steps described in connection with FIG. 5 and the rules mentioned therein. The (software) algorithms have to allow appropriate data encoding (e.g. space-time, BLAST etc.) at the BS antenna array; control the setup and release of VAA groups as described above; inform adjacent mobile terminals about the possibility of constructing a VAA; control the association and disassociation of mobile terminals to and from a VAA, respectively; control synchronisation and power for the VAA. For the main and relaying links, the software should control the appropriate choice of scrambling and spreading codes for CDMA based systems, the appropriate choice of frequency bands and time slots for TDMA based systems and the appropriate choice of frequency bands, time slots and frequency subcarriers for OFDMA based systems. The software should assist appropriate security, identification and authorisation of potential and existing VAA members; control an appropriate billing mechanism; control a possible software update within the mobile terminals to support certain VAA features; inform the backbone about the increase in transmission capacity and reliability.

(2) Mobile Terminals

The following hardware changes should be made within a mobile terminal. If the relaying scheme is chosen so that the main and relaying links do not communicate at the same time over the same air interface and no transparent relaying is performed, then no hardware changes need to be made. However, algorithms in the mobile terminal have to ensure that data is appropriately relayed over the air interface, i.e. either as a regenerated data stream or IP-packets. If the relaying scheme is chosen to be such that another interface is used for relaying, then the hardware has to provide this interface, e.g. PLC (power line communication) or Bluetooth. If transparent relaying is deployed then hardware has to be provided which allows amplification, frequency translation and retransmission. This may pose requirements on additional oscillators and filter design. If the r-MT is operated in duplex mode, i.e. simultaneous communication with the control terminal and the t-MT, then appropriate filters have to separate the used frequency bands sufficiently such as not to cause any adjacent channel interference. In case of SDR the appropriate hardware has to be provided and specifically tailored to support the requirements for a VAA.

It is a feature of the present invention that the following software changes should be made within a mobile terminal. If a mobile terminal is to be used to act as a Central Controller (CC) for an ad-hoc VAA, then appropriate control algorithms have to be provided (see FIG. 5 and associated description). Furthermore, algorithms have to inform the control terminal about the relaying capabilities and VAA membership settings of the mobile terminal. The algorithms have to understand messages from the control terminal informing the MT about surrounding mobile terminals, their relaying capabilities and VAA membership settings. They have to perform negotiation with the control terminal for formation of a VAA or an association of a mobile terminal to an existing VAA. They have to be able to influence the data streams such as to comply with the requirements needed to allow for relaying and thus formation of a VAA group. They have to be able to control synchronisation and power control, either autonomously or imposed by the master mobile terminal, control terminal or central controller. They have to guarantee appropriate security for the relaying signal stream and t-MTs.

The required software could be provided to the mobile terminals in any of the following ways: (1) it could be manufacturer loaded, e.g. already available on the notebook or SIM card or mobile phone as supplied; (2) it could be downloaded via the air interface and automatically installed by the control terminal, e.g. SDR; (3) it could be received from any surrounding mobile terminal; (4) it could be downloaded from special service points which provide the necessary software; and (5) it could be downloaded e.g. onto a notebook from the Internet, floppy disk, CD-ROM or any other computer readable storage medium.

It is a feature of the present invention that it lowers the bit error rate (BER) or packet error rate (PER) or frame error rate (FER) for a given signal-to-noise ratio (SNR) with increasing number of VAA members and groups. It therefore enables to control and enhance the network capacity by allowing remoter users to attain data rates with required quality-of-service (QoS) or decrease the transmission power of the TX or to increase the data rates for existing MTs or to increase the number of served MTs (for CDMA based systems only).

It is a feature of the present invention that it enables several sufficiently close MTs to cooperate with each other and so enhance the overall system capacity.

----------oOo----------

The present invention relates to a system useful for use in operating networks such as those in mobile, fixed or nomadic wireless networks.

Conventional mobile terminals have one (or very few) receiving antenna(s) through which the signals are received and transmitted. Recently Multiple-Input-Multiple-Output (MIMO) channel transmission techniques in form of e.g. BLAST-like or Space-Time encoded systems have emerged which allow a significant increase in capacity. Having only one (or few) antenna(s) per mobile terminal significantly limits the potential capacity increase promised by MIMO communications techniques.

A procedure that has been proposed to overcome the specific problem of having only one receiving antenna in a mobile handset is using Switched Parasitic Antennas (SPA). In SPA there is one active and several tuneable passive antenna elements close to each other forming an antenna array. However, there are severe interactions between the antenna elements, the actual handset and the human body and it is very difficult to tune the passive elements. Also, the additional passive antenna elements require significant space within the handset so making it bigger and bulkier.

Another approach has been to use TDMA-based relaying along a plurality of mobile handsets, however Space-Time Codes or BLAST-like techniques are not applicable to such a system and also this gives rise to problems of billing as the relaying handset would incur the charges which were generated for the target handset. The system was called Opportunity Driven Multiple Access (ODMA).

We have now invented a system, which enables several sufficiently close mobile terminals (MTs) to cooperate with each other and so enhance the overall system capacity, i.e. increase the received signal quality and the total data throughput.

According to the invention there is provided a system for transmitting and receiving signals in which there is at least one transmitter (TX) comprised of at least one antenna element, which sends out signals to a group of MTs each of which is comprised of at least one antenna element. Each MT within this group receives at least part of all signals, if necessary extracts its own dedicated signal and, after possible processing, relays the signals dedicated to the other MTs within the group or to MTs of other groups. The process of relaying can be accomplished by retransmission through a wireless or wired interface.

In use, the TX appropriately encodes the signals for the MTs in dependency of channel state information (CSI) available and prevailing complexity issues, and transmits it via the air interface to the appropriate group(s) of MTs. In a preferred, although not restricted to, embodiment of the invention two operational modes are possible. First, signals are relayed within one group only. In this case, each MT within such group can be considered to act as a relaying receiver (r-RX) and thus as a virtual receiver for at least one other target MT (t-MT) within the same group. Second, signals are relayed from one group to another group of MTs. In this case, MTs of one group can be considered to act as a relaying transmitter (r-TX) and thus as a virtual transmitter for at least one other t-MT within another group. A MT acting either as r-RX or r-TX is termed relaying MT (r-MT). For either case the relaying is accomplished by using either the same air interface as from the TX to the MTs or a different interface, which could be wireless or wired. The retransmitted signals transmitted over the relaying link among the MTs have to be separable from the original signals sent over the main link from the TX to the MTs. The separation is achieved through appropriate orthogonality of physical or logical channels between the main link and the relaying links. Orthogonality can be achieved through frequency or path delay combined with spreading codes in a CDMA based system; through frequency and appropriate time slot scheduling in a TDMA based system; through frequency, sub-carrier frequency and appropriate time slot scheduling in an OFDMA based system; or through a different access scheme in any system. Such system enables a group of users in a spatially close area to communicate with each other and so to increase capacity. As a result the group of users forms a spatially distributed antenna array to which MIMO capacity enhancing techniques can be applied. This overcomes the limitations of having only one (or few) antenna element(s) per MT without increasing the actual size of each receiver.

The system is referred to as a Virtual Antenna Array (VAA).

The system is applicable to mobile telephones in which each transceiver is a mobile handset. The system is applicable to any ad-hoc or meshed, centralised or decentralised network in which each MT is mobile, fixed or nomadic.

The following communications standards currently available or under investigation and standardisation are applicable to VAA: Global System for Mobile Communications (GSM) and derivatives of it (GPRS, EDGE, 3GSM), Universal Mobile Telecommunications Standard (UMTS), Code Division Multiple Access 2000 (CDMA2000), IEEE802.11, High Performance Local Area Network Type 2 (HiperLAN2), Bluetooth (BT), Power Line Communications (PLC), Ultra Wide Band (UWB), Infrared Communications and any future systems based on either of the following access schemes: Code Division Multiple Access (CDMA), Time Division Multiple Access (TDMA), Frequency Division Multiple Access (FDMA) or Orthogonal Frequency Division Multiple Access (OFDMA).

In a preferred, although not restricted to, embodiment of the invention the main link interface from the TX to the MTs is based on either of the following access schemes: W-CDMA (UMTS, CDMA2000), TDMA/FDMA (GSM & derivatives) or TDMA/OFDMA (IEEE802.11, HiperLAN2). The relaying link from the r-MT to the t-MT is preferably based on either of the following access schemes: W-CDMA (UMTS, CDMA2000, UWB), TDMA/FDMA (GSM & derivatives, BT) or TDMA/OFDMA (IEEE802.11, HiperLAN2, PLC).

In a preferred, although not restricted to, embodiment of the invention the signals for the t-MTs are encoded at the TX array using either of the following schemes: BLAST-like techniques, Space-Time Coding or no coding. In the case of BLAST-like techniques, the entire CSI has to be available at the TX. In the case of Space-Time Coding (STC), the signals are encoding utilising either Block or Trellis codes which are optimised for the number of transmit antennas only and the channel conditions. In the case of no coding, only receive diversity is provided at the t-MTs.

In a preferred, although not restricted to, embodiment of the invention the signals for the t-MT are retransmitted via the r-MT using either of the following relaying methods: transparent relaying, regenerative relaying or IP-based relaying. In the case of transparent relaying, the entire or part of the (electromagnetic) signal is received by the r-MT, amplified, possibly frequency translated and retransmitted to the t-MT. In the case of regenerative relaying, the entire or part of the (electromagnetic) signal is received by the r-MT, amplified, processed (decoded, encoded with the same or a different code), possibly frequency translated and retransmitted to the t-MT. In the case of IP-based relaying, IP packets are only retransmitted by the r-MT to the t-MT if the t-MT does request IP packets that were not received properly.

The relaying IP-based scheme is referred to as IP-Diversity (IP-D).

In a preferred, although not restricted to, embodiment of the invention the r-MT operates in full duplex, i.e. it retransmits signals to the t-MT while communicating with the TX. This can be accomplished either by introducing a third oscillator for the relaying transmission in a separate frequency band or, in case of rather static terminals, by cutting the uplink and reprogramming the uplink oscillator onto the relaying frequency band. Note that relaying frequency bands are used only locally within a VAA operating as a virtual receive antenna array.

The relaying scheme using a third oscillator or the reprogrammed uplink oscillator is referred to as Frequency Relaying (FR).

In a preferred, although not restricted to, embodiment of the invention the rules for the formation and destruction of a single or several VAA groups within a wireless network are as follows. A VAA group shall be formed if the network capacity is already saturated or if the user's data request would saturate the network capacity and all potential VAA users prior agreed to a VAA group membership. A VAA group should be formed only if the additional interference produced does not deteriorate communication of other users in the network or does not increase the overall system interference above a given threshold such that the total system capacity decreases. If these conditions cannot be met then the VAA group should be resolved. Note that generally the formation of VAA groups should decrease the overall system interference level.

In a preferred, although not restricted to, embodiment of the invention the rules for the attachment and detachment of a user to and from a VAA group are as follows. A user shall be attached if he prior agreed to a VAA group membership and he would benefit from the induced capacity increase. A user shall also be attached if he prior agreed to a VAA group membership and an existing VAA group would benefit from the induced capacity increase. A user shall also be attached if he prior agreed to a VAA group membership and the entire network would benefit from the induced capacity increase. If any of the aforementioned conditions cannot be met then the user should be detached from the VAA group.

In a preferred, although not restricted to, embodiment of the invention the VAA groups operate in downlink, the main envisaged data bottleneck. An uplink or ad-hoc direct link deployment is equally feasible where all mentioned and depicted signal streams apply in reverse or ad-hoc direction, respectively.

In a preferred, although not restricted to, embodiment of the invention the network with deployed VAA regulates its capacity as follows. First, user remoter from the serving TX can be served maintaining the same data rates and interference level. Second, maintaining the same cell radius the TX transmission power can be decreased leading to a decreased interference scenario, which is vital for CDMA based networks. Third, maintaining cell radius and TX transmission power the data rate can be increased. This can be achieved e.g. by increasing the modulation level, e.g. from QPSK to 16

QAM, or by applying puncturing to the encoded data stream at the transmitter, or by deploying incremental redundancy techniques.

In a preferred, although not restricted to, embodiment of the invention not all MTs associated to a VAA necessarily have to be involved in the process of relaying. In reality each MT will experience a different direct link quality; therefore only MTs with good direct link quality could act as r-MTs for all t-MTs within a VAA group.

In a preferred, although not restricted to, embodiment of the invention the required tight synchronisation within a VAA can either be achieved through external network synchronisation and/or by letting only spatially close MTs form the VAA. Synchronisation forces the r-MTs to retransmit the signals to the t-MT such that they arrive at the t-MT either in staggered time moments or at the same time instant. This allows controlling the separability of the relayed signal streams from the main signal stream and from each other. For the first case of staggered delays (staggered synchronisation), the mutual path delay has to be at least one chip duration for a CDMA based network (such that the t-MT Rake receiver may lock onto the respectively delayed signal streams) or one time-slot duration for a TDMA based network. For the second case of no delay (inline synchronisation), the mutual path delay must not exceed one chip duration for a CDMA based network or one symbol duration for a TDMA based network. Since the processing delay within the r-MTs is assumed to be the same, synchronisation is mainly dictated by the natural position of the MTs of a VAA and network imposed delays. Generally, although not restricted to, the staggered synchronisation method should be deployed if the demodulation/detection algorithms require a separate processing at each virtual receive antenna element. Generally, although not restricted to, the inline synchronisation method should be deployed if the demodulation/detection algorithms do not require a separate processing at each virtual receive antenna element but can deal with the sum of all relayed signal streams. Both types of synchronisation are applicable to any aforementioned relaying methods, such as transparent, etc.

The synchronisation scheme, as a result of the natural position of MTs, is referred to as Forced Synchronisation (FS).

In a first embodiment of the invention the VAA is deployed as a virtual RX and the main and relaying links are based on CDMA, e.g. UMTS. In such embodiment the data streams for u MTs forming a VAA group are appropriately encoded for an m element TX antenna array. Prior to transmission the encoded data is spread with s distinct spreading codes each with given chip-rate, where $s \geq u$. Each of the u MTs receives the entire data stream and extracts its own dedicated signal. Extraction is possible if a Rake-like receiver locks to the appropriate spreading code(s). In the first case of transparent relaying each r-MT simply frequency-translates and relays the entire data stream, either with staggered or inline synchronisation. All t-MTs receive the relayed signal and extract their own signal. Finally, within each t-MT all extracted signal streams are (soft) combined and decoded. In the second case of regenerative relaying each r-MT extracts, decodes and re-encodes the signal stream for the remaining u-1 t-MTs. Note that the re-encoding can be performed utilising the original spreading/scrambling sequences or different spreading/scrambling sequences. The data stream is then frequency translated and retransmitted. Each t-MT then processes all received signal streams. In the third case of IP-relaying the decision upon relaying is drawn at network layer or above. Note that in general the number of MTs forming a VAA group should exceed the number of TX antenna elements as to give maximum performance, i.e. $u \geq m$.

In such embodiment of the invention, a simplified relaying decision can be achieved if the information of the u MTs is first spread by s distinct spreading codes and then by one scrambling code. The scrambling code should be unique for the group of u MTs and should differ from other scrambling codes used within the same geographical area. For example, the secondary scrambling code within one sector could be used for UMTS systems. Each of the u MTs within the group locks onto the common scrambling code and relays all information, which lies beneath this scrambling code. The relaying procedure thus does not analyse or interfere with the actual signal contents under this group common scrambling code.

The concept using a common scrambling code for a group of u MTs forming a VAA is referred to as Group Code (GC).

In a second embodiment of the invention the VAA is deployed as a virtual RX and the main link is based on CDMA, e.g. UMTS, and the relaying links on TDMA, e.g. GSM or derivatives. In such embodiment the data streams for u MTs forming a VAA group are appropriately encoded for an in element TX antenna array. Prior to transmission the encoded data is spread with s distinct spreading codes each with given chip-rate, where $s \geq u$. Each of the u MTs receives the entire data stream and extracts its own dedicated signal. Extraction is possible if a Rake-like receiver locks to the appropriate spreading code(s). The first case of transparent relaying is not feasible for such embodiment. In the second case of regenerative relaying each r-MT extracts, decodes, re-encodes and re-assembles the signal stream for the remaining u-1 t-MTs. Re-assembling allows a continues signal stream, typical to CDMA based systems, to be split into a discontinuous signal stream, typical to TDMA based systems. At least one r-MT then retransmits the re-assembled data streams to associated t-MTs during a specified time slot at a specified frequency. Note that time and frequency slots are controlled either by the network or a MT within a VAA acting as a central controller. The third case of IP-relaying is the preferred embodiment of any hybrid access scheme, such as CDMA in the main link and TDMA in the relaying links. In such deployment, each r-MT retransmits only IP packets which were not received properly by a t-MT. Note that incremental redundancy schemes could equally be deployed, where additional packet redundancy is provided by the r-MTs at each unsuccessful decoding of a packet at the t-MT.

In a third embodiment of the invention the VAA is deployed as a virtual RX and the main link is based on CDMA, e.g. UMTS, and the relaying links on OFDMA. In such embodiment the data streams for u MTs forming a VAA group are appropriately encoded for an m element TX antenna array. Prior to transmission the encoded data is spread with s distinct spreading codes each with given chip-rate, where $s \geq u$. Each of the u MTs receives the entire data stream and extracts its own dedicated signal. Extraction is possible if a Rake-like receiver locks to the appropriate spreading code(s). The first case of transparent relaying is not feasible for such embodiment. In the second case of regenerative relaying each r-MT extracts, decodes, re-encodes and re-assembles the signal stream for the remaining u-1 t-MTs. At least one r-MT then retransmits the re-assembled data streams to associated t-MTs during a specified time slot at a specified frequency utilising a specified number of sub-carrier frequency bands. Note that time, frequency slots and sub-carrier bands are controlled either by the network or a MT within a VAA acting as a central controller. The third case of IP-relaying is the preferred embodiment of such deployment. Each r-MT retransmits only IP packets which were not received properly by the t-MT utilising OFDMA as the relaying access scheme.

In a fourth embodiment of the invention the VAA is deployed as a virtual RX and the main and relaying links are based on TDMA, e.g. GSM and derivatives. In such embodiment the data streams for u MTs forming a VAA group are appropriately encoded for an m element TX antenna array and transmitted at k time slots and l frequency bands, where u=k·l. Each of the u MTs receives its own data stream at a given time slot and frequency band. At least one r-MT of the VAA group further receives the information for at least one other t-MT within the VAA group at given time slot(s) or frequency band(s). It retransmits the signal stream(s) to the t-MT(s) using different time slot(s) and frequency band(s). The main and relaying links must not interfere as not to degrade the system performance. Therefore, the relaying time slots and frequency bands have to differ from the main link time slots and frequency bands. Which time slots and frequency bands to use within the VAA should be determined, although it is not restricted to, by the network or a MT within a VAA acting as a central controller. Note that the relaying frequency bands are used only highly locally such as not to interfere with other MTs or VAA groups within the network. Thus certain frequency bands can be reserved a priori for VAA and they can be reused from VAA group to VAA group. Note further that the maximum number of relaying time slots r needed such that each of the u MTs can relay the information of the remaining u-1 t-MTs is $r \leq u \cdot (u-1) \cdot (u-2) \cdot \ldots \cdot 2 \cdot 1 = u!$. The occupation of less time slots is possible if more frequency bands are used simultaneously or not all MTs relay information or some MTs relay at the same time slot and same frequency band due to inline synchronisation. In general, three relaying cases are possible. In the first case of transparent relaying each r-MT simply frequency-translates and relays the entire data frame, either with staggered or inline synchronisation. At least one t-MT receives the relayed signal and extracts its own signal. Finally, within each t-MT all extracted signal streams are (soft) combined and decoded. In the second case of regenerative relaying each r-MT extracts, decodes, re-encodes and re-assembles the signal stream for the t-MTs. At least one r-MT then retransmits the data to associated t-MTs during a specified time slot at a specified frequency. In the third case of IP-relaying an r-MT retransmits only IP packets, which were not received properly by the t-MT, utilising TDMA at a pre-specified time slot and frequency band.

The concept of locally reserving a specific number of frequency bands and time slots for relaying within a VAA group utilising TDMA is referred to as VAA Femto Cell (VAA-FC).

In a fifth embodiment of the invention the VAA is deployed as a virtual RX and the main link is based on TDMA, e.g. GSM and derivatives, and the relaying links on OFDMA. In such embodiment the data streams for u MTs forming a VAA group are appropriately encoded for an m element TX antenna array and transmitted at k time slots and l frequency bands, where u=k·l. Each of the u MTs receives its own data stream at a given time slot and frequency band. At least one r-MT of the VAA group further receives the information for at least one other t-MT within the VAA group at given time slot(s) or frequency band(s). The first case of transparent relaying is not feasible in such deployment. In the second case of regenerative relaying each r-MT extracts, decodes, re-encodes and re-assembles the signal stream for the t-MTs. At least one r-MT then retransmits the data to associated t-MTs during a specified time slot at a specified frequency utilising a specified number of sub-carrier frequency bands. In the third case of IP-relaying an r-MT retransmits only IP packets, which were not received properly by the t-MT, utilising OFDMA at a pre-specified time slot, frequency band and number of sub-carriers.

In a sixth embodiment of the invention the VAA is deployed as a virtual RX and the main and relaying links are based on OFDMA. Note that OFDMA bases systems are usually hybrids with TDMA. In such embodiment the data streams for u MTs forming a VAA group are appropriately encoded for an m element TX antenna array, modulated onto appropriate sub-carrier frequency bands and transmitted. Each of the u MTs receives its own data stream at given sub-carrier bands. At least one r-MT of the VAA group further receives the signal for at least one other t-MT in the VAA.

In the first case of transparent relaying the r-MT simply frequency-translates and relays all necessary sub-carrier frequency bands, either with staggered or inline synchronisation. At least one t-MT receives the relayed signal and extracts its own signal. Finally, within each t-MT all extracted signal streams are (soft) combined and decoded. In the second case of regenerative relaying each r-MT extracts, decodes, re-encodes and re-assembles the signal stream for the t-MTs. At least one r-MT then retransmits the data to associated t-MTs utilising a specified number of sub-carrier frequency bands. In the third case of IP-relaying an r-MT retransmits only IP packets, which were not received properly by the t-MT, utilising OFDMA at a number of given sub-carriers.

In a seventh embodiment of the invention the VAA is deployed as a virtual TX and the main and relaying links are based on any combination of access schemes described in the previous embodiments of the invention or on any combination of current or future access schemes. In such deployment at least two VAA groups have to communicate with each other, where one VAA group acts as a virtual TX (TX-VAA) and the other as a virtual RX (RX-VAA). The RX-VAA can be deployed as in the previous embodiments of the invention with the only difference that the signal stream does not stem from a real TX antenna array but from a VAA group. The TX-VAA receives the data stream intended for the t-MTs of the RX-VAA either from a real TX antenna array or from another TX-VAA. In the former case, the RX-VAA is served through a single-hop ad-hoc VAA network. In the later case, the RX-VAA is served through a multi-hop ad-hoc VAA network. The originator of the information stream, which could be a base station (BS) with a single antenna, a BS with an antenna array or any MT with single antenna or antenna array, transmits the data stream to a VAA group, which acts as a TX-VAA. The data could be encoded using any of the aforementioned encoding methods and could be transmitted using any of the aforementioned access schemes. Each MT of the TX-VAA receives the data stream, appropriately decodes it and re-encodes it with any of the aforementioned encoding schemes assuming an m-element antenna array was available, where m denotes the number of antenna elements available within the TX-VAA, and relays the encoded data stream to the RX-VAA. In use, the network would only benefit if the distances between the all RXs and TXs using weak or no coding is very low, as to guarantee a good signal quality even for high data rate streams. Again, a BS or central controller initiated staggered or inline synchronisation can be achieved for each TX-VAA.

In a first specific embodiment of the invention the VAA could be deployed within a UMTS FDD network (as well as CDMA2000) as follows. First, discovery mechanisms guarantee that the RNC and MTs within the network are aware of their mutual proximity, their VAA membership agreements and their communications standards supported. This allows the formation of VAA groups whenever deemed necessary by the RNC and a fast setup of relaying connections within a VAA group. Most likely, although not restricted to, additional redundancy will be requested from rather stationary MTs in form of notebooks or PDAs in hot-spot areas, such as conference or meeting rooms. Due to the stationary environment the channel can be assumed slow fading. This implies that one single MT could be in bad channel conditions for a rather long time, whereas another MT could be in good channel conditions for approximately the same amount of time. The channel conditions of each main link from Node B to the MT are reported to the RNC. The RNC decides whether a VAA should be formed among the hot-spot MTs, which relaying method to deploy and which interface to use for the relaying process. Once a VAA is setup then the MTs with good channel conditions serve as r-MTs for all remaining t-MTs. There should be maximum one r-MT for each t-MT and at least one t-MT for at least one r-MT. When channel conditions deteriorate for a r-MT then it should become a t-MT. When channel conditions improve for a t-MT then it should become a r-MT. With appropriate convergence layers, relaying can be accomplished by using any current or future access scheme or any of the following standards: IEEE802.11, HiperLAN2, Bluetooth, Infrared, PLC. The transmission rates of the data sent from Node B to the MTs can be regulated by changing spreading factors, coding rate and rate matching attributes. The association and disassociation procedure can be controlled either through interference measurement or through any take-back function, which could be optimised for battery life, interference level, etc. Several encoding, transmission, relaying and detection schemes are possible.

a) The information stream for each user within the serving sector/cell is appropriately encoded for an m-element TX array. Each user is assigned a unique spreading code, which is the same for each TX array element. All data streams are then scrambled by the sector/cell specific scrambling code and sent out from all TX antenna elements in the same frequency downlink band $f_1$. Note that UMTS has three downlink (DL), $f_{1,DL}/f_{2,DL}/f_{3,DL}$, and three uplink (UL) frequency bands, $f_{1,UL}/f_{2,UL}/f_{3,UL}$, available. First, each user extracts its own data stream by locking to the appropriate spreading sequence. It is appropriately de-scrambled and de-spread until the narrowband signal is obtained. Note that no hard decision is to be performed. Further, it is assumed that VAA groups are already formed and that a terminal within a VAA cell can act either as an r-MT or t-MT only. In this configuration a MT cannot be t-MT and r-MT at the same time. A r-MT is assumed to be in good channel conditions and therefore it is assumed that at least one r-MT transparently relays the entire received signal stream to at least one t-MT on frequency band $f_{2,DL}$ or $f_{3,DL}$. Note that in this configuration the utilised frequency band is reserved for VAA only. Note further that power control is applied to the relaying links such as to minimise mutual interference in between the relaying links. An inline synchronisation is assumed where the mutual difference in path distance is less than one chip duration (around 80 m). The target receiver then locks with its remaining fingers to the strongest signal components, performs channel compensation and soft-combining with the direct signal component. Finally, the signal is decoded.

b) The same encoding, modulation and transmission process is assumed as in a), however, the synchronisation is assumed to be staggered. This allows the creation of more strong diversity paths at the t-MT.

c) The same encoding, modulation and transmission process is assumed as in a), however, each r-MT compensates the main link channel before transparently relaying the signal stream to the t-MTs.

d) The same encoding and modulation process is assumed as in a), however, to the r-MTs within a VAA the information is sent on the downlink frequency band $f_{1,DL}$ and to the t-MTs on frequency band $f_{2,DL}$. The r-MTs then transparently relay the information on frequency band $f_{2,DL}$. Note that power control has to be applied to the relaying links such as to minimise mutual interference in between the relaying links and between the relaying and main links. Note further that no frequency bands are reserved for VAA only.

e) The same encoding, modulation and transmission process is assumed as in a), however, relaying is accomplished on any of the remaining frequency bands $f_{2,DL}/f_{3,DL}$, or $f_{1,UL}/f_{2,UL}/f_{3,UL}$, where the prevailing and generated interference is minimised. Note that possibly an uplink link might be cut and utilised for relaying purposes.

f) The same deployments as in a)-e) are assumed, however, every MT is r-MT and t-MT. This is advantageously applied to fast fading channels, where channel conditions change rapidly.

g) The same deployments as in a)-e) are assumed, however, each r-MT retrieves the information of the other t-MTs, regenerates it and relays it to the t-MTs.

h) The same deployments as in a)-e) are assumed, however, each r-MT retrieves the information of the other t-MTs, decodes it and stores the obtained packets in a buffer for a given time. These packets are then relayed only if requested by a t-MT.

i) The same deployment as in h) is assumed, however, the IP-packets are relayed through another interface such as mentioned above.

In a second specific embodiment of the invention the VAA is deployed within a UMTS TDD network as follows. A TDD network will be setup most likely, but not restricted to, in a hotspot area such as conference rooms or airport lounges. Target MTs are most likely, but not restricted to, notebooks, laptops, portable computers or PDAs. The deployment of VAA will boost capacity of the UMTS TDD system. Again, a group of VAA users are sent data with a user specific spreading sequence at a given time slot over a given duration of time slots. Once a VAA is setup then the MTs with good channel conditions serve as r-MTs for all remaining t-MTs. There should be maximum one r-MT for each t-MT and at least one t-MT for at least one r-MT. When channel conditions deteriorate for a r-MT then it should become a t-MT. When channel conditions improve for a t-MT then it should become a r-MT. With appropriate convergence layers, relaying can be accomplished by using any current or future access scheme or any of the following standards: IEEE802.11, HiperLAN2, Bluetooth, Infrared, PLC. Advantageously, although not restricted to, IP packets are relayed by the r-MTs to the t-MTs. The relaying links could be utilised on a FAIL/ACKNOWLEDGEMENT basis or as a 'reserved' link during a pre-specified duration of time. The transmission rates of the data sent from the BS to the MTs can be regulated by changing spreading factors, coding rate and rate matching attributes. The same deployment configurations as for the UMTS FDD case are possible.

In a third specific embodiment of the invention the VAA is deployed within a GSM network or derivatives (GPRS, EDGE) as follows. If technology allows the MTs shall be devised such as to relay the information transparently, otherwise regenerative relaying shall be deployed. For the setup and release of VAA cells the BS has to have information on the MT's VAA membership settings. Further, main figure of merit will be the available channel capacity in form of frequency bands and time slots. A take-back function can be deployed which could be optimised for the MT battery-power or generated co-channel or adjacent channel interference. Several encoding, transmission, relaying and detection schemes are possible.

a) The information stream for each user within the serving sector/cell is appropriately encoded for an m-element TX array. Each MT is assigned a unique time slot and frequency band, which is the same for each TX array element. All data streams are then sent out from all TX antenna elements in the frequency downlink bands. Note that GSM has 124 downlink (DL) and 124 uplink (UL) frequency bands available. The assignment of time slots and frequency bands shall be such that all MTs belonging to the same VAA group are served in consecutive time slots and possibly on different frequency bands. Note that for simplicity the frequency band should be the same. However, if the number of VAA MTs exceeds the number of time slots in a frame or if interference becomes predominant then more than one frequency band can be deployed. The number of reserved frequency bands utilised for relaying should be one less than the number of MTs within a VAA group. Note that the reserved relaying bands can be utilised locally by other VAA groups, which justifies the increase in capacity. If u MTs are forming a VAA group then each of the u MTs receives the data intended for MT #1 at time slot #1 and frequency band #1. Each of the remaining u-1 r-MTs amplifies the data stream and frequency translates it onto one of the locally reserved VAA frequency bands, where each r-MT utilises another band. The t-MT #1 receives thus on frequency band #1 the direct link information and on frequency bands $\#1_{VAA}$-$\#(u-1)_{VAA}$ the remaining relayed information. This happens at the same time slot #1 where the relayed streams are slightly delayed due to additional propagation and processing/translation time. Note that the delayed occurred in the relaying links should not exceed the guard times in between the time slots. If it does then the either the guard time has to be increased or only half of the MTs can participate in a VAA group. Then, the process is repeated for the remaining u-1 MTs. Note that most likely the channel will appear to be fast fading due to the low data rates. Therefore, every MT participating in a VAA group should be r-MT and t-MT at the same time. Note further that with increased complexity more than one frequency band could be relayed. Note further that not necessarily frequency bands have to be reserved for VAA relaying, but an interference measurement can be performed within a VAA to relay in the bands with low interference.

b) The same encoding, modulation, transmission and relaying process is assumed as in a), however, a slow fading channel could allow that not all MTs act as r-MT but only those in good channel conditions.

c) The same encoding, modulation and transmission process is assumed as in a) and all channels involved are slow fading and thus assumed to be known. For certain encoding techniques, such as Space Time Trellis Codes, the data can be relayed at the same frequency band and same time-slot (inline synchronisation). The addition of all signal streams, which is usually done in the receiver, is thus performed in the air interface. Such system is advantageously deployed for strong line-of-sight (LOS) relaying links, which obey Ricean statistics and thus approach a Gaussian channel. Note that either synchronisation is necessary such that the relaying carrier frequencies do not cancel each other or a CSI of the relaying links. The decoding process follows the one in a).

The scheme utilising the addition of all signal streams in the air interface is referred to as Natural Combining (NC).

d) The same encoding, modulation and transmission process is assumed as in a), however, each MT regenerates the data streams and relays it as deployed in a)-c) utilising either inline or staggered synchronisation.

e) The same deployments as in a)-d) are assumed, however, each r-MT retrieves the information of the other t-MTs, decodes it and stores the obtained packets in a buffer for a given time. These packets are then relayed only if requested by a t-MT.

f) The same deployment as in e) is assumed, however, the IP-packets are relayed through another interface such as mentioned above.

In a fourth specific embodiment of the invention the VAA is deployed within an IEEE802.11 or HiperLAN2 network as follows. Since both standards rely on an OFDM/TDMA/TDD system, the same as for the GSM and derivative embodiment holds with the only difference that the modulation is based on OFDM and uplink and downlink frequency bands are shared (TDD). A further difference is that the slot length may vary from user to user due to varying PDU train length.

In a fifth specific embodiment of the invention the VAA is deployed within a Bluetooth (BT) network as follows. Current and future BT standards rely on either TDMA or CDMA based technology. Therefore, the same as for the UMTS FDD and GSM embodiment of the invention hold with minor differences in realisation.

For all aforementioned embodiments of the invention the transceivers of the MTs involved can be based on Software Defined Radios (SDR). This gives VAA the flexibility to perform all necessary algorithms such as relaying, decoding, frequency translating, etc. under the control of software. Thus filters, centre frequencies, etc. can be adapted dynamically. Furthermore, the software to setup and maintain a VAA group can be downloaded using SDR download mechanisms.

In a possible embodiment of the invention the VAA groups can also form ad-hoc single frequency networks with obvious implications for capacity and routing algorithms.

In a preferred embodiment of the invention a VAA group can be served by more than one TX array. Such situation could arise if at least one MT of the VAA group is in a soft-handover. In a preferred embodiment the signal stream from both TX antenna arrays shall be encoded appropriately as to make use of the additional antenna elements. For example, if both TX antenna elements have six antenna elements and the data stream was encoded assuming a six element TX array, then in soft-handover the data shall be encoded as if a twelve element TX array was available.

In a preferred, although not restricted to, embodiment of the invention the number of MTs within a VAA group should be equal to or exceed the number of transmit antenna elements used. Maximum coding gain is achieved if the number of MTs equals the number of transmit antenna elements. Additional MTs yield diversity gain.

In a preferred, although not restricted to, embodiment of the invention each MT has a specific VAA membership. Although not restricted to, the membership options could be as follows. First, a MT agrees to form or be part of a VAA without any prior notification and under any conditions. Second, a MT agrees to form or be part of a VAA only with appropriate confirmation of the owner (request required). Third, a MT agrees to form or be part of a VAA only if it would gain any capacity benefits in form of better QoS or higher data rates. Fourth, a MT agrees to form or be part of a VAA only if the other VAA members belong to a set of prior defined MTs. Fifth, a MT agrees to form or be part of a VAA under any conditions, however, automatically releases from a VAA group when a predefined set of conditions are violated.

In a preferred, although not restricted to, embodiment of the invention a VAA group within any type of network is formed as follows. It assumed that a VAA setup is required and that all aforementioned requirements, e.g. interference or capacity requirements, to form a VAA are met. The VAA group is built up consecutively, i.e. MT by MT, where at least two MTs have to be available. The VAA group setup is initiated when the network is running out of (or low in) capacity in terms of available power, codes, time slots, frequency bands or frequency sub-carriers. This may happen if the number of MTs requesting a connection exceeds the given network capacity threshold, or remote MTs have to be served, or certain MTs require higher data rates or a better link QoS, or interference conditions change due to temporal changes in propagation characteristics. The network is assumed to be supervised by a CC, which could be a RNC, a BS or a master MT. The CC is informed first by all MTs about their VAA membership agreements, relaying capabilities and possibly already about their mutual awareness. The CC then extracts those MTs within the network which cause the system capacity to run out. This is achieved by directly monitoring the transmission to each MT, or by receiving information of the MTs involved, or by any other means informing the CC about the MTs causing the network capacity congestion. If this information cannot be achieved then a blind formation of VAA groups shall be initiated by the CC until the capacity congestion is reduced or no other VAA groups can be formed. The CC is assumed to know the spatial positions of those MTs potentially forming VAA groups. This can be achieved by GPS or any location determining algorithms. If the location is not available to the CC then either a blind formation of VAA groups shall be initiated with constant surveillance of the interference level or a beacon signal has to be exchanged between the MTs. For the latter case the CC controls the exchange of beacon signals along the relaying links for MTs with the same relaying capabilities, e.g. first all MTs with HiperLAN2 capability exchange their beacons, then all Bluetooth devices, etc. The CC is thus finally informed about the entire status of the network. Then, in dependency of VAA membership agreements, relaying capabilities, capacity bottlenecks and other figures of merit, the CC assigns a first member of a first VAA group. In dependency of the network deployment or signalling load invoked, the CC either automatically assigns the second member of the same VAA group or it informs the first member to search for a second member. The CC then informs both members about the exact resources to be used for the main links in terms of power, code, frequency band, time slot or frequency sub-carrier. If not already provided by the relaying mechanism/standard, the CC informs both members about the exact resources to be used for the relaying links, as well as the synchronisation method used and other details necessary to accomplish data relaying. Note that the exact order of resource allocation and member assignment could be different as long as an appropriate functioning of the forming VAA group is guaranteed. Then, the data transmission is initiated and the system capacity monitored. If the system capacity deteriorates then the VAA shall be resolved and another group shall be formed. If the system capacity enhances and the system capacity requirements are met then no further VAA group formations are initiated. If it enhances and the system capacity requirements are not met then another MT is assigned to join the VAA by any method mentioned above. Possibly, resources have to be reallocated for each new MT. Again, the capacity is monitored and aforementioned decisions taken. This formation loop is continued until the capacity gains level out or the number of potential VAA MTs runs out. If the system capacity requirements are still not met then the formation of a second VAA group shall be initiated according to the steps provided above. This procedure is continued until the capacity requirements are met or all potential VAA users belong to a VAA group.

In a preferred, although not restricted to, embodiment of the invention a VAA group within any type of network is administered as follows. Of major importance is to maintain synchronisation between the MTs of a VAA group. This could be controlled either by a CC, or by a master MT within a VAA group, or by each MT within the group. Furthermore, the CC has to monitor continuously the interference and resource situation. Interference can be estimated either directly from the CC or via feedback from the MTs. In accordance with interference and resource availability, the CC either does not initiate any changes to the network, or it extends current VAA groups or forms new VAA groups according to the steps provided above, or it releases MTs from VAA groups or dissolves VAA groups according to the steps provided below.

In a preferred, although not restricted to, embodiment of the invention a VAA group within any type of network is resolved as follows. In dependency of the VAA membership settings of the MTs, the general interference scenario and resource availability, the CC may initiate the detachment of a MT from a VAA group. If the membership settings of some MTs require a detachment of highest priority (e.g. due to battery life restrictions, etc.), then the CC chooses the VAA group which would suffer least capacity degradation due to the detachment. If generally the interference scenario and resource availability generates sufficient additional capacity, then the CC chooses MTs with highest detachment priority or any MT out of a VAA group which would suffer least capacity degradation due to the detachment. This process is repeated until a given interference and resource availability threshold is achieved.

In a preferred, although not restricted to, embodiment of the invention the distance between the MTs within a VAA group is dictated by the deployment scenario of VAA, the TX transmission power, the interference susceptibility of the system, the transmission power of the r-MTs, the additional noise introduced in the r-MTs, the noise sensitivity of the MTs, the distance to the next VAA group utilising the same resources and the propagation environment. For instance, if the relaying process does not produce any interference to the main link system and the r-MT has a transmission power of 30 dBm, then the operational distance is in the magnitude of 20-50 m within a typical indoor environment. The distance between each MT in the VAA is ideally between 2 m and 100 m, with 10-20 m being preferable. The transmission power of the MTs can be controlled, although not restricted to, by the CC in steps from 0 dBW to 10 dBW.

It is a feature of the present invention that no hardware changes have to be performed within a BS antenna array, as long as each antenna element can be accessed separately.

It is a feature of the present invention that the following software changes have to be performed within a BS or any logical unit controlling the BS antenna array. The (software) algorithms have to allow an appropriate data encoding at the BS antenna array. They further have to control the setup and release of VAA groups. They have to inform adjacent MTs about the possibility to setup a VAA group. They have to control the association and disassociation of MTs to and from a VAA group, respectively. They have to control synchronisation and power control for the VAA group. For the main and relaying links, they have to control the appropriate choice of scrambling and spreading codes for CDMA based systems, the appropriate choice of frequency bands and time slots for TDMA based systems and the appropriate choice of frequency bands, time slots and frequency sub-carriers for OFDMA based systems. They have to guarantee appropriate security, identification and authorisation of potential and existing VAA members. They have to control an appropriate billing mechanism. They have to control a possible software update within the MTs such as to support certain VAA features. They have to inform the backbone about the increase in transmission capacity and reliability.

It is a feature of the present invention that the following hardware changes have to be performed within a MT. First, if the relaying scheme is chosen to be such that main and relaying links do not communicate at the same time over the same air interface and no transparent relaying is performed, then no hardware changes have to be performed. Note, however, that receiving algorithms have to take care that the information is appropriately relayed over the air interface, i.e. either a regenerated stream or IP-packets. Second, if the relaying scheme is chosen to be such that another interface is used for relaying, then the hardware has to provide this interface, e.g. PLC or Bluetooth. Third, if transparent relaying is deployed then hardware has to be provided which allows amplification, frequency translation and retransmission. This may pose requirements on additional oscillators and filter design. Fourth, if the r-MT is operated in duplex mode, i.e. simultaneous communication with the TX and the t-MT, then appropriate filters have to separate the used frequency bands sufficiently such as not to cause any adjacent channel interference. Fifth, in case of SDR the appropriate hardware has to be provided and specifically tailored to support the requirements for a VAA.

It is a feature of the present invention that the following software changes have to be performed within a MT. If a MT is to be used to act as a Central Controller (CC) for an ad-hoc VAA group, then appropriate control algorithms have to be provided. Furthermore, algorithms have to inform the TX about the relaying capabilities and VAA membership settings of the MT. They have to understand messages from the TX informing the MT about surrounding MTs, their relaying capabilities and VAA membership settings. They have to perform negotiation with the TX in case of a formation of or an association to a VAA group. They have to be able to influence the data streams such as to comply with the requirements needed to allow for relaying and thus formation of a VAA group. They have to be able to control synchronisation and power control, either autonomously or imposed by the TX/BS/CC. They have to guarantee appropriate security for the relaying signal stream and t-MTs. The required software could be provided to the MTs in one of the following ways: First, it could be in-built, e.g. already available on the notebook or SIM card or mobile phone. Second, it could be downloaded via the air interface and automatically installed, e.g. SDR. Third, it could be received from any surrounding MT. Fourth, it could be downloaded from special service points which provide the necessary software. Fifth, it could be downloaded from the Internet or floppy disk or CD-ROM, e.g. onto a notebook.

It is a feature of the present invention that it lowers the bit error rate (BER) or packet error rate (PER) or frame error rate (FER) for a given signal-to-noise ratio (SNR) with increasing number of VAA members and groups. It therefore enables to control and enhance the network capacity by allowing remoter users to attain data rates with required quality-of-service (QoS) or decrease the transmission power of the TX or to increase the data rates for existing MTs or to increase the number of served MTs (for CDMA based systems only).

It is a feature of the present invention that it enables several sufficiently close MTs to cooperate with each other and so enhance the overall system capacity.

The invention is illustrated in the accompanying drawings in which:

FIG. 3 shows a generic network with deployed VAA in downlink

FIG. 4 shows a generic network with deployed VAA in downlink, uplink or ad-hoc

FIG. 5 illustrates the setup of VAA within the network

FIG. 6 illustrates the CDMA network flowchart with deployed VAA

FIG. 7 illustrates the TDMA/OFDMA network flowchart with deployed VAA

FIG. 8 shows a single-hop network with deployed RX-VAA

FIG. 9 shows a typical cellular network with deployed RX-VAA

FIG. 10 shows a typical cellular network with deployed TX-VAA

FIG. 11 shows geographically a typical cellular network with deployed VAA

FIG. 12 shows a typical W-LAN network with deployed VAA and wireless relaying

FIG. 13 shows a typical W-LAN network with deployed VAA and PLC relaying

FIG. 14 shows a simple realisation with two BS antennas (Alamouti scheme)

FIG. 15 shows the performance of the scheme of FIG. 9

FIG. 16 illustrates a CDMA embodiment with groups of receivers

FIG. 17 shows the performance and dynamical behaviour of the scheme of FIG. 11

FIG. 18 illustrates a scheme using two frequencies and scrambling codes

FIG. 19 shows an average BER vs. SNR results from the scheme of FIG. 13

FIG. 20 illustrates a scheme with four users and two frequencies

FIG. 21 illustrates a simple TDMA-scheme embodiment

FIG. 22 illustrates the blocking rate for a W-CDMA network with deployed VAA

FIG. 23 illustrates the number of satisfied MTs for a W-CDMA network

Referring to FIG. 3, it shows the most generic case of a network with deployed VAA in downlink. Data is received for MTs within the network from a backbone, encoded and transmitted by a TX with in antenna elements. It is received by the first VAA group and relayed to the next VAA. The relaying might be transparent, regenerative or IP-relaying with appropriate decoding/encoding/frequency translating processes. The signals are received by the second VAA group where the same as in the first VAA group takes place. Note that the second VAA group may as well receive the data streams directly from the TX. This continues until the target VAA group is reached. Within the target VAA group r-MT act as virtual receivers for a t-MT. A t-MT is r-MT for other t-MTs in the same VAA group. Note that each MT may consist of more than one antenna element, where at least one is involved in the process of relaying. Note further that a target VAA group might be as well a relaying VAA group for another target VAA group.

Referring to FIG. 4, it shows the most generic case of a network with deployed VAA in downlink, uplink and ad-hoc mode. The same as for FIG. 1 applies with the only difference that the data flows apply in either direction and that a MT might act as a TX.

Referring to FIG. 5 this illustrates the flowchart as to deploy VAA within a CDMA network. It explains how to encode and transmit the data stream and finally relay it within the VAA group.

Referring to FIG. 6 this illustrates the flowchart as to deploy VAA within a TDMA network. It explains how to encode and transmit the data stream and finally relay it within the VAA group.

Referring to FIG. 7 this illustrates the flowchart as to setup VAA within any network. Initially, the requirements and capabilities of the network and each MT are verified. Then, communication is initiated and capacity/interference/resources are monitored. If a capacity congestion is observed then the formation of a 2-member VAA group shall be initiated. If capacity congestion still prevails then the number of VAA members shall be increased until no gain is achieved any more. If the capacity is still congested then another VAA group shall be formed, etc.

Referring to FIG. 8, it shows a single-hop network with deployed VAA. The data for all MTs in the VAA group is appropriately encoded and transmitted to the VAA group, where the relaying and combining process takes place.

Referring to FIG. 9, it shows a typical cellular system with deployed VAA. Each user MT is assumed to have only one transceiver antenna element and the VAA is operated in single-hop receiving mode.

Referring to FIG. 10, it shows a typical cellular system with deployed VAA. The first VAA group is assumed to be close to the BS and have more MTs than the BS antenna elements. The proximity of the first VAA group to the BS may allow a transmission of the data stream with no or little coding. It is received by the first VAA group and encoded as if an antenna array was available. The data is finally received, relayed and combined within the target VAA group.

Referring to FIG. 11, it shows a typical cellular system with deployed VAA. The BS is assumed to consist of an antenna array. Users with similar mobility and VAA membership settings are assumed to form VAA groups within geographically close areas.

Referring to FIG. 12, it shows a typical W-LAN system with deployed VAA. A high capacity transmit array is assumed to send data to the MTs (here in form of notebooks). They receive the data stream and relay it via a wireless link using either inbuilt antennas or a PCMCIA card. The data is then received and processed by each terminal.

Referring to FIG. 13, it shows a typical W-LAN system with deployed VAA. A high capacity transmit array is assumed to send data to the MTs (here in form of notebooks). They receive the data stream and relay it via the power cables (PLC) using the traditional power plug. The data is then received and processed by each terminal.

Referring to FIG. 14, there are two base stations BS-A1 and BS-A2 each of which transmit a signal to the target receiver MS1. In addition the relaying receiver MS2 receives the signals and retransmits it to MS1. This is a (2,2) Alamouti scheme to a common single antenna mobile terminal.

Referring to FIG. 15, it shows the results graphically with a non-perfectly operating power control routine on the relaying link for the scheme of FIG. 2. The deviation from the perfect power control (ppc) case was assumed to be ±2 dB.

Referring to FIG. 16, it depicts a CDMA-scheme embodiment of the virtual antenna array. There are two base station transmitters BS-A1 and BS-A2, there are groups of receivers MS1, MS2, MS3 in which the individual mobile receivers are close together so that each individual receiver is in chip-range of all the others in the group and target receiver, so each group can be considered as one virtual transmitting array. The groups MS1, MS2 and MS3 are far enough apart to be outside chip-range of the other groups. Each of the receivers receives a signal from each of the base station transmitters and each of the groups retransmits the signal to the target mobile. Each group is out of chip-range to the other groups and so each group is distinguishable from the other groups through an appropriate Rake receiver. The target receiver detects the strongest signals combines them and retrieves the initial signal. The scheme was found to operate at its best for R-I groups of users, where R is the number of fingers of the Rake receiver.

Referring to FIG. 17, it depicts the dynamic behaviour of the scheme presented in FIG. 11. The performance of two users in a group is the same as for more than two users in a group and does not deteriorate, which applies to the case of two base station antennas, one receiver antenna within the handset and the appropriate number of supporting users to emulate the (n,m) transceiver structure case. A SNR of 6 dB was fixed and the BER analysed with respect to a dynamic number of helping users in the virtual antenna array group and a changing number of uncorrelated paths.

Referring to FIG. 18 this illustrates a (2,2) forced synchronised VAA Trellis encoded CDMA scheme. The base transmitter BS transmits the signal to the groups of receivers MS1, MS2, MS3 and MS4 on frequencies $f_1$ and $f_2$ as shown. The symbols for the 'right' group MS2 and MS3 are sent to the 'left' group MS1 and MS4 and vice versa. The signals are Trellis encoded and retransmitted to the other group. The scheme is advantageous for more than two relays per group.

Referring to FIG. 19 shows the results of the scheme introduced in FIG. 13. It shows average BER vs. average SNR over a normalised Rayleigh channel. The curve corresponds to the VAA. Within the region of interest it operates worse than the classical MRRC scheme. Introducing a $2^{nd}$ BS Tx, however, gives better performance in the region of interest, almost as good as the MRRC scheme.

Referring to FIG. 20 this illustrates a VAA scheme occupying 2 bands and emulating the (1,3) MRRC Rx diversity scheme. The labelling is according to (frequency, scrambling and spreading).

Referring to FIG. 21 this illustrates a possible TDMA-scheme embodiment of the VAA scheme based on GSM burst structure. The base station addresses each of the eight mobile terminals during designated time-slots at the down link frequency band $f_1$. The mobile terminals communicate with the base station at appropriate time slots at up link frequency $f_2$. In a preferred embodiment of the TDMA scheme the group of mobile terminals, which forms a VAA group, communicates among each other at the remaining time-slots at a third frequency $f_3$. In GSM one out of 120 frequency bands could be reserved for this purpose. The direct communication is power controlled in the sense that the transmission should not interfere with another group of VAA. A preferable solution is to fix the relaying output power such that the transmission radius does not exceed 10-20 m.

Referring to FIG. 22 this illustrates the blocking rate of a W-CDMA network with deployed VAA. The VAA groups are assumed to consist of 3 MTs. As can be seen the blocking rate decreases by a factor of 3.

Referring to FIG. 23 this illustrates the ratio of satisfied MTs of a W-CDMA network with deployed VAA. The VAA groups are assumed to consist of 3 MTs. As can be seen the ratio increases by a factor of 3.

FIELD OF THE SECOND INVENTION

The second invention relates to a method and apparatus for synchronising an electronic data communication system, a computer program comprising instructions for performing the method, a computer readable storage medium provided with the program and a subscriber identity module card provided with computer executable instructions.

BACKGROUND TO THE SECOND INVENTION

Synchronisation of wireless electronic data communication systems is necessary for a number of reasons, for example ensuring orthoganility (i.e. the ability to distinguish) between communication channels and increasing received signal quality. Synchronisation is normally defined as the temporal alignment of at least two signals that are within a limit or limits that can be tolerated by the system. The limits are dependent on a number of factors including the access scheme used and the topology of the network that in wireless networks is variable in time.

Bits of digital data to be transmitted over such a system from a transmitter to a receiver needs to highly organised if the data is to be received and interpreted properly by the receiver. One method for organising digital data is to divide the bits into various groups known as super-frame, frame and slot. In general the super-frame comprises a plurality of frames, each of which comprises a plurality of slots. Each slot has one or more logical channels. Frames and super-frames usually contain some delimitation, address and control information to enable the transmitter and receiver to deal with the data appropriately. These various groups must be synchronised in transmission.

Other levels on which an electronic data communication system must be synchronised are the network and application level, symbol, bit, chip and carrier frequency level. Symbols are generated by various operations on the bits of data, for example compression and encoding. A chip is one bit of a code used in a specific access scheme in wireless data communication networks, namely Code Division Multiple Access (CDMA). In a CDMA scheme the data for each terminal is multiplied by a different spreading code that spreads the data over frequency bandwidth and provides uniqueness to the signal so that a terminal can extract its own data from the signals for all of the other terminals. The carrier frequency is a frequency that is modulated with the data signal, synchronisation of carrier frequencies being necessary to reduce interference between channels to optimise signal strength at the receiver.

Synchronisation is often achieved on the network and application level by the running application. It is achieved on the super-frame, frame and slot level either automatically or by a central controller (hereinafter "CC") that could be a telecommunications base station or mobile switching station for example. Synchronisation on the symbol, bit, chip and carrier frequency level is normally achieved with the aid of tracking loops, for example a phase locked loop.

Synchronisation usually has to be re-initiated when the signal bearer undergoes certain changes. For example, a change of network means that the application layer has to initiate a new synchronisation between transmitter and receiver at application layer. The change of a communication session at the physical layer means that the CC has to re-initiate synchronisation at the super-frame, frame and slot level. With a change in the propagation environment of electromagnetic waves, the tracking loops at transmitter and receiver have to guarantee continuous synchronisation at symbol, bit, chip and carrier frequency level.

Algorithms and methods for synchronising at the network and application layers, and for synchronising super-frames, frames and slots are well established, for example using a guard interval or special synchronising pattern. Self-synchronising algorithms for symbols, bits, chips and carrier frequencies are also well known, for example phase locked loops In sending data between a transmitter and a receiver using electromagnetic waves, it is possible to increase the capacity (in bits/s/Hz) of the system by using a group of terminals to relay the data to the receiver. However, due the fact that a wireless link is used the propagation channel of the electromagnetic waves is continually changing, which can cause synchronisation difficulties at the receiver. Furthermore, in some systems some of the relaying terminals are free to move whilst relaying. It has been found that this dynamic nature of the position of the relaying receivers can also cause synchronisation difficulties at the receiver. This is because the alignment of the signals from the or each relaying terminal at the receiver is out of synchronisation by an amount greater than can be tolerated by the system.

For example, one or a group of sources wishes to send data to one or a group of sinks providing a synchronised single/multi-point to single/multi-point communication link via one or more groups of relays. Each group comprises two or more terminals. Synchronisation at super-frame, frame and time slot level is necessary as to reduce interference between consecutive super-frames, frames and time slots. For instance, if one group comprising two relays is used to relay a signal to a target terminal then the signal has two paths to reach the target terminal via the relays. On reaching the target terminal it is possible that the temporal difference between the two paths might be significantly smaller than the frame length but is of the order of a time slot length. Accordingly the system appears synchronised at super-frame and frame level, but unsynchronised at time slot level, which leads to time slot interference.

Similarly, synchronisation at symbol, bit and chip level is necessary to reduce interference between consecutive symbols, bits and chips. For instance, if one group comprising two relays is used as described above it is possible that the temporal difference between the two relays is significantly smaller than the symbol length but is of the order of the chip length. Accordingly the system appears synchronised at symbol level, but unsynchronised at chip level resulting in inter-chip interference.

As mentioned above synchronisation at frequency carrier level is vital as to obtain optimum signal strength. It is assumed for present purposes that appropriate tracking loops guarantee (self) synchronisation at carrier level. Accordingly, the present invention does not relate to the synchronisation of carrier frequencies.

SUMMARY OF THE SECOND INVENTION

It is apparent that there is a need for a method an apparatus of assisting synchronisation of signal streams over a wireless link in which the signal is relayed from an information source to an information sink via at least one group of relaying terminals, the synchronisation being within tolerances acceptable to the access scheme in use According to one aspect of the second invention there is provided a method of synchronising data transfer in an electronic data communication system comprising at least one information source and a plurality of information sinks each of which can send and receive data in the form of electromagnetic waves to and from the at least one at least one information source using a transmission access scheme, which method comprises the steps of:

(1) identifying a plurality of information relays from the plurality of information sinks; and (2) instructing the plurality of information relays to receive and relay data intended for at least one of the plurality of information sinks;

wherein at step (1) the plurality of information relays is identified on the basis of ability to relay data such that it remains synchronous or has a deviation that can be tolerated by the at least one information sink.

Preferred features of the invention are set out in the appended claims to which attention is hereby directed.

If the signals were transmitted synchronised at superframe, frame, time-slot, symbol, bit and chip level from the information source and relayed by at least one group of relays which are spatially close (such as to require a similar physical propagation time) and inherit the same processing time, then the signals are received by the information sink synchronised within tolerable limits The tolerable limits dictate the allowed difference in propagation and processing time. At superframe, frame and time slot level a delay of approximately less than one percent is usually tolerated. At symbol and bit level a delay of less than ten percent is usually tolerated. At chip level a delay of less than hundred percent is usually tolerated. Timing tolerances are thus dictated by the access scheme, which may operate at symbol or chip level. CDMA based systems require a delay difference of less than one chip duration, whereas TDMA based systems require a delay difference significantly less than a symbol duration. As long as propagation and processing times do not change out of the timing tolerances, the system remains synchronised without the necessity of supervision by a CC; thus achieving automatic self-synchronisation.

Applying the concept of retransmission of information between spatially distributed but sufficiently close relays allows the formation of virtual information sources and information sinks which allows the deployment multiple-input-multiple-output (MIMO) capacity measures, e.g. in form of Space-Time Codes, and thus leads to an increase in system capacity in terms of bits/s/Hz (with implication on the number of users served, data rates, transmission power, interference level, etc.). The system can be applied to a Virtual Antenna Array (VAA) as described above in connection with the first invention.

According to another aspect of the second invention there is provided a system for synchronisation of a network in which network there is at least one source of information and at least one sink of information in which the information is transmitted from the source(s) to the sink(s) by serially or simultaneously using one or several relaying links, the relaying links being spatially close such that, if the information is simultaneously relayed via several relays, the information reaches the sink(s) at the same time or with a deviation, which can be tolerated by the sink(s). Preferably the system is a CDMA based system.

Advantageously, the data stream for the users is spread with a distinct spreading code with given chip-rate for each user, each of the users receives the incoming data streams from the other users, optionally processes at least some of the data streams and relays the possibly processed data streams to the remaining users within the group of users and each of the users then finally processes the signal streams.

Preferably, if user m is addressed then n users form the virtual transmitting array and m-1=u-n-1 users the virtual receiving array where u-1 is the number of data streams processed, the virtual transmitting array of n users is formed through synchronous transmission within chip-length and the virtual receiving array of m-1 users is formed through retransmission out of chip-length.

Advantageously, the retransmission out of chip length is achieved through network imposed or natural delay.

Preferably, the required synchronisation for the virtual transmitting array is achieved through external network synchronisation.

Advantageously the required synchronisation for the virtual transmitting array is achieved by letting spatially close mobile terminals form a virtual transmitting array.

BRIEF DESCRIPTION OF THE DRAWINGS

Figure 24:
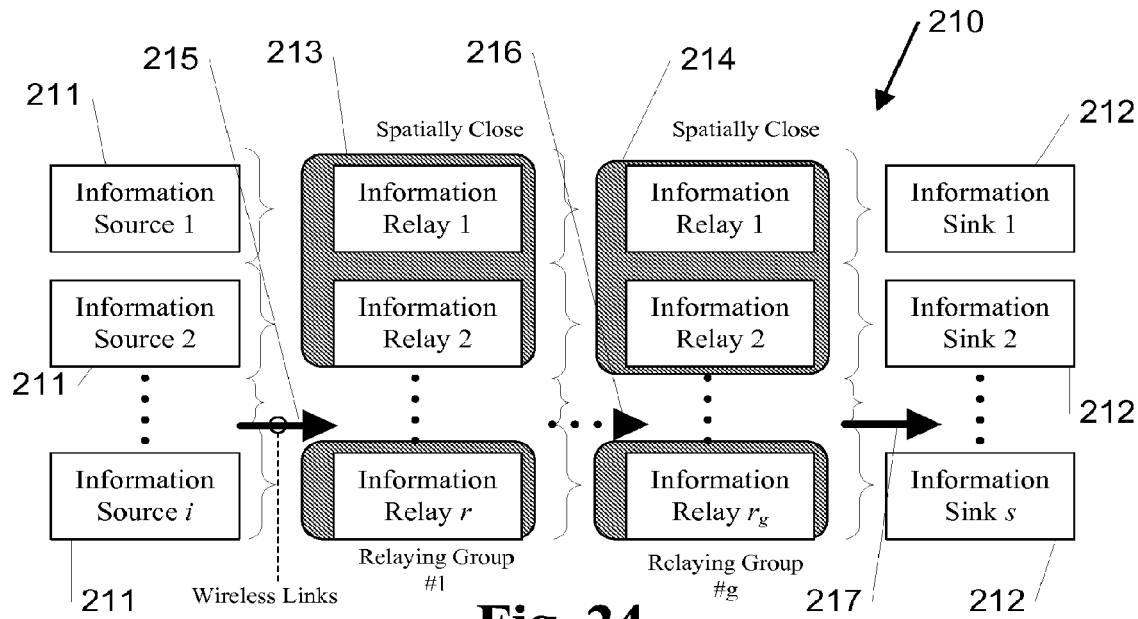
Figure 26:
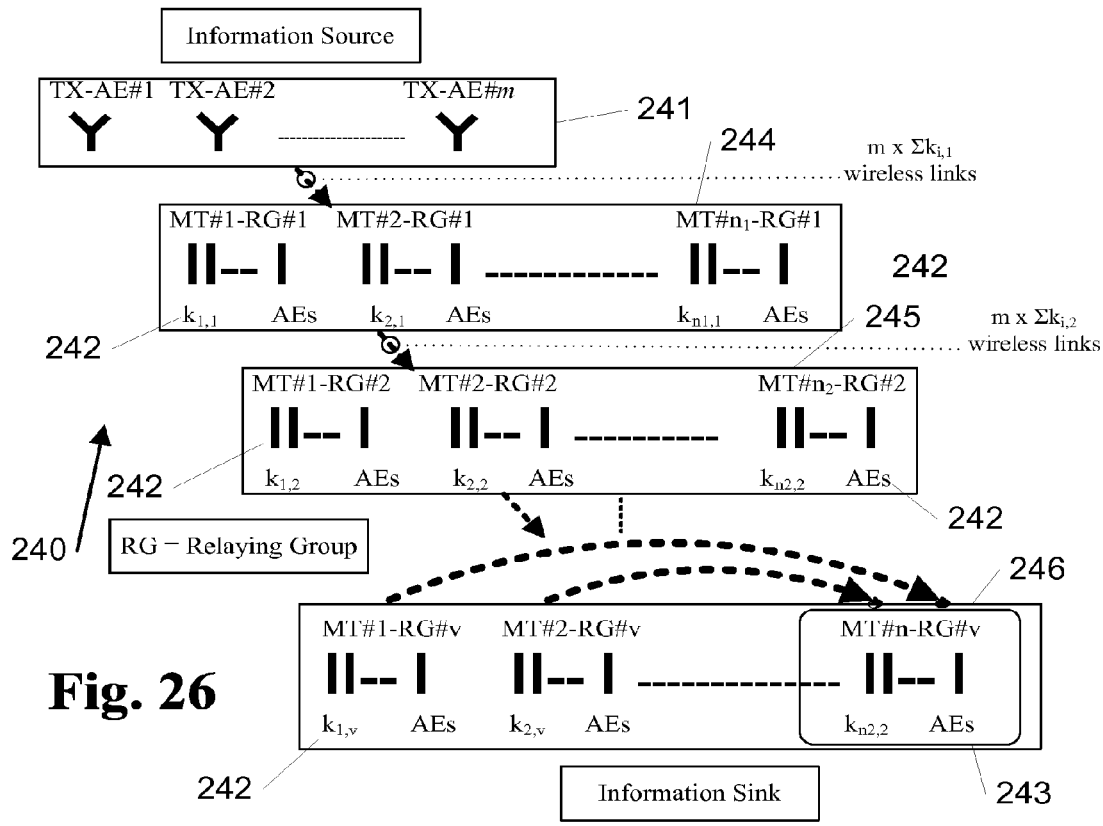
Figure 25:
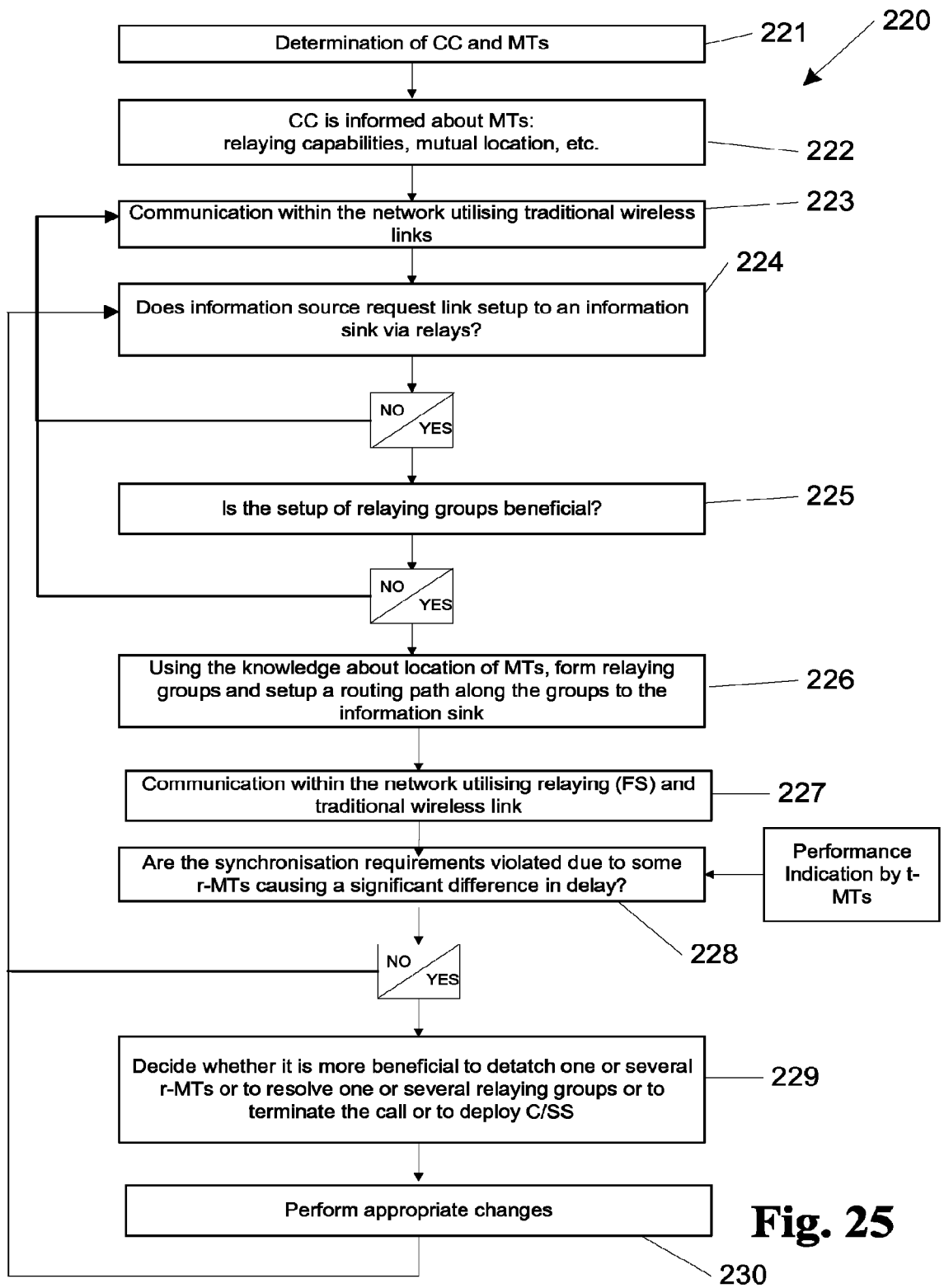
Figure 27:
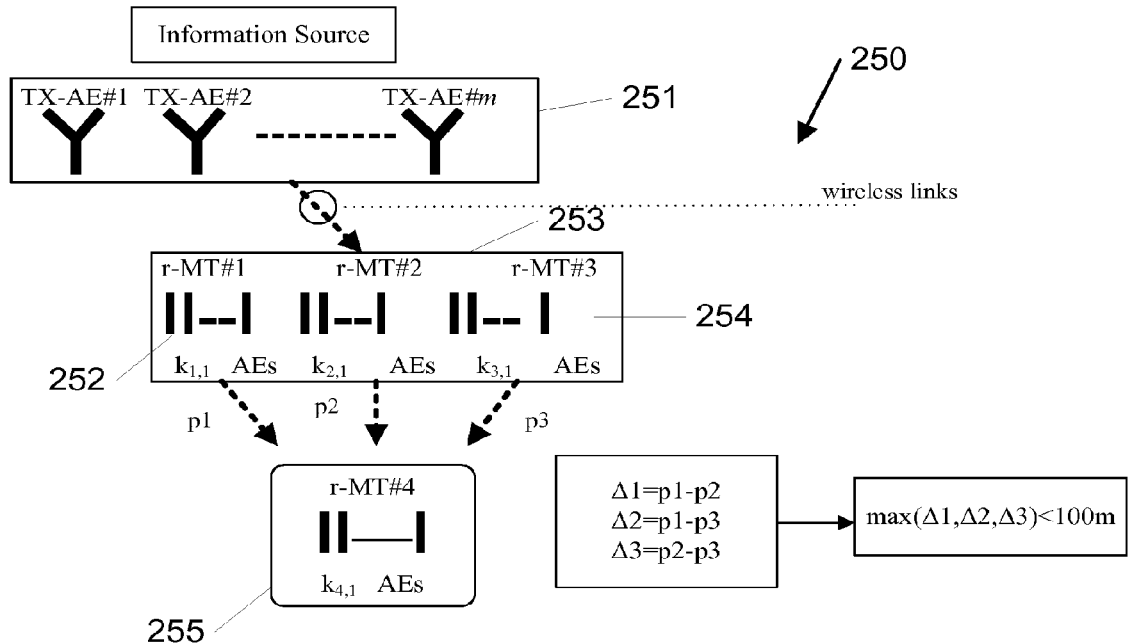
Figure 28:
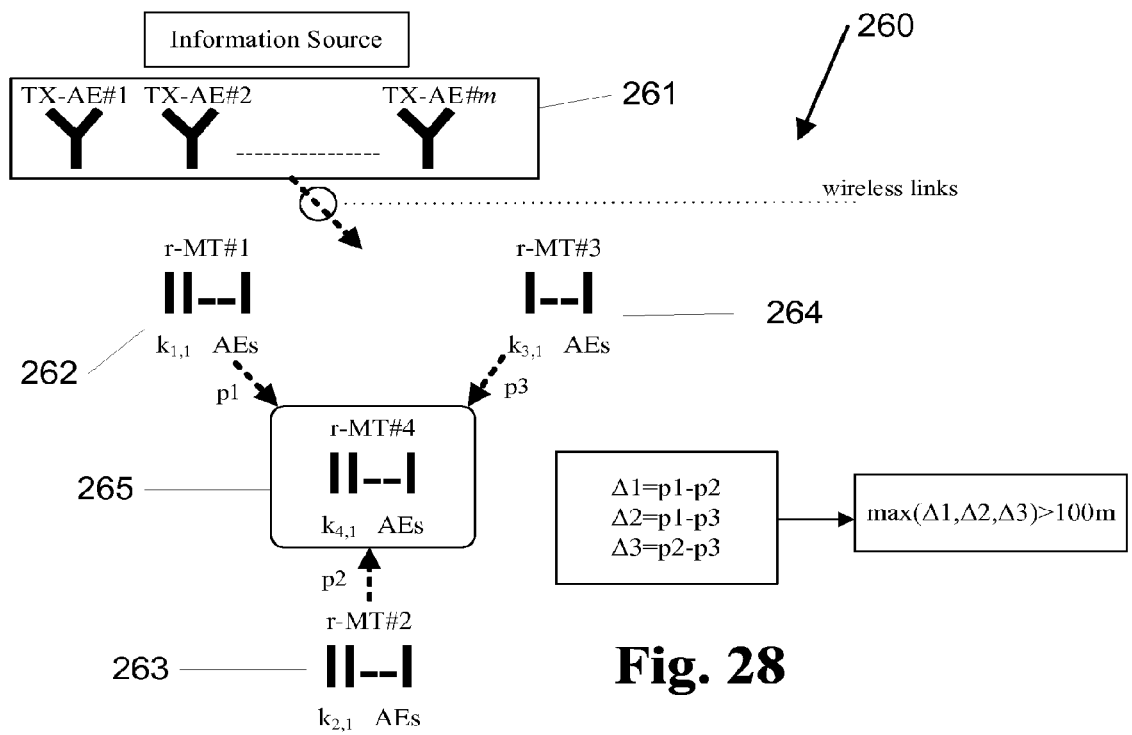

For a better understanding of the present invention, reference will now be made by way of example to the accompanying drawings in which:

FIG. 24 is a schematic flow diagram of an electronic data communication system operated in accordance with the present invention;

FIG. 25 is a flowchart of the stages of set up and operation of a data communication system in accordance with the present invention;

FIG. 26 is a schematic view of a first embodiment of a data communication system being operated in accordance with the present invention;

FIG. 27 is a schematic view of a second embodiment of a data communication system being operated in accordance with the present invention; and FIG. 28 is a schematic view of a third embodiment of a data communication system being operated in accordance with the present invention.

DETAILED DESCRIPTION OF THE PREFERRED EMBODIMENTS

Referring to FIG. 24 a diagram of a data communication system is generally identified by reference numeral 210 that comprises a group of i information sources 211. Data is to be transferred between the i information sources 211 to s information sinks 12 via two relay groups 213 and 214 respectively. Relay group 213 comprises r information relays and relay group 214 comprises g information relays. The information relays have been grouped together by a central controller (not shown) according to criteria that will be described in more detail below. In use, the data is broadcast over a wireless link 215 from the information sources 211, is relayed by relay group 213 to relay group 214 over a wireless link 216, and is sent from the relay group 214 to the information sinks 212 over a wireless link 217. Due to the organisation of each relay group 213 and 214, signals arrive at the information sinks 212 with a temporal separation within that which can be tolerated by the information sinks 212 i.e. the signals are synchronised.

In order to maintain the synchronisation of the signals from the information sources 211 whilst they pass via the relay groups 213 and 214, the central controller chooses those information relays of each relay group so that they a "spatially close" to one another. Spatially close can be defined as those information relays that generate a similar propagation time between receiving a signal and that signal being received at the next relay group or at the information sink, such that the relative delay between the signals is less than or equal to the delay that can be tolerated by the system. The exact delay that can be tolerated depends on the system, examples of which are given in more detail below. "Propagation time" should be understood as including the processing time at each information relay and the travel time of the electromagnetic waves between that information relay and the next relay group or information source. It is important to note that it is not the absolute delay of the signal that is important, but the relative delay imposed on copies of the signal by each information relay. For example, all of the information relays in one relay group may impose an absolute delay of 5 μs on all copies of the signal. On re-transmission it is possible that there is almost zero relative delay between the copies of the signal i.e. they are still synchronised.

Referring to FIG. 25 a flowchart showing the stages of set up and administration of a relay group is generally identified by reference numeral 220. The flowchart is intended as a guide for the design of an algorithm for implementing invention. At stage 221 the central controller (CC) is determined by a radio network controller (not shown) for example. The central controller might be a base station or a mobile terminal (e.g. mobile telephone or portable computer), for example. At stage 222 the CC polls potential information relays in its vicinity for status information including relaying capability and physical location. At stage 223 communication continues over traditional wireless links with each information sink (e.g. notebook computer and/or mobile telephone) communicating directly with a base station. At stage 224 the CC waits for a request from an information sink that it believes it would benefit from the relay of information. Alternatively, the request may be initiated if the system is reaching capacity in terms of available power, frequencies, codes etc. If such a request is received the CC determines at stage 225 whether such relaying would be of benefit to the system, for example by calculating the signal to interference ratio (SIR) and adding the gain expected from the relay group. If no, the CC returns to stage 223. If yes, the CC determines at stage 226 relay groups of those information relays it believes are spatially close to one another that would maintain the synchronisation of signals that they relay, and informs those terminals that they will be so used. The CC also determines the relaying route via one or more relay groups to the information sink at this stage. At stage 227 the CC instructs communication to begin between the information source and the sink, the signals being relayed by the relay groups until they ultimately reach the information sink. At stage 228 the CC monitors the result of the relaying process by receiving a performance indication from the information sink (for example the SIR in a CDMA network). If the performance indication says that signals are arriving at the information sink within a tolerance acceptable to the sink, then the relaying continues until the sink informs the CC otherwise. If the performance indication says that the signals are arriving out of synchronisation then the CC determines at stage 229 whether it would the situation would be improved by detaching one or more of the relay groups and/or information relays. Alternatively the CC may instruct employment of chip/symbol stretching as described more fully hereafter. As a final measure the CC may terminate the link between the information source and the information sink if it cannot reach a solution. The necessary changes are made at stage 30 and the routine returns to stage 224.

Referring to FIG. 26 a first embodiment of a data communication system is generally identified by reference numeral 240 that comprises a base station 241 having m antenna elements that serves a plurality of mobile terminals 242 (e.g. portable computer, personal digital assistant or mobile telephones). Each mobile terminal has a plurality of antenna elements. The base station 241 wishes to send data from a backbone (not shown) to a target mobile terminal 243. Under control of a CC (not shown) the mobile terminals 242 deemed suitable to act as relays have been grouped into two relay groups 244 and 245 as described above. Data is broadcast from the base station 241, the signal being received by the relay group 244, relayed to the relay group 245 and ultimately received by the target mobile terminal 243. Note that the target mobile terminal 243 is also part of a group 246 that fauns the information sink. Mobile terminals in the groups 246 only relay to the target mobile terminal 243, interference being reduced by appropriate power control. It is possible for the target mobile terminal 243 to be an information relay for the other members of the group 246. It is not necessary for all of the antennae of each mobile terminal to relay the signal. Only one antenna is needed.

Referring to FIG. 27 a second embodiment of a data communication system is generally identified by reference numeral 250 that comprises a base station 251 having m antenna elements that serves a four mobile terminals 252, 253, 254 and 255 (e.g. portable computer, personal digital assistant or mobile telephones). Each mobile terminal 252, 253, 254 and 255 has a plurality of antenna elements. In use, data from a backbone (not shown) is to be sent from the base station 251 to the target mobile terminal 255 (t-MT). Under control of a CC (not shown) the mobile terminals 252, 253 and 254 are determined to be suitable for use a relaying mobile terminals (r-MT) by virtue of their spatial separation. The CC has determined that relaying via these three mobile terminals should not cause the signal to de-synchronise. The path distance between r-MT 252 and t-MT 255 is p1, between r-MT 253 and t-MT 255 is p2 and between r-MT 254 and t-MT 255 is p3. In this case it is assumed that an access scheme is deployed which requires a synchronisation precision such that the maximum difference between the path distances p1, p2 and p3 is less than 100 m. The path distances are defined as:

$$\Delta 1 = p1 - p2$$

$$\Delta 2 = p1 - p3$$

$$\Delta 3 = p2 - p3$$

For this example if the maximum value [max($\Delta 1$, $\Delta 2$, $\Delta 3$)] between all three possible differences in path distance shall be less than 100 m and thus the data sent from the base station 251 via these mobile terminals will arrive synchronised at the t-MT 255. Note that the distance between the base station and the r-MTs was neglected in the calculation since it was assumed that the r-MTs are far from the transmitter.

Referring to FIG. 28 a data communication system is generally identified by reference numeral 260 that is similar to the data communication system 250 with like numerals indicating like parts. However, in this embodiment the r-MTs 262, 263 and 264 are in a position where their mutual path differences are more than 100 m, meaning that the signals at the t-MT arrive out of synchronisation with one another. This may be because the r-MTs have moved over time or if the t-MT has moved. This leads to performance deterioration and appropriate steps have to be initiated by the network or CC (see flowchart in FIG. 25). Note again that the distance between the transmitter and the r-MTs was neglected in the calculation since it was assumed that the r-MTs are far from the transmitter. In these two embodiments if a mobile terminal is moving with an average speed of 1 m/s the network topology remains synchronised for roughly 2 mins. Note that for stationary MTs or MTs moving in the same direction the synchronisation duration is significantly higher. Once the network becomes unsynchronised and thus the performance deteriorates, the CC has to be informed by the t-MT to re-assign relaying terminals or impose additional delays or to terminate the connection or to extend the chip/symbol duration, which increases the range around the target terminal in which terminals can act as relaying terminals without losing synchronisation. The concept of varying the chip/symbol duration such as to maintain forced synchronisation is referred to as Chip/Symbol Stretching (C/SS).

In all of the above embodiments there are a number of relaying and access (or transmission schemes that can be employed:

Relay Schemes

The signals from the base station may by relayed from the information relays in any of the following ways:

(1) transparent relaying; or
(2) regenerative relaying.

In transparent relaying the entire part of the electromagnetic signal received by each mobile terminal is amplified, possibly frequency translated (i.e. shifted in frequency) and re-transmitted. In regenerative relaying the entire part of the electromagnetic signal received by each mobile terminal is amplified, de-coded and then re-encoded with the same or a different code, possibly frequency translated (i.e. shifted in frequency) and re-transmitted.

Transmission Schemes

For CDMA based systems, the timing deviations tolerated at the information sink is of the order of one chip duration for CDMA based systems. The spatial constraints for the relaying mobile terminals or information relays with respect to the target mobile terminal depend on the chip rate (number of chips per second), where the maximum path difference (in m) between any relaying mobile terminal and the target mobile terminal should not be more than the speed of light [in m/s] divided by the chip-rate For instance, a Universal Mobile Telecommunications Service Wideband Code Division Multiple Access (UMTS W-CDMA) scheme has a chip rate of 3.84 Mcps (mega chips per second), which yields a maximum path difference of $3 \times 10^8 / 3.84 \times 10^6 \approx 80$ m. The relative path delay between relaying terminals and the target terminal is of importance, rather than the absolute path delay between relaying terminals and target terminal.

The invention can be employed within a CDMA network as follows. The data stream for u t-MTs is appropriately encoded, spread with u distinct spreading codes at given chip rate and transmitted. A first relay group receives the signal stream, where each MT within this group either transparently or regeneratively relays the information stream to another relay group, until the group of t-MTs is reached. If more than one MT forms the group of t-MTs, then each MT may act as a further r-MT for each t-MT. Synchronisation is achieved if the total time deviation caused by path differences involved in the relaying process does not exceed chip duration in the case of transparent relaying. Synchronisation is achieved if the maximum time deviation caused by path differences involved in the relaying process from one relaying group to another relaying group does not exceed chip duration in the case of regenerative relaying. Hybrid cases of transparent and regenerative relaying are possible, where the spatial requirements have to be adjusted appropriately.

For Time Division Multiple Access TDMA, the timing deviations tolerated are about ten percent of the symbol duration. The spatial constraints for the relaying terminals with respect to the target terminals depend on the symbol rate, where the maximum path difference (in m) between any relaying terminal and the target terminal should not be more than the speed of light (in m/s) divided by the symbol rate (in number per second). For instance, Global System for Mobile Communications (GSM) TDMA has a symbol rate of 270.8 kbps, which yields a maximum path difference of $3 \times 10^8 / [(270.8 \times 10^3) \cdot 10\%] \approx 100$ m. The relative path delay is of importance, rather than the absolute path delay.

The invention can be employed within a TDMA network as follows. The data stream for u t-MTs is appropriately encoded and transmitted at appropriate time slots and frequency bands. A first relay group receives the signal stream, where each MT within this group either transparently or regeneratively relays the information stream to the another relaying group, until the group of t-MTs are reached. If more than one MT forms the group of t-MTs, then each MT may act as a further r-MT for each t-MT. Synchronisation is achieved if the total time deviation caused by path differences involved in the relaying process does not exceed ten percent of the symbol duration in the case of transparent relaying. Synchronisation is achieved if the maximum time deviation caused by path differences involved in the relaying process from one relaying group to another relaying group does not exceed ten percent of the symbol duration in the case of regenerative relaying. Hybrid cases of transparent and regenerative relaying are possible, where the spatial requirements have to be adjusted appropriately.

For Orthogonal Frequency Division Multiple Access (OFDMA), the timing deviations tolerated are about ten percent of the symbol duration. The spatial constraints for the relaying terminals with respect to the target terminal depend on the symbol rate, where the maximum path difference (in m) between any relaying terminal and the target terminal should not be more than the speed of light (in m/s) divided by the symbol rate (in number per second). For instance, HiperLAN2 OFDM has a symbol rate of 250 ksps, which yields a maximum path difference of $3 \times 10^8 / [(250 \times 10^3) \cdot 10\%] \approx 120$ m. However, the target ranges (i.e. distance between base station and terminal) of HiperLAN2 are usually below 120 m. The relative path delay is of importance, rather than the absolute path delay.

If transparent relaying is to be deployed then the relative path differences along all relaying groups is of importance; whereas, if regenerative relaying is to be deployed then only the relative path differences from relaying group to relaying group are of importance.

Hardware and Software (1) Transmitter

Assuming that C/SS is not to be used then no hardware changes are necessary in a transmitter. If C/SS is to be used then the transmitter has to be able to adapt to the new timing/clock requirements for the new chip/symbol durations.

The following software changes should be made in a transmitter. Appropriate algorithms have to guarantee proper encoding and transmission utilising the relaying network. If the network inevitably bases on relaying, e.g. in the case of deployed VAA, then no additional software changes have to be performed in the transmitting information source. If C/SS is deployed then the algorithms have to take the new chip/symbol rates into account.

(2) Relay Terminal

The following hardware changes should be made in a relay terminal. The relay has to guarantee a proper reception, amplification, possibly processing (decoding, encoding with the same or different code), possibly a frequency translation and retransmission. If the network inevitably bases on relaying, e.g. in the case of deployed VAA, then no additional hardware changes have to be performed in the relay. If C/SS is deployed then the relay has to be able to adapt to the new chip/symbol rates.

The following software should be made in the relay terminal. If transparent relaying is to be performed then no further software changes are required. If regenerative relaying is to be deployed then the relay has to guarantee a proper decoding and re-encoding with the same or different code. If the network inevitably bases on relaying, e.g. in the case of deployed VAA, then no additional software changes have to be performed in the relay. If C/SS is deployed then the algorithms have to take the new chip/symbol rates into account.

(3) Target Terminal

The following hardware changes should be made in receiving information sink or target terminal. The hardware has to guarantee a proper reception of possibly the direct link from the source to the sink and the synchronised relaying links within tolerable delays. If C/SS is deployed then the receiver has to be able to adapt to the new chip/symbol rates.

The following software changes should be made within receiving information sink or target terminal. The algorithms have to be able to process synchronised signal streams so as to give optimum performance in terms of SIR and capacity (bits/s/Hz) for example. They should be sufficiently robust to withstand some synchronisation errors. To aid this C/SS could be deployed, where the algorithms have to take the new chip/symbol rates into account.

The following changes should be made in a network with in which the present invention is operated. The network should have at least one CC as to decide which MTs form relaying groups such as to guarantee an information routing between source and sink with synchronisation deviations within the tolerated limits. Note that a proper routing without CC is also possible. The network should also be able to detach those MTs from relaying groups or resolve relaying groups entirely, which cause synchronisation deviations at the receiver out of the tolerated limits. The network should also be able to decide on a possible deployment of C/SS by finding a trade-off between data-throughput and data rates depending on the application.

It is a feature of the present invention that it can be applied to any network and provides a simple means for achieving synchronisation. Thus, envisaged network topologies can operate and survive without major external control.

The relaying terminals are assumed to require the same internal relaying time, thus using similar hardware with similar internal clocks. In this case, the timing deviations tolerated by the system solely depend on the access scheme. If the relaying times of the relaying terminals differ then the time deviations calculated below have to be adjusted appropriately.

----------oOo----------

The present invention relates to a system useful for use in any mobile, fixed or nomadic, ad-hoc or meshed, centralised or decentralised, wireless network.

In the context of this invention, synchronisation is understood to be the temporal alignment of at least two signals at a receiver sent by a transmitter within tolerable temporal limits. Synchronisation is vital as to guarantee orthogonality between communication channels and optimum received signal quality.

In general, any network needs synchronisation, which is usually achieved by either automatic (self) synchronisation or a Central Controller (CC). Within a wireless network, synchronisation is necessary on application and network level, on super-frame, frame and slot level, on symbol, bit and chip level and on carrier frequency level. Traditionally, the application and network level is synchronised by the running application; the super-frame, frame and slot level is synchronised by the CC; and the symbol, bit, chip and carrier frequency level are self synchronised at the receiver with the aid of tracking loops, such as PLL.

Synchronisation usually has to be re-initiated when the signal bearer undergoes certain changes. Thus, with a change of network the application layer has to initiate a new synchronisation between transmitter and receiver at application layer; with the change of a communication session at physical layer the CC has to re-initiate synchronisation of super-frame, frame and time slot; with the change of the propagation environment the tracking loops have to guarantee continuous synchronisation at symbol, bit, chip and carrier frequency level.

Synchronisation algorithms at application layer and within the CC to synchronise application, network, super-frame, frame and time-slot are well established; such are automatic self-synchronising algorithms for symbol, bit, chip and carrier frequency. We have now invented a system, which enables automatic synchronisation within a network with changing topology at super-frame, frame and time-slot, as well as at symbol, bit and chip level without the supervision of a CC.

According to the invention there is provided a system for synchronisation of a network in which there is at least one source of information and at least one sink of information in which the information is transmitted from the source(s) to the sink(s) by using one or several transparent or regenerative relaying links, the relaying links being spatially close and requiring the same relaying time such that if the information is instantaneously or equally delayed relayed via several relays the information reaches the sink(s) at the same time or with a deviation, which can be tolerated by the sink(s).

In use, one or a group of sources wishes to communicate to one or a group of sinks providing a synchronised single/multi-point to single/multi-point communication link through a group of relays. Synchronisation at super-frame, frame and time slot level is necessary as to prevent interference between consecutive super-frames, frames and time slots. For instance, if two relays are deployed and the temporal difference between the two relays to achieve the relaying process is significantly smaller than the frame length but in the magnitude of the time slot length, then the system appears synchronised at super-frame and frame level, however, unsynchronised at time slot level, which leads to time slot interference. Similar, synchronisation at symbol, bit and chip level is necessary as to prevent interference between consecutive symbols, bits and chips. For instance, if two relays are deployed and the temporal difference between the two relays to achieve the relaying process is significantly smaller than the symbol length but in the magnitude of the chip length, then the system appears synchronised at symbol level, however, unsynchronised at chip level, which leads to inter-chip interference. Note that synchronisation at frequency carrier level is vital as to obtain an optimum signal strength. It is assumed that appropriate tracking loops guarantee (self) synchronisation at carrier level; it is not part of this invention.

If the signals were transmitted synchronised at super-frame, frame, time-slot, symbol, bit and chip level from the information source and relayed by at least one group of relays which are spatially close (such as to require a similar physical propagation time) and inherit the same processing time, then the signals are received by the information sink synchronised within tolerable limits. The tolerable limits dictate the allowed difference in propagation and processing time. At super-frame, frame and time slot level a delay of less than one percent is usually tolerated. At symbol and bit level a delay of less than ten percent is usually tolerated. At chip level a delay of less than hundred percent is usually tolerated. Timing tolerances are thus dictated by the access scheme, which may operate at symbol or chip level. CDMA based systems require a delay difference of less than one chip duration, whereas TDMA based systems require a delay difference significantly less than a symbol duration. As long as propagation and processing times do not change out of the timing tolerances, the system remains synchronised without the necessity of supervision by a CC; thus achieving automatic self-synchronisation.

The concept is referred to as Forced Synchronisation (FS).

The system is applicable to any form of wireless network with deployed relays where synchronisation of the received signals at the target mobile terminal (MT) is essential to an optimum system performance. For instance, if the relaying MTs (r-MTs) are utilised to act as a virtual transmit or receive array for a given target MT (t-MT) and MRC is to deployed at the t-MT then the signals relayed by the r-MTs should reach the t-MT synchronised within tolerances.

In a preferred, although not restricted to, embodiment of the invention the r-MT are assumed to require the same relaying time, thus using similar hardware with similar internal clocks. Then, the timing deviations tolerated by the system solely depend on the access scheme. If the relaying times of the r-MTs differ then the time deviations calculated below have to be adjusted appropriately.

In use, the timing deviations tolerated are in the magnitude of chip duration for CDMA based systems. The spatial constraints for the r-MTs with respect to the t-MT depend on the chip rate, where the maximum path difference [in m] between any r-MT and the t-MT should not be more than the speed of light [in m/s] divided by the chip-rate [in 1/s]. For instance, UMTS W-CDMA has a chip rate of 3.84 Mcps, which yields a maximum path difference of 3e8/3.84e6≈80 m. Note that not the absolute path delay between r-MTs and t-MT but the relative path delay between r-MTs and t-MT is of importance.

In use, the timing deviations tolerated are about ten percent of the symbol duration for TDMA based systems. The spatial constraints for the r-MTs with respect to the t-MT depend on the symbol rate, where the maximum path difference [in m] between any r-MT and the t-MT should not be more than the speed of light [in m/s] divided by the symbol rate [in 1/s]. For instance, GSM TDMA has a symbol rate of 270.8 kbps, which yields a maximum path difference of 3e8/270.8e3·10%≈100 m. Note again that not the absolute path delay but the relative path delay is of importance.

In use, the timing deviations tolerated are about ten percent of the symbol duration for OFDMA based systems. The spatial constraints for the r-MTs with respect to the t-MT depend on the symbol rate, where the maximum path difference [in m] between any r-MT and the t-MT should not be more than the speed of light [in m/s] divided by the symbol rate [in 1/s]. For instance, HiperLAN2 OFDM has a symbol rate of 250 ksps, which yields a maximum path difference of 3e8/250e3·10%≈120 m. Note that the target ranges of HiperLAN2 are usually below 120 m. Note again that not the absolute path delay but the relative path delay is of importance.

Note that if transparent relaying is to be deployed then the relative path differences along all relaying groups is of importance; whereas, if regenerative relaying was to be deployed then only the relative path differences from relaying group to relaying group are of importance.

In a preferred, although not restricted to, embodiment of the invention forced synchronisation is achieved and maintained as follows. First, it is assumed that a CC has setup a transmission path between an information source and information sink via at least one group of relays. The relays in each group should have such spatial constrains as to guarantee relaying with total timing deviations tolerated by the information sink. The CC thus has knowledge of the spatial distribution of the MTs within the network. Note that the CC not necessarily has to be the information source or sink. Then, the information source transmits the signal to the first group of relays, which receive the signal and possibly retransmit the signal to another group of relays, etc., until the last group of relays retransmits the signal to the information sink. Note that the process of relaying may involve, but is not restricted to, transparent and regenerative relaying. Regenerative relaying may involve decoding and re-encoding with the same or a different code. The receiver receives the signal and performs the appropriate detection/demodulation/decoding, where performance in terms of bit or packet error rate is maximised if all relayed signal streams are received synchronised with deviations tolerated. If during the operation of such network the network topology changes, e.g. due to moving r-MTs or a time variant propagation environment, then the signal stream will remain synchronised at the t-MT as long as the topological changes do not cause any delays exceeding the deviations tolerated by the system. For typical networks in deployment the total mutual path differences should not exceed roughly 100 m. Assuming, for instance, MTs moving with an average speed of 1 m/s the network topology remains synchronised for roughly 2 mins. Note that for stationary MTs or MTs moving in the same direction the synchronisation duration is significantly higher. Once the network becomes unsynchronised and thus the performance deteriorates, the CC has to be informed by the t-MT to re-assign relaying terminals or impose additional delays or to terminate the connection or to extend the chip/symbol duration.

The concept of varying the chip/symbol duration such as to maintain forced synchronisation is referred to as Chip/Symbol Stretching (C/SS).

Applying the concept of retransmission of information between spatially distributed but sufficiently close relays allows the formation of virtual information sources and information sinks which allows the deployment multiple-input-multiple-output (MIMO) capacity measures, e.g. in form of Space-Time Codes, and thus leads to an increase in system capacity in terms of bits/s/Hz (with implication on the number of users served, data rates, transmission power, interference level, etc.). The system can be applied to a Virtual Antenna Array (VAA) as described in above.

In a preferred, although not restricted to, embodiment of the invention forced synchronisation is achieved within a CDMA network as follows. The data stream for u t-MTs is appropriately encoded, spread with u distinct spreading codes at given chip rate and transmitted. The first relaying group receives the signal stream, where each MT within this group either transparently or regeneratively relays the information stream to the next relaying group, until the group of t-MTs are reached. If more than one MT forms the group of -MTs, then each MT may act as a further r-MT for each t-MT. Synchronisation is achieved if the total time deviation caused by path differences involved in the relaying process does not exceed chip duration in the case of transparent relaying. Synchronisation is achieved if the maximum time deviation caused by path differences involved in the relaying process from one relaying group to another relaying group does not exceed chip duration in the case of regenerative relaying. Note that hybrid cases of transparent and regenerative relaying are possible, where the spatial requirements have to be adjusted appropriately.

In a preferred, although not restricted to, embodiment of the invention forced synchronisation is achieved within a TDMA network as follows. The data stream for u t-MTs is appropriately encoded and transmitted at appropriate time slots and frequency bands. The first relaying group receives the signal stream, where each MT within this group either transparently or regeneratively relays the information stream to the next relaying group, until the group of t-MTs are reached. If more than one MT forms the group of t-MTs, then each MT may act as a further r-MT for each t-MT. Synchronisation is achieved if the total time deviation caused by path differences involved in the relaying process does not exceed ten percent of the symbol duration in the case of transparent relaying. Synchronisation is achieved if the maximum time deviation caused by path differences involved in the relaying process from one relaying group to another relaying group does not exceed ten percent of the symbol duration in the case of regenerative relaying. Note that hybrid cases of transparent and regenerative relaying are possible, where the spatial requirements have to be adjusted appropriately.

It is a feature of the present invention that no hardware changes have to be performed within a transmitting information source if no C/SS is to be deployed. If C/SS is deployed then the transmitter has to be able to adapt to the new timing/clock requirements for the new chip/symbol durations.

It is a feature of the present invention that the following software changes have to be performed within a transmitting information source. Appropriate algorithms have to guarantee proper encoding and transmission utilising the relaying network. If the network inevitably bases on relaying, e.g. in the case of deployed VAA, then no additional software changes have to be performed in the transmitting information source. If C/SS is deployed then the algorithms have to take the new chip/symbol rates into account.

It is a feature of the present invention that the following hardware changes have to be performed within a relay. The relay has to guarantee a proper reception, amplification, possibly processing (decoding, encoding with the same or different code), possibly a frequency translation and retransmission. If the network inevitably bases on relaying, e.g. in the case of deployed VAA, then no additional hardware changes have to be performed in the relay. If C/SS is deployed then the relay has to be able to adapt to the new chip/symbol rates.

It is a feature of the present invention that the following software changes have to be performed within a relay. If transparent relaying is to be performed then no further software changes are required. If regenerative relaying is to be deployed then the relay has to guarantee a proper decoding and re-encoding with the same or different code. If the network inevitably bases on relaying, e.g. in the case of deployed VAA, then no additional software changes have to be performed in the relay. If C/SS is deployed then the algorithms have to take the new chip/symbol rates into account.

It is a feature of the present invention that the following hardware changes have to be performed within a receiving information sink. The hardware has to guarantee a proper reception of possibly the direct link from the source to the sink and the synchronised relaying links within tolerable delays. If C/SS is deployed then the receiver has to be able to adapt to the new chip/symbol rates.

It is a feature of the present invention that the following software changes have to be performed within a receiving information sink. The algorithms have to be able to process synchronised signal streams such as to give optimum performance. They should be sufficiently robust to guarantee some synchronisation errors. To aid this C/SS could be deployed, where the algorithms have to take the new chip/symbol rates into account.

It is a feature of the present invention that the following changes have to be performed within a network with forced synchronisation. The network should have at least one CC as to decide which MTs form relaying groups such as to guarantee an information routing between source and sink with synchronisation deviations within the tolerated limits. Note that a proper routing without CC is also possible. The network should also be able to detach those MTs from relaying groups or resolve relaying groups entirely, which cause synchronisation deviations at the receiver out of the tolerated limits. The network should also be able to decide on a possible deployment of C/SS by finding a trade-off between data-throughput and data rates.

It is a feature of the present invention that it can be applied to any network and provides a simple means for achieving synchronisation. Thus, envisaged network topologies can operate and survive without major external control.

The invention is illustrated in the accompanying drawings in which:

FIG. 24 shows a generic information flow for FS schemes

FIG. 25 illustrates the flowchart to guarantee forced synchronisation in the network FIG. 26 illustrates a generic FS scheme applied to a wireless system FIG. 27 illustrates a FS scheme where the r-MTs guarantee synchronisation FIG. 28 illustrates a FS scheme where the r-MTs do not guarantee synchronisation Referring to FIG. 24, a group of information sources i communicates to a group of information sinks s via at least one group of relays r. Only relays that are spatially close together are used to accomplish the forced synchronisation. There might be several groups of spatially close relays. There might be several information sinks and information sources, which not necessarily have to be linked in a unique and unambiguous manner.

Referring to FIG. 26, it shows the most generic case of a network with deployed FS in downlink. Data is received for MTs within the network from a backbone, encoded and transmitted by a TX with m antenna elements. It is received by the first relaying group and relayed to the next relaying group. The relaying might be transparent or regenerative with appropriate decoding/encoding/frequency translating processes. The signals are received by the second relaying group where the same as in the first relaying group takes place. This continues until the target receiver or relaying group is reached. A t-MT is r-MT for other t-MTs in the same target relaying group. Note that each MT may consist of more than one antenna element, where at least one is involved in the process of relaying.

Referring to FIG. 27, it shows an illustrative case of a network with deployed FS. The transmitter consisting of an in element antenna array transmits the signal for the t-MT via three r-MTs. Note that each of the MTs may have more than one antenna element. The path distance between r-MT#1 and t-MT#4 is p1, between r-MT#2 and t-MT#4 is p2 and between r-MT#3 and t-MT#4 is p3. In this case it is assumed that an access scheme is deployed which requires a synchronisation precision such that the maximum difference between the path distances is less than 100 m. For the given example the maximum value between all three possible differences in path distance shall be less than 100 m and thus the signals arrive synchronised at the t-MT. Note that the distance between the transmitter and the r-MTs was neglected in the calculation since it was assumed that the r-MTs are far from the transmitter.

Referring to FIG. 28, it shows an illustrative case of a network with deployed FS. The transmitter consisting of an m element antenna array transmits the signal for the t-MT via three r-MTs. Note that each of the MTs may have more than one antenna element. The path distance between r-MT#1 and t-MT#4 is p1, between r-MT#2 and t-MT#4 is p2 and between r-MT#3 and t-MT#4 is p3. In this case it is assumed that an access scheme is deployed which requires a synchronisation precision such that the maximum difference between the path distances is less than 100 m. For the given example the maximum value between all three possible differences in path distance shall exceed 100 m and thus the signals arrive unsynchronised at the t-MT. This leads to performance deterioration and appropriate steps have to be initiated by the network or CC. Note again that the distance between the transmitter and the r-MTs was neglected in the calculation since it was assumed that the r-MTs are far from the transmitter.

Referring to FIG. 25, it depicts the flowchart describing a suggested procedure as to guarantee forced synchronisation within a wireless network. Note that the CC has to have knowledge about the locations of the MTs.

FIELD OF THE THIRD INVENTION

The third invention relates to a method of transmitting data between at least one information source and at least one information sink using electromagnetic waves, to a computer program for performing such a method, to a computer readable storage medium, to a transmitter for use in the method and to a subscriber identity module card.

BACKGROUND TO THE THIRD INVENTION

The envisaged scenario of wireless networks beyond 3G focuses on network topologies that support all current and future developed networks. Such topologies will rely more and more on a direct and ad-hoc (i.e. temporary) mode of communication such that there will not be a significant difference between a base station (BS) and mobile terminal (MT). Each MT can be seen as an information source, a relaying hop or/and a terminating information sink. Such network topology inevitably requires a direct mode of communication between at least one source MT (s-MT) and at least one target MT (t-MT) via at least one relaying MT (r-MT).

A procedure that has been proposed to allow such direct communication utilises TDMA-based relaying along a plurality of mobile handsets. The system is known as Opportunity Driven Multiple Access (ODMA). The main problem occurred with such deployment is that the r-MT could not communicate with both, the s-MT and the t-MT, at the same time and thus interrupting the session between both. Therefore, a TDMA based approach was adopted where the r-MT receives the signal stream during one time slot and retransmits it during the consecutive time slot. It thus diminishes the system capacity measured in bits/s/Hz. It further prevents the application of multiple-input-multiple-output (MIMO) capacity measures in form of e.g. Space-Time Codes or BLAST-like techniques and also gives rise to problems of billing as the r-MT would incur the charges which were generated for the t-MT.

A traditional approach has been to use frequency duplex systems where the MTs communicate with the BS simultaneously in up and downlink frequency, e.g. Universal Mobile Telecommunication Service (UMTS). Such approach is not applicable to ad-hoc networks where a clear up- and downlink does not exist as such and where more than two simultaneous links are required.

SUMMARY OF THE THIRD INVENTION

It is apparent that there is a need for a MT to be a r-MT for at least one s-MT or BS and a t-MT for at least one s-MT, r-MT or BS at the same time. There is also a need for a simultaneous wireless connection between at least one s-MT or BS and at least one t-MT via at least one r-MT.

According to the third invention there is provided a method of transmitting data between at least one information source and at least one information sink using electromagnetic waves, which method comprises the steps of:

(a) identifying at least one information relay; and (b) instructing the at least one information relay to relay data received from the information source intended for the information sink on an unused frequency band such that simultaneous communication can take place between the information source and sink whilst said information relay relays data to the information sink.

Preferred features of the invention are set out in the attached claims to which attention is hereby directed.

As mentioned above the first and second inventions can be advantageously employed together or individually in the third invention.

In use, one or a group of sources wishes to communicate to one or a group of sinks providing a single/multi-point to single/multi-point communication link through a group of relays, which themselves could be information sources or sinks. Then the r-MTs have to be able to receive the to-be-relayed information within at least one frequency band and the relaying is accomplished by retransmission within at least one different frequency band.

The concept is referred to as Frequency Relaying (FR).

According to another aspect of the third invention there is provided a system for transmitting and receiving signals in which there is a wireless connection between an information source and information sink in which a relaying procedure is accomplished using an unused frequency band such that there can be simultaneous communication between the source and the sink and each source and sink can function as a source, sink or relay.

Preferably, the relayed signal is re-transmitted at another frequency.

Advantageously, at least one source communicates with at least one sink by providing a single/multi-point to single/multi-point communication link through at least one relay, which relay is an information source or sink and in which the relay is able to receive the to-be-relayed information and the relaying is accomplished by retransmission by the relay at a different frequency band.

Preferably, the relay transceiver has another programmable oscillator besides its uplink and downlink oscillators which another programmable oscillator retransmits the relayed signal at a different frequency.

Advantageously, the controlling program of the receiver can cut the uplink connection and reprogram the re-programmable uplink oscillator to the relaying or re-transmitting frequency.

Preferably, the system is a CDMA-scheme.

Advantageously, the data stream for u users is spread with u distinct spreading codes with given chip-rate, each of the u users receives the u incoming data streams at frequency $f_1$, optionally processes u-1 data streams and relays the possibly processed u-1 data streams at assigned frequencies $f_2$, $f_3$, etc. to the remaining users within the group of u users, each of the u users then receives its information at frequency $f_1$ and $f_x$ and processes u signal streams.

BRIEF DESCRIPTION OF THE DRAWINGS

Figure 29:
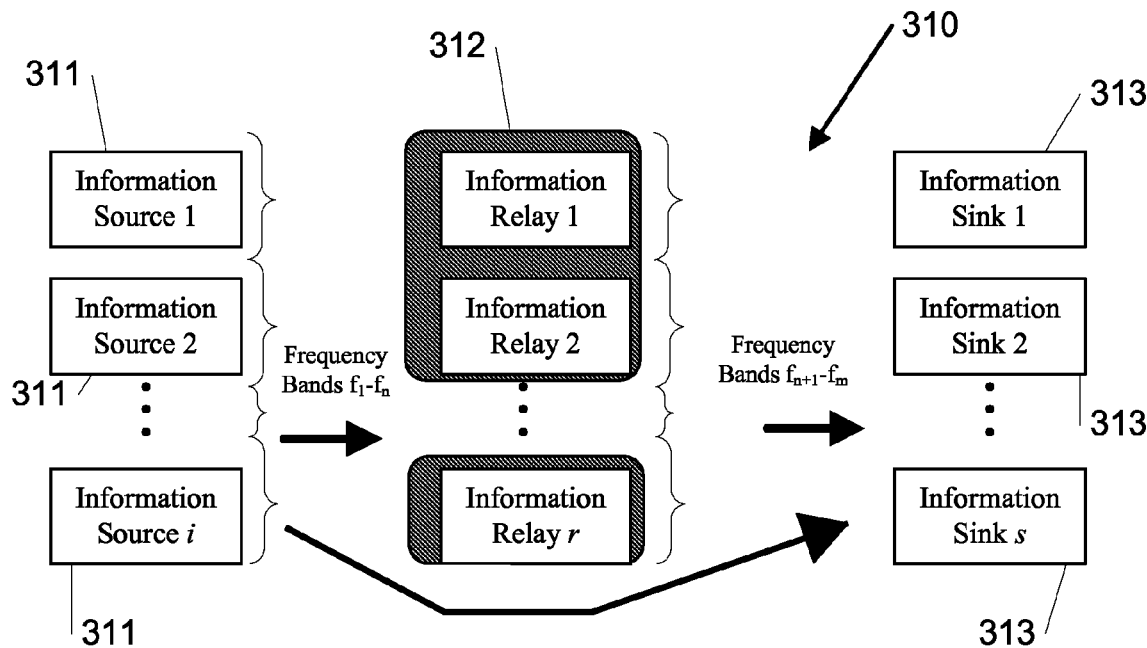
Figure 30:
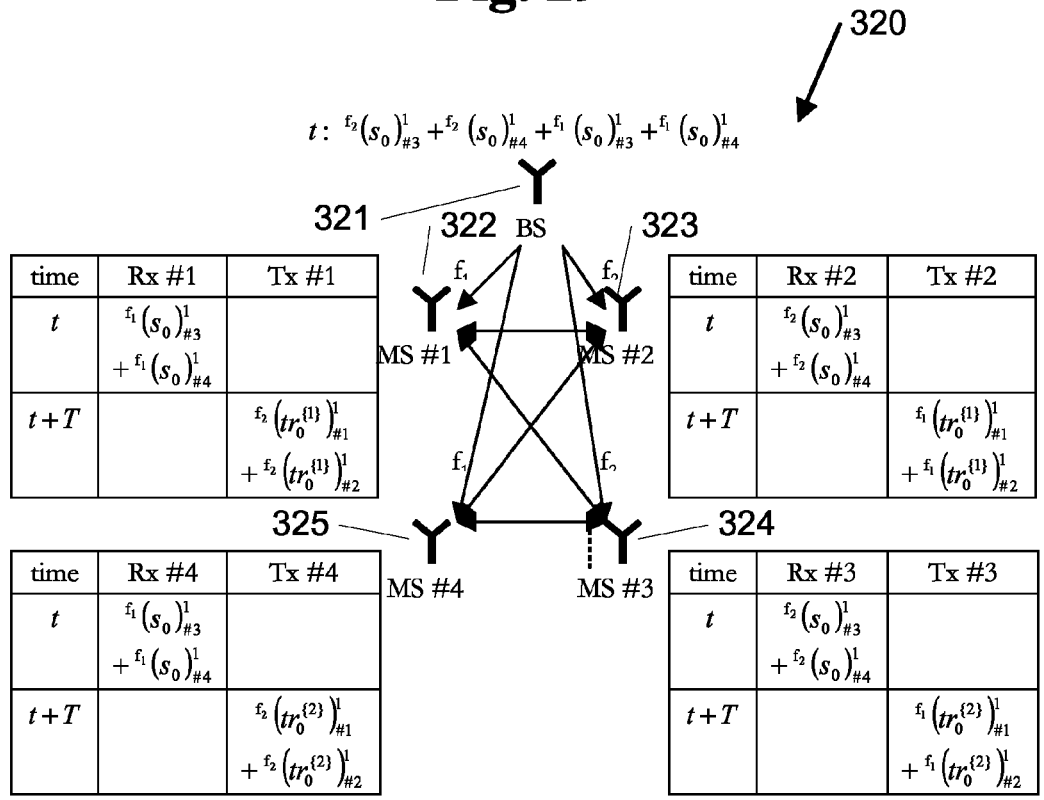

FIG. 29 is a schematic view of a first embodiment of a data communication system operating in accordance with the present invention; and FIG. 30 is a schematic view of a second embodiment of a data communication system operating in accordance with the present invention;

DETAILED DESCRIPTION OF THE PREFERRED EMBODIMENTS

Referring to FIG. 29 a data communication system is generally identified by reference numeral 310 that comprises i information sources 311, r information relays 312 and s information sinks 313. The information sources, relays and sinks can be base stations and/or mobile terminals (for example portable computers, mobile telephones). In use data is to be sent from one or more of the information sources 11 to one or more of the information sinks 313, via one or more information relays 312, each of which communicates via electromagnetic waves ("wireless" link). The information relays 312 are chosen such that data relayed therefrom remains synchronised as described above. Data is sent from the information sources 311 on frequencies $f_1$ to $f_n$ respectively and is received by all of the information relays 12. Each information relay 312 receives data on frequencies $f_1$ to $f_n$ and has been instructed to relay the data on frequencies $f_{n+1}$ to $f_m$ respectively, where $f_{n+1}$ to $f_m$, are unused frequency bands different to $f_1$ to $f_n$. In this way the information relays 312 can communicate simultaneously with the information sources 311 and the information sinks 313, and communication directly between the information sources 311 and the information sinks 313 does not have to be interrupted.

Referring to FIG. 30 a second embodiment of a data communication system is generally identified by reference numeral 320 that comprises a base station 321 and four mobile terminals 322, 323, 324 and 325. The base station transmits the signal to the mobile terminals 322, 323, 324 and 325 on frequencies $f_1$ and $f_2$ as shown. The symbols for the 'right' terminals 323 and 324 are sent to the 'left' terminals 322 and 325 and vice versa. The signals could be, but are not restricted to, Trellis encoded and retransmitted on different frequency bands respectively to the other group.

The embodiments described above can be implemented via any or any combination of the access schemes described below.

In one embodiment of the invention simultaneous communication between a base station (BS), relaying mobile terminal (r-MT) and a target mobile terminal (t-MT) is assumed. In this case, (1) the BS has to communicate with the r-MT and the t-MT in up and downlink, (2) the r-MT has to communicate with the BS in up and downlink and with the t-MT in forward and backward link, and (3) the t-MT has to communicate with the BS in up and downlink and with the r-MT in forward and backward link. Thus each terminal involved requires four communication channels. Since a terminal cannot transmit and receive at the same time at the same frequency, it is necessary either to (a) use two frequency bands and two time slots and one code, (b) two frequency bands, one time slot and two codes, (c) one frequency band, two time slots and two codes, (d) four frequency bands, one time slot and one code, (e) one frequency band, four time slots and one code, or (f) one frequency band, one time slot and four codes, or other hybrid solutions. Since system efficiency or capacity is measured in bits/s/Hz, the number of time slots and frequency bands utilised should be minimised. However, to deploy four codes raises problems with power control inherent to all code division multiple access (CDMA) based systems. Various deployments in accordance with the invention are feasible. Firstly, the BS maintains communication with the t-MT and r-MT on two frequencies, traditionally up and downlink. The r-MT communicates simultaneously with the t-MT on a third frequency, where orthogonality (i.e. separability of communication channels) is maintained either through time slot or code. Second, the r-MT stops communicating with the BS in the uplink and reprograms the uplink oscillator on the direct link frequency, which could be advantageously deployed where terminals are substantially static where an uplink communication with the BS is not vital, for example in a packet switched network where traffic flow is asymmetric. Third, a fourth oscillator is deployed to communicate in forward and backward link between the r-MT and t-MT. Fourth, the BS communicates with the r-MT and the t-MT in two different frequency bands for up and downlink. Then, relaying is accomplished in the appropriate downlink frequency band of the other MT. Further hybrid combinations are possible.

In another embodiment of the invention simultaneous communication between at least one r-MT, at least one t-MT and possibly at least on BS is assumed. Such embodiment requires the provision of an appropriate amount of frequency bands, and thus sufficient oscillators within the MTs, to be able to support the simultaneous multi-point-to-multi-point communication scenario.

In one embodiment, a CDMA-scheme is employed and the data stream for u users is spread with u distinct spreading codes with given chip rate. Each of the u users receives the u incoming data streams at frequency $f_1$, possibly processes u-1 data streams and relays the possibly processed u-1 data streams at assigned frequencies $f_2$, $f_3$, etc. to the remaining users within the group of u users. Each of the u users then receives its information at the relaying frequencies $f_2$, $f_3$, etc. and thus processes u signal streams In another embodiment, a TDMA-scheme is employed and the data stream for u users is transmitted at appropriate time slots and frequency bands. Each of the u users receives the u incoming data streams at the specific time slot and specific frequency band, possibly processes u-1 data streams and relays the possibly processed u-1 data streams at least one of the assigned frequencies $f_2$, $f_3$, etc. to the t-MT within the group of u users. Each of the u users then receives its information at frequency $f_1$ and at least one frequency $f_x$ and thus processes at least two signal streams.

It is not necessary to make any hardware changes in a transmitter operating in accordance with the invention.

The following software changes should be in transmitter or any logical unit controlling the transmitter antenna array. The (software) algorithms have to control the setup and release of relaying frequency oscillators in use. They have to inform adjacent MTs about the possibility to setup a relaying connection. They have to control the association and disassociation of MTs to and from a relaying routing path. They have possibly to control synchronisation and power control for the relaying MT. For the main and relaying links, they have to control the appropriate choice of scrambling and spreading codes for CDMA based systems, the appropriate choice of frequency bands and time slots for TDMA based systems and the appropriate choice of frequency bands, time slots and frequency sub-carriers for OFDMA based systems. They have to guarantee appropriate security, identification and authorisation of potential and existing r-MTs. They have to control an appropriate billing mechanism. They have to control a possible software update within the MTs such as to support certain relaying features.

The following hardware changes should be performed within a MT. Firstly, if the relaying scheme is chosen to be such that another interface is used for relaying, then the hardware has to provide this interface, e.g. PLC (Power Line Communications) or Bluetooth. Secondly, if transparent relaying is deployed then hardware has to be provided which allows amplification, frequency translation and retransmission. This may pose requirements on additional oscillators and filter design. Thirdly, if the r-MT is operated in duplex mode or higher (e.g. triplex), i.e. simultaneous communication with the TX and at least one t-MT, then appropriate filters have to separate the used frequency bands sufficiently such as not to cause any adjacent channel interference.

The following software changes have to be performed within a MT. If a MT is to be used to act as a Central Controller (CC) for an ad-hoc relay, then appropriate control algorithms have to be provided. They have to perform negotiation with the CC in case of a formation of or an association to a new relaying path. They have to be able to influence the data streams such as to comply with the requirements needed to allow for relaying. They have to be able to control synchronisation and power control, either autonomously or imposed by the TX/BS/CC. They have to guarantee appropriate security for the relaying signal stream and t-MTs. The required software could be provided to the MTs in one of the following ways: Firstly, it could be in-built, e.g. already available on the notebook or SIM (subscriber identity module) card or mobile phone. Secondly, it could be downloaded via the air interface and automatically installed, e.g. SDR (software defined radio). Thirdly, it could be received from any surrounding MT. Fourthly, it could be downloaded from special service points that provide the necessary software. Fifthly, it could be downloaded from the Internet, floppy disk or CD-ROM, e.g. onto a notebook.

----------oOo----------

The present invention relates to a system useful for use in any mobile, fixed or nomadic, ad-hoc or meshed, centralised or decentralised, wireless network.

The envisaged scenario of wireless networks beyond 3G focuses on network topologies that support all current and future developed networks. Such topologies will rely more and more on a direct and ad-hoc mode of communication such that there will not be a significant difference between a base station (BS) and mobile terminal (MT). Each MT can be seen as an information source, a relaying hop or/and a terminating information sink. Such network topology inevitably requires a direct mode of communication between at least one source MT (s-MT) and at least one target MT (t-MT) via at least one relaying MT (r-MT).

A procedure that has been proposed to allow such direct communication is utilising TDMA-based relaying along a plurality of mobile handsets. The system was called Opportunity Driven Multiple Access (ODMA). The main problem occurred with such deployment is that the r-MT could not communicate with both, the s-MT and the t-MT, at the same time and thus interrupting the session between both. Therefore, a TDMA based approach was adopted where the r-MT receives the signal stream during one time slot and retransmits it during the consecutive time slot. It thus diminishes the system capacity measured in bits/s/Hz. It further prevents the application of multiple-input-multiple-output (MIMO) capacity measures in form of e.g. Space-Time Codes or BLAST-like techniques and also gives rise to problems of billing as the r-MT would incur the charges which were generated for the t-MT.

A traditional approach has been to use frequency duplex systems where the MTs communicate with the BS simultaneously in up- and downlink frequency, e.g. UMTS. Such approach is not applicable to ad-hoc networks where a clear up- and downlink does not exist as such and where more than two simultaneous links are required.

We have now invented a system, which enables a MT to be an s-MT, r-MT for at least one s-MT or BS and a t-MT for at least one s-MT, r-MT or BS at the same time. According to the invention there is provided a simultaneous wireless connection between at least one s-MT or BS and at least one t-MT via at least one r-MT.

In use, one or a group of sources wishes to communicate to one or a group of sinks providing a single/multi-point to single/multi-point communication link through a group of relays, which themselves could be information sources or sinks. Then the r-MTs have to be able to receive the to-be-relayed information within at least one frequency band and the relaying is accomplished by retransmission within at least one different frequency band.

The concept is referred to as Frequency Relaying (FR).

In a preferred, although not restricted to, embodiment of the invention simultaneous communication between a BS, r-MT and a t-MT is assumed. Then, the BS has to communicate with the r-MT and the t-MT in up- and downlink, the r-MT with the BS in up- and downlink and with the t-MT in forward and backward link, and the t-MT with the BS in up- and downlink and with the r-MT in forward and backward link. Thus each terminal involved requires four communication channels. Since a terminal cannot transmit and receive at the same time at the same frequency, it is necessary to use two frequency bands and two time slots and one code, or two frequency bands and one time slot and two codes, or one frequency band and two time slots and two codes, or four frequency bands and one time slot and one code, or one frequency band and four time slots and one code, or one frequency band and one time slot and four codes, or other hybrid solutions. Since the system efficiency is measured in bits/s/Hz, the number of time slots and frequency bands utilised should be minimised. However, to deploy four codes rises problems with power control inherent to all CDMA based systems. Various deployments are feasible. First, the BS maintains communication with the MTs on two frequencies, traditionally up- and downlink. The r-MT communicates simultaneously with the t-MT on a third frequency, where orthogonality is maintained either through time slot or code. Second, the r-MT stops communicating with the BS in the uplink and reprograms the uplink oscillator on the direct link frequency, which could be deployed in a rather static environment where an uplink communication with the BS is not vital. Third, a fourth oscillator is deployed to communicate in forward and backward link between the r-MT and t-MT. Fourth, the BS communicates with the r-MT and the t-MT in two different frequency bands for up- and downlink. Then, relaying is accomplished in the appropriate downlink frequency band of the other MT. Further hybrid combinations are possible.

In a preferred, although not restricted to, embodiment of the invention simultaneous communication between at least one r-MT, at least one t-MT and possibly at least on BS is assumed. Such embodiment requires the provision of an appropriate amount of frequency bands, and thus sufficient oscillators within the MTs, to be able to support the simultaneous multi-point-to-multi-point communication scenario.

In a preferred, although not restricted to, CDMA-scheme embodiment of the invention the data stream for u users is spread with u distinct spreading codes with given chip rate. Each of the u users receives the u incoming data streams at frequency $f_1$, possibly processes u-1 data streams and relays the possibly processed u-1 data streams at assigned frequencies $f_2$, $f_3$, etc. to the remaining users within the group of u users. Each of the u users then receives its information at frequency $f_1$ and $f_x$ and thus processes u signal streams In a preferred, although not restricted to, TDMA-scheme embodiment of the invention the data stream for u users is transmitted at appropriate time slots and frequency bands. Each of the u users receives the u incoming data streams at the specific time slot and specific frequency band, possibly processes u-1 data streams and relays the possibly processed u-1 data streams at least one of the assigned frequencies $f_2$, $f_3$, etc. to the t-MT within the group of u users. Each of the u users then receives its information at frequency $f_1$ and at least one frequency $f_x$ and thus processes at least two signal streams.

It is a feature of the present invention that no hardware changes have to be performed within a BS antenna array.

It is a feature of the present invention that the following software changes have to be performed within a BS or any logical unit controlling the BS antenna array. The (software) algorithms have to control the setup and release of relaying frequency oscillators in use. They have to inform adjacent MTs about the possibility to setup a relaying connection. They have to control the association and disassociation of MTs to and from a relaying routing path. They have possibly to control synchronisation and power control for the relaying MT. For the main and relaying links, they have to control the appropriate choice of scrambling and spreading codes for CDMA based systems, the appropriate choice of frequency bands and time slots for TDMA based systems and the appropriate choice of frequency bands, time slots and frequency sub-carriers for OFDMA based systems. They have to guarantee appropriate security, identification and authorisation of potential and existing r-MTs. They have to control an appropriate billing mechanism. They have to control a possible software update within the MTs such as to support certain relaying features.

It is a feature of the present invention that the following hardware changes have to be performed within a MT. First, if the relaying scheme is chosen to be such that another interface is used for relaying, then the hardware has to provide this interface, e.g. PLC or Bluetooth. Second, if transparent relaying is deployed then hardware has to be provided which allows amplification, frequency translation and retransmission. This may pose requirements on additional oscillators and filter design. Third, if the r-MT is operated in duplex mode or higher, i.e. simultaneous communication with the TX and at least one t-MT, then appropriate filters have to separate the used frequency bands sufficiently such as not to cause any adjacent channel interference.

It is a feature of the present invention that the following software changes have to be performed within a MT. If a MT is to be used to act as a Central Controller (CC) for an ad-hoc relay, then appropriate control algorithms have to be provided. They have to perform negotiation with the CC in case of a formation of or an association to a new relaying path. They have to be able to influence the data streams such as to comply with the requirements needed to allow for relaying. They have to be able to control synchronisation and power control, either autonomously or imposed by the TX/BS/CC. They have to guarantee appropriate security for the relaying signal stream and t-MTs. The required software could be provided to the MTs in one of the following ways: First, it could be in-built, e.g. already available on the notebook or SIM card or mobile phone. Second, it could be downloaded via the air interface and automatically installed, e.g. SDR. Third, it could be received from any surrounding MT. Fourth, it could be downloaded from special service points which provide the necessary software. Fifth, it could be downloaded from the Internet or floppy disk or CD-ROM, e.g. onto a notebook.

It is a feature of the present invention that highly dynamic ad-hoc networks can be operated in a decentralised direct mode between terminals at various frequencies within given network topologies.

The system can be applied to a Virtual Antenna Array (VAA) as described above.

The invention is illustrated in the accompanying drawings in which:

FIG. 29 shows a generic information flow for forced synchronised schemes

FIG. 30 illustrates a CDMA embodiment with groups of receivers

Referring to FIG. 29, a group of information sources i communicates to a group of information sinks s via a group of relays r. Those relays that are spatially close together are used to accomplish forced synchronisation. There might be several groups of spatially close relays. There might be several information sinks and information sources, which not necessarily have to be linked in a unique and unambiguous manner, which communicate via the relays in at least one frequency band.

Referring to FIG. 30 this illustrates the frequency relaying concept realizing a (2,2) Alamouti scheme. The base transmitter BS transmits the signal to the groups of receivers MS1, MS2, MS3 and MS4 on frequencies $f_1$ and $f_2$ as shown. The symbols for the 'right' group MS2 and MS3 are sent to the 'left' group MS1 and MS4 and vice versa. The signals could be, but are not restricted to, Trellis encoded and retransmitted on respective differing frequency bands to the other group.

The first, second and third inventions described herein can be used in any desired combination.

The invention claimed is:

1. A method of transmitting data between at least one information source and at least one information sink using electromagnetic waves, which method comprises the steps of:
    (a) establishing a direct wireless communication link between the at least one information source and the at least one information sink using at least one first frequency band,
    (b) identifying at least one information relay;
    (c) instructing the at least one information relay to relay data received from the at least one information source intended for the at east one information sink on at least one second frequency band different to said at least one first frequency band;
    (d) transmitting data directly from said at least one information source to said at least one information sink using said at least one first frequency band;
    (e) the at least one information sink receiving said data on said at least one first frequency band and generating a first signal stream therefrom;
    (f) the at least one information sink also receiving said same data on said at least one second frequency band and generating a second signal stream therefrom;
    (g) the at least one information sink processing said first and second signal streams to recover said data.

2. A method as claimed claim 1, wherein at step (b) said information relay is instructed to relay said data on a different frequency band to that which it was received on.

3. A method as claimed in claim 1, further comprising the step of instructing the information relay to utilise time slot or code to ensure orthogonality between the channels on which the data is relayed and that on which it is received.

4. A method as claimed in claim 1, further comprising the step of instructing the information relay to relay data on its uplink frequency band.

5. A method as claimed in claim 4, wherein said information relay is instructed to re-program an uplink oscillator to relay on said uplink frequency band.

6. A method as claimed in claim 1, wherein said information source communicates with the information relay and the information sink on two different frequency bands for uplink and downlink, the method further comprising the step of instructing the information relay to relay on one of the downlink frequency bands.

7. A method as claimed in claim 1, wherein data is transmitted using a code division multiple access scheme by spreading data for u users, each of which can be an information source, sink and/or relay, with u distinct spreading codes, the method further comprising the step of instructing the users to relay u-1 data streams to the remaining u-1 users on a plurality of different frequency bands.

8. A method as claimed in claim 7, wherein the users are instructed to relay data on a u-1 frequency bands.

9. A method as claimed in claim 1, wherein data is transmitted using a time division multiple access scheme by sending data to u users, each of which can be an information source, sink and/or relay, during appropriate time slots and frequency bands, the method further comprising the steps of instructing the users to relay u-1 data streams to the remaining u-1 on a plurality of different time slots and unused frequency bands.

10. A non-transitory computer storage medium comprising computer executable instructions for carrying out a method as claimed in claim 1.

11. Apparatus comprising a controller and a transmitter, said controller being operable to transmit signals for performing a method as claimed in claim 1.

12. Apparatus as claimed in claim 11, wherein said transmitter comprises a plurality of antenna elements.

13. Apparatus as claimed in claim 11, further comprising receiving means and one or more programmable oscillators in addition to uplink and downlink oscillators for relaying signals received through said receiving means at an unused frequency band.

14. Apparatus as claimed in claim 11, wherein said transmitter is a base station, a mobile terminal, mobile telephone or a portable computer.

15. A subscriber identity module card comprising a non-transitory computer storage medium comprising computer readable instructions for performing a method as claimed in claim 1.

\* \* \* \* \*